US008856655B2

(12) United States Patent
Pendergast et al.

(10) Patent No.: US 8,856,655 B2
(45) Date of Patent: Oct. 7, 2014

(54) MEDIA EDITING APPLICATION WITH CAPABILITY TO FOCUS ON GRAPHICAL COMPOSITE ELEMENTS IN A MEDIA COMPOSITING AREA

(75) Inventors: Colleen Pendergast, Livermore, CA (US); Brian Meaney, San Jose, CA (US); Jason Marr, Sunnyvale, CA (US); Eleanor Yerbury, Berkeley, CA (US)

(73) Assignee: Apple Inc., Cupertino, CA (US)

( * ) Notice: Subject to any disclaimer, the term of this patent is extended or adjusted under 35 U.S.C. 154(b) by 441 days.

(21) Appl. No.: 12/434,613

(22) Filed: May 1, 2009

(65) Prior Publication Data
US 2010/0281378 A1   Nov. 4, 2010

(51) Int. Cl.
G06F 3/00       (2006.01)
G11B 27/034     (2006.01)
G11B 27/34      (2006.01)

(52) U.S. Cl.
CPC .............. G11B 27/034 (2013.01); G11B 27/34 (2013.01)
USPC ......................................................... 715/723

(58) Field of Classification Search
CPC ................................... G06F 3/01; G06F 3/048
USPC .......................................................... 715/723
See application file for complete search history.

(56) References Cited

U.S. PATENT DOCUMENTS

| | | |
|---|---|---|
| 5,519,828 A | 5/1996 | Rayner |
| 5,521,841 A | 5/1996 | Arman et al. |
| 5,634,020 A | 5/1997 | Norton |
| 5,664,216 A | 9/1997 | Blumenau |
| 5,682,326 A | 10/1997 | Klingler et al. |
| 5,732,184 A | 3/1998 | Chao et al. |
| 5,760,767 A | 6/1998 | Shore et al. |
| 5,781,188 A | 7/1998 | Amiot et al. |
| 5,826,102 A | 10/1998 | Escobar et al. |
| 5,847,706 A | 12/1998 | Kingsley |
| 5,880,722 A | 3/1999 | Brewer et al. |
| 5,999,173 A | 12/1999 | Ubillos |
| 6,031,529 A | 2/2000 | Migos et al. |
| 6,061,062 A | 5/2000 | Venolia |

(Continued)

OTHER PUBLICATIONS

Chisan, James, et al., "Video Bench—Final Report; SEng 480a/CSc 586a", University of Victoria, Apr. 11, 2003, pp. i-iv and 1-43.

(Continued)

*Primary Examiner* — Boris Pesin
*Assistant Examiner* — Angie Badawi
(74) *Attorney, Agent, or Firm* — Adeli LLP

(57) ABSTRACT

Some embodiments provide a media editing application that allows a user to focus on a subset of media clips that the application combines to create a composite presentation. The media editing application of some embodiments includes a display area for displaying the composite presentation that the application creates by compositing several media clips (e.g., audio clip, video clip). The multimedia editing application of some embodiments also includes a composite display area (e.g., an area with multiple tracks that span a timeline) for displaying graphical clips representations of media clips that are part of the composite presentation. To focus on a subset of clip representations in the composite display area, the application of some embodiments also includes a tool for causing a first emphasized subset of clip representations (also referred to as "in-focus clips") to appear larger in the composite display area than a second de-emphasized subset of clip representations (also referred to as "out-of-focus clips") that are being concurrently represented in the composite display area.

28 Claims, 36 Drawing Sheets

(56) References Cited

U.S. PATENT DOCUMENTS

| | | | |
|---|---|---|---|
| 6,134,380 A | 10/2000 | Kushizaki | |
| 6,154,600 A | 11/2000 | Newman et al. | |
| 6,154,601 A | 11/2000 | Yaegashi et al. | |
| 6,313,854 B1 * | 11/2001 | Gibson | 715/788 |
| 6,377,285 B1 | 4/2002 | Doan et al. | |
| 6,414,686 B1 | 7/2002 | Protheroe et al. | |
| 6,486,896 B1 | 11/2002 | Ubillos | |
| 6,539,163 B1 * | 3/2003 | Sheasby et al. | 386/283 |
| 6,650,826 B1 | 11/2003 | Hatta | |
| 6,658,194 B1 | 12/2003 | Omori | |
| 6,965,723 B1 * | 11/2005 | Abe et al. | 386/281 |
| 7,062,713 B2 | 6/2006 | Schriever et al. | |
| 7,073,127 B2 | 7/2006 | Zhao et al. | |
| 7,165,227 B2 | 1/2007 | Ubillos | |
| 7,313,755 B2 | 12/2007 | Rahman et al. | |
| 7,325,199 B1 | 1/2008 | Reid | |
| 7,348,981 B1 | 3/2008 | Buck | |
| 7,398,002 B2 | 7/2008 | Hsiao et al. | |
| 7,434,155 B2 | 10/2008 | Lee | |
| 7,437,674 B2 | 10/2008 | Chen | |
| 7,480,864 B2 * | 1/2009 | Brook et al. | 715/720 |
| 7,561,160 B2 | 7/2009 | Fukuya | |
| 7,623,755 B2 | 11/2009 | Kuspa | |
| 7,720,349 B2 | 5/2010 | Ogikubo | |
| 7,805,678 B1 | 9/2010 | Niles et al. | |
| 7,823,056 B1 * | 10/2010 | Davey et al. | 715/202 |
| 7,890,867 B1 | 2/2011 | Margulis | |
| 7,965,292 B2 | 6/2011 | Buck | |
| 2002/0154140 A1 | 10/2002 | Tazaki | |
| 2003/0002851 A1 | 1/2003 | Hsiao et al. | |
| 2004/0001079 A1 * | 1/2004 | Zhao et al. | 345/719 |
| 2004/0199395 A1 | 10/2004 | Schulz | |
| 2004/0268224 A1 | 12/2004 | Balkus et al. | |
| 2005/0216840 A1 | 9/2005 | Salvucci | |
| 2006/0008247 A1 | 1/2006 | Minami et al. | |
| 2006/0059426 A1 | 3/2006 | Ogikubo | |
| 2006/0156246 A1 | 7/2006 | Williams et al. | |
| 2007/0118810 A1 | 5/2007 | Ubillos | |
| 2008/0027682 A1 * | 1/2008 | Herberger et al. | 702/185 |
| 2008/0044155 A1 | 2/2008 | Kuspa | |
| 2008/0155459 A1 * | 6/2008 | Ubillos | 715/783 |
| 2010/0107126 A1 * | 4/2010 | Lin et al. | 715/838 |
| 2010/0169823 A1 | 7/2010 | Audet | |
| 2010/0281377 A1 | 11/2010 | Meaney et al. | |

OTHER PUBLICATIONS

Long, A. Chris, et al., "Video Editing Using Lenses and Semantic Zooming", Human Computer Interaction Institute, Carnegie Mellon University, 2002 Month N/A, pp. 1-9, Pittsburgh, PA.

U.S. Appl. No. 12/434,612, filed May 1, 2009, Meaney, Brian, et al.

Casares, Juan, et al., "Simplifying Video Editing Using Metadata," Proceedings of Designing Interactive Systems (DIS 2002), Jun. 2002, pp. 157-166, London, United Kingdom.

Diakopoulos, Nicholas, et al., "Videotater: An Approach for Pen-Based Digital Video Segmentation and Tagging," Proceedings of the 19th Annual ACM Symposium on User Interface Software and Technology (UIST'06), Oct. 15-18, 2006, pp. 221-224, Montreux, Switzerland.

Myers, Brad A., et al., "A Multi-View Intelligent Editor for Digital Video Libraries," The First ACM+IEEE Joint Conference on Digital Libraries (JCDL'01), Jun. 24-28, 2001, pp. 106-115, Roanoke, VA, USA.

Adobe Creative Team, "Adobe Premiere Pro CS4 Classroom in a Book", Dec. 17, 2008, 17 pages, Adobe Press.

Bolante, Antony, "Premiere Pro CS3 for Windows and Macintosh: Visual QuickPro Guide", Dec. 4, 2007, 2 pages, Peachpit Press.

Author Unknown, "Adobe Premiere Pro CS3: User Guide," Apr. 1, 2008, 455 pages, Adobe Systems Incorporated, San Jose, California, USA.

Author Unknown, "Apple Announces Final Cut Pro 4," NAB, Apr. 6, 2003, pp. 1-3, Apple Inc., Las Vegas, Nevada, USA.

Author Unknown, "iMovie '08 Getting Started," Month Unknown, 2008, pp. 1-50, Apple Inc., USA.

Author Unknown, "Using Adobe Premiere Elements 8 Editor," Last Updated Aug. 12, 2010, 313 pages, Adobe Systems Incorporated, San Jose, California, USA.

Brenneis, Lisa, "Final Cut Pro 3 for Macintosh: Visual QuickPro Guide," Apr. 2002, 288 pages, Peachpit Press, Berkeley, California, USA.

Author Unknown, "Adobe Premiere Pro CS4 Classroom in a Book", Dec. 17, 2008, 11 pages, Adobe Press, USA.

Author Unknown, "Using Adobe Premiere Pro CS4", Apr. 24, 2009, 499 pages, Adobe Systems Incorporated, San Jose, California, USA.

* cited by examiner

MEDIA EDITING APPLICATION WITH CAPABILITY TO FOCUS ON GRAPHICAL COMPOSITE ELEMENTS IN A MEDIA COMPOSITING AREA

FIELD OF THE INVENTION

The invention is directed towards a media editing application with capability to focus on graphical composite elements in a media compositing area.

BACKGROUND OF THE INVENTION

Media editing applications allow users to create composite multimedia presentations (e.g., movies) based on several multimedia clips, such as audio and video clips. FIG. 1 illustrates an example of a graphical user interface ("GUI") 100 of a video editing application used in creating a composite multimedia presentation based on several multimedia clips. As shown in this figure, the GUI 100 includes a composite display area 105 and a scroll tool 100. On several tracks that span a timeline, the composite display area can display many rectangles that represent many multimedia clips that are used to create a composite multimedia presentation.

Often, the composite display area cannot display all the tracks and all the clips because typically a composite presentation is formed by numerous clips on numerous tracks. For instance, in the example illustrated in FIG. 1, one video clip and sixteen audio clips are used to create the composite multimedia presentation. Consequently, as shown in this figure, the composite display area 105 is able to concurrently display only a first subset of clip rectangles 115, but not a second subset of clip rectangles 120. To view the second subset, the scroll tool 110 of the GUI 100 has to be used. However, in such instances, the display of the second subset in the composite display area 105 causes some or all of the first subset of the clip rectangles to scroll out of the composite display area.

Accordingly, using the scroll tool 110 is not always useful. This is especially the case, when in creating a composite video presentation, the user of the video editing application wants to concurrently view one or more clips that are separated by a significant temporal duration and/or by several tracks. Consequently, there is a need for a media editing application that allows a user to focus on a subset of clips in a composite display area. Ideally, such a media editing application will allow a user to work on different multimedia clips that are not adjacent to each other without having to scroll back and forth in the composite display area of the media editing application.

SUMMARY OF THE INVENTION

Some embodiments provide a media editing application that allows a user to focus on a subset of media clips that the application combines to create a composite presentation. The media editing application of some embodiments includes a display area for displaying the composite presentation that the application creates by compositing several media clips (e.g., audio clip, video clip). The multimedia editing application of some embodiments also includes a composite display area (e.g., an area with multiple tracks that span a timeline) for displaying graphical clips representations of media clips that are part of the composite presentation. To focus on a subset of clip representations in the composite display area, the application of some embodiments also includes a tool for causing a first emphasized subset of clip representations (also referred to as "in-focus clips") to appear larger in the composite display area than a second de-emphasized subset of clip representations (also referred to as "out-of-focus clips") that are being concurrently represented in the composite display area.

To cause the first emphasized subset of clip representations to appear larger than the second de-emphasized subset of clip representations, some embodiments enlarge the size of the first emphasized subset in the composite display area while also reducing the size of the second de-emphasized subset in the composite display area. Alternatively, some embodiments cause the first emphasized subset of clip representations to appear larger than the second de-emphasized subset of clip representations by maintaining the size of the first subset in the composite display area while reducing the size of the second subset.

Different embodiments of the invention reduce the size of the second de-emphasized subset of clip representations differently. For instance, some embodiments uniformly shrink the size of the de-emphasized clip representations. Other embodiments non-uniformly shrink the size of the de-emphasized clip representations. For instance, some embodiments reduce the de-emphasized clip representations that are farther away from the emphasized clip representations more than the de-emphasized clip representations that are closer to the emphasized clip representations (e.g., that neighbor the emphasized clip representations). The media editing application of some embodiments does this by collapsing the farther de-emphasized clip representations into a single graphical representation (e.g., a line or bar), while only shrinking the size of the closer de-emphasized clip representations. For instance, in some embodiments, the media editing application shrinks all or part of unselected clip shapes that neighbor selected clip shapes, while collapsing into a single graphical representation (e.g., line) contiguous unselected clip shapes that do not neighbor any selected clip shapes.

Yet other embodiments collapse all or part of any unselected clip representation that is located away from any selected clip representation by at least a particular temporal distance, while increasing the size of all or part of any unselected clip representation that is within the particular temporal distance (e.g., 2 seconds) of the selected clip representation. For example, when a first portion of an unselected clip representation is located within a particular temporal distance of the selected clip representation, and a second portion of the unselected clip representation is positioned away from the selected clip representation by at least the particular temporal distance, some embodiments collapse the second portion while increasing the size of the first portion in the same manner as the selected clip representation (e.g., by the same ratio as the ratio use to increase the size of the selected clip representation). Still other embodiments uniformly collapse (i.e., pack) all de-emphasized clip representations that are adjacent to each other into a single graphical representation (e.g., into a single line or bar).

In some of the embodiments that collapse contiguous de-emphasized clip representations into a single graphical representation, the media editing application provides a zoom tool that allows a user to momentarily view an expanded view of the clip representations that are within a single collapsed graphical representation. For instance, a user may move a cursor over the single graphical representation to get the expanded view of the clip representations (e.g., collapsed clip representations) that are within the single graphical representation. The zoom tool is also used in some embodiments to enlarge clip representations that are shrunk individually (i.e., not collapsed/packed with other clip representations into a single representation). In these embodiments, the zoom tool is used to simply view an enlarged view of one or more shrunk smaller clips.

In conjunction with providing an expanded or enlarged view of the clip representations, some embodiments allow a user to unpack or enlarge the clip representations that have been collapsed or shrunk. For instance, when using a zoom tool to view an expanded view of collapsed clip representations, the user of the application of some embodiments can enable an unpack option of the zoom tool to unpack the packed clip representations that the user is viewing with the zoom tool. This option can be similarly used to enlarge a shrunk clip representation that the user views using the zoom tool.

Alternatively or conjunctively with the use of the unpack/enlarge option of the zoom tool, some embodiments allow a user to unpack or enlarge clip representations that have been collapsed without first providing an expanded view of the collapsed clip representations through the zoom tool. For instance, to unpack one or more collapsed clip representations, a user can select (e.g., perform a click operation or provide a "enlarge command" through a pull-down or pop-up menu or keystroke operation) in some embodiments a single graphical representation of several collapsed clips in order to unpack this single representation into its constituent clip representations. Similarly, some embodiments allow a user to select (e.g., perform a click operation or provide a "enlarge command" through a pull-down or pop-up menu or keystroke operation) a de-emphasized, shrunk clip representation in order to enlarge this de-emphasized clip back to its original size When one or more collapsed or shrunk clip representations are unpacked or enlarged, some embodiments also adjust the size of other clip representations in the composite display area. Such adjustments are needed to make room for the clip representations that have been unpacked or enlarged.

Different embodiments use different approaches for determining which clip representations to emphasize. In some embodiments, clip representations that are emphasized are clip representations which have been selected by a user. In other embodiments, clip representations that are emphasized are clip representations on tracks that have been selected by the user. In other words, the media editing application in some embodiments allows a user to select a particular track to emphasize in a composite display area in addition to or conjunction with allowing a user to emphasize clip representations.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following description, numerous details are set forth for purpose of explanation. However, one of ordinary skill in the art will realize that the invention may be practiced without the use of these specific details.

Some embodiments provide a media editing application for creating a multimedia presentation (e.g., movie) by compositing several multimedia clips (e.g., audio clip, video clip). The media editing application of some embodiments provides (1) a composite display area for displaying a set of clip shapes representing a set of multimedia clips that are part of the composite presentation, and (2) a focus option for emphasizing a first subset of clip shapes over a second subset of clip shapes in the composite display area.

Figure 1:
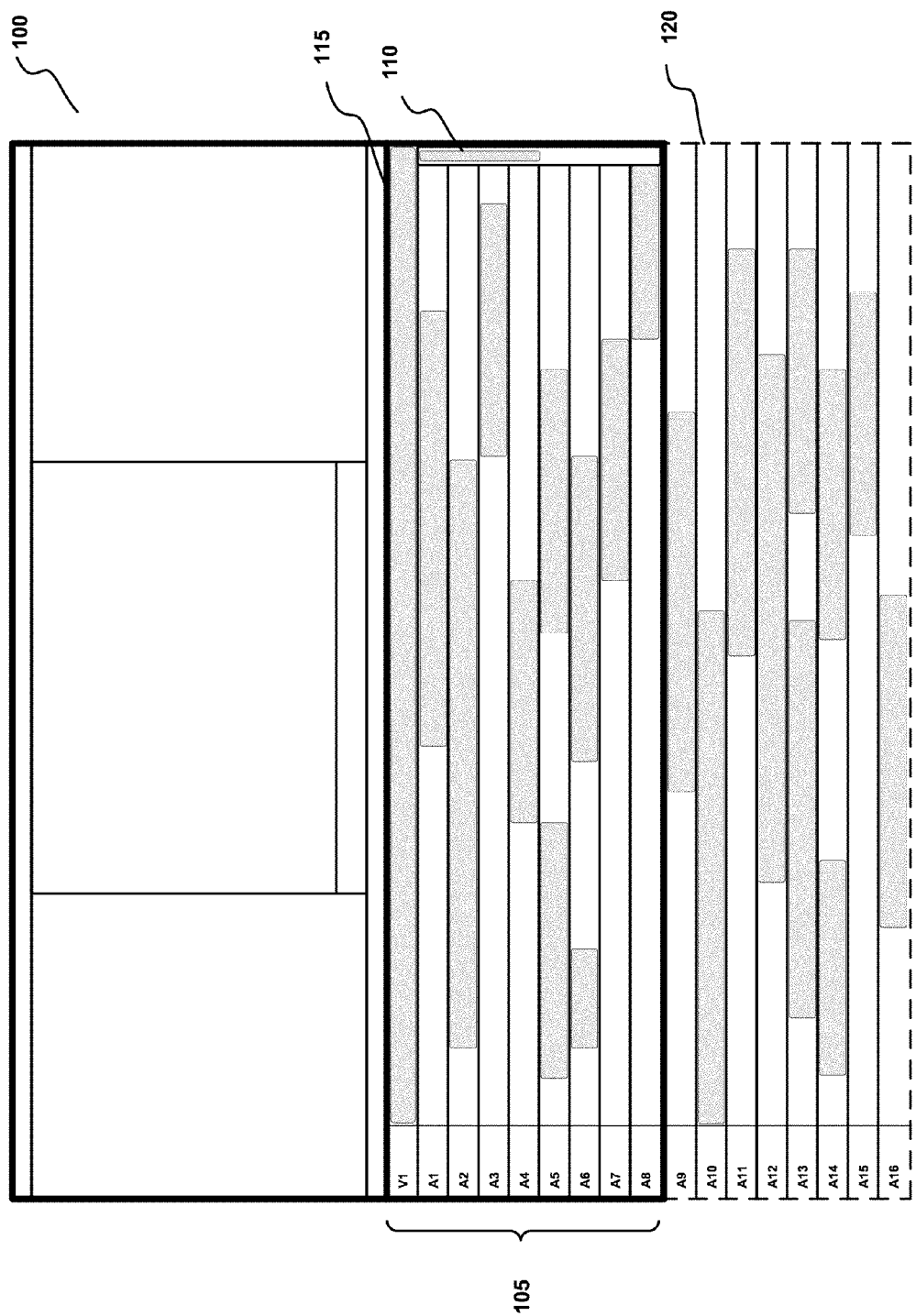
FIG. 1 conceptually illustrates a GUI of a media editing application with numerous graphical representations of multimedia clips.
Figure 2:
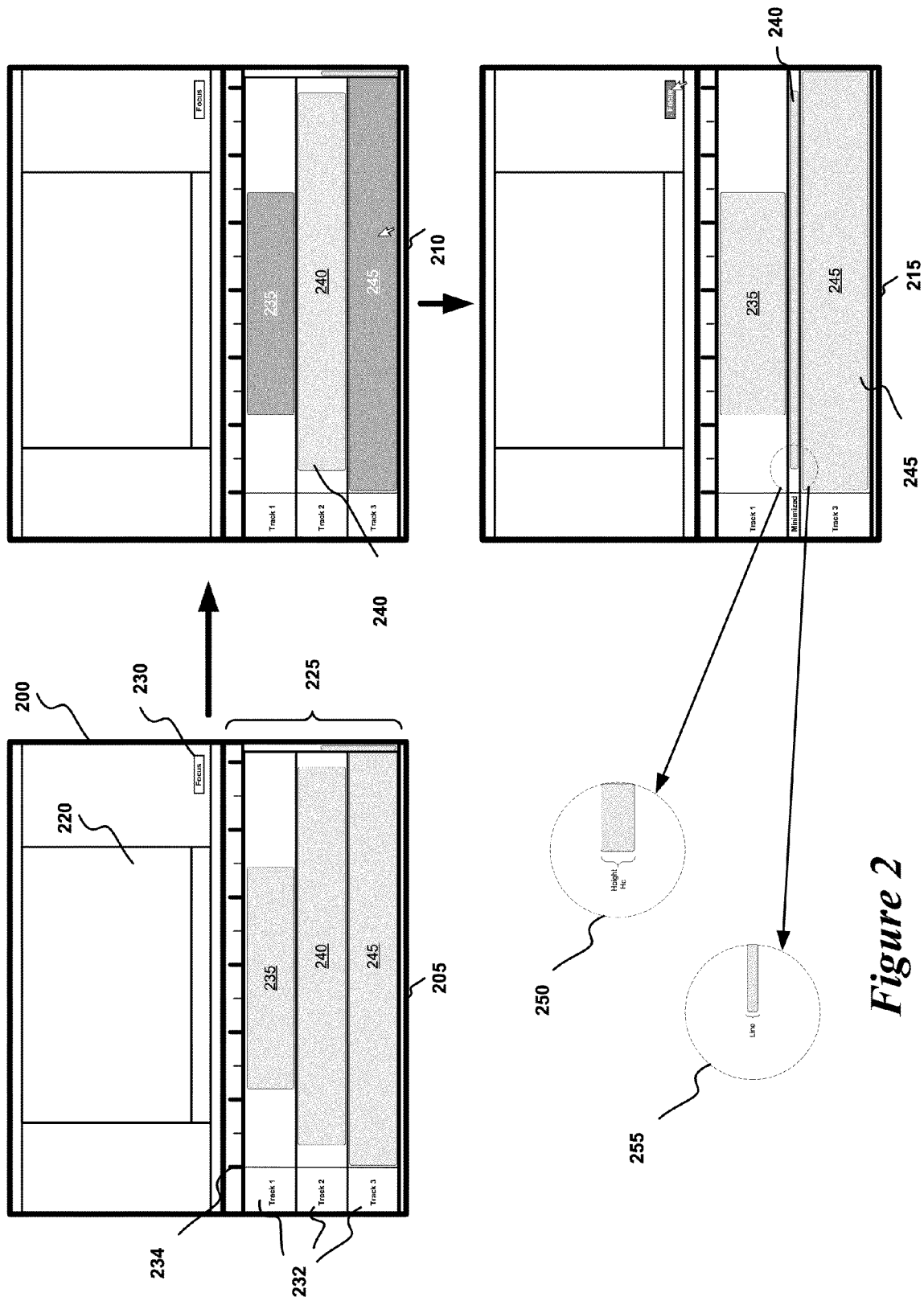
FIG. 2 conceptually illustrates a GUI at several stages that show the focusing of a subset of graphical representations in the vertical direction in some embodiments.

For some embodiments of the invention, FIG. 2 illustrates a graphical user interface ("GUI") 200 of a media editing application with such a focus feature. Specifically, this figure illustrates the GUI 200 at three different stages, a first stage 205 that is before the selection of any clip shape, a second stage 210 that is after the selection of a set of clip shapes for focusing, and a third stage 215 that is after the application of the focus feature.

As shown in FIG. 2, the GUI 200 includes a display area 220, a composite display area 225, and a focus UI item 230. The display area 220 displays a preview of a composite presentation that the application creates by compositing several media clips. The composite display area 225 provides a visual representation of the composite presentation being created by the user. Specifically, it displays one or more clip shapes representing one or more media clips that are part of the composite presentation. In the example illustrated in FIG. 2, the composite display area 225 is an area that includes multiple tracks 232 that span a timeline 234. Each track can receive and hold one or more clip shapes. In the example of FIG. 2, the composite display area 225 is shown with three tracks that hold three clip shapes, namely a first clip shape 235, a second clip shape 240, and a third clip shape 245. In the composite display area 225, the original size of the clips and tracks along the y-direction is pre-defined or user-defined in some embodiments. Also, in some embodiments, the x-direction in the composite display area 225 represents time that is defined along the timeline.

The focus UI item 230 is a conceptual illustration of one or more UI item that allows the media editing application to implement its focus feature for emphasizing a first subset of clip shapes over a second subset of clip shapes in the composite display area 225. Different embodiments of the invention implement this UI item differently. Some embodiments implement it as a focus UI button, others as a focus command that can be selected in a pull-down or drop-down menu, and still others as a focus command that can be invoked through one or more keystroke operations. Yet other embodiments allow the user to access the focus feature through two or more of such UI implementations or other UI implementations.

The operation of the GUI 200 will now be described by reference to the state of the GUI during the first, second and third stages 205, 210 and 215 that are illustrated in FIG. 2. In the first stage 205, the composite display area 225 displays a composite presentation that displays several clip shapes along the timeline 234. A user might have added these clip shapes to the composite presentation in a current editing session or by opening a composite project that was defined in a previous editing session. In the first stage 205, none of the clip shapes have been selected by a user for focusing.

In the second stage 210, the composite display area 225 displays the composite presentation with some of the clip shapes having been selected by a user. These selected clip shapes are shown as the clip shapes with shading. These selected clip shapes are the first clip shape 235 and the third clip shape 245. The second clip shape 240 has not been selected in this example.

In the third stage 215, the composite display area 225 displays the composite presentation after the media editing application has implemented the focus feature. Specifically, the GUI 200 at the third stage 215 illustrates the selection of the focus UI item 230 by a user; this selection is illustrated through the darkening of the focus UI item. As shown in FIG. 2, the selection of the UI item 230 results in (1) the enlarging of the size of the first and third clip shapes 235 and 245, and (2) the shrinking of the second clip shape 240 into the shrunk clip representation 240.

FIG. 2 also illustrates two exploded views 250-255 of the second clip shape 240 in order to illustrate that the clip shape 240 can be shrunk differently in different embodiments. The first exploded view 250 shows that the clip shape 240 can be shrunk to a smaller clip shape with a height of $H_c$. The second exploded view 255 illustrates that the clip shape 240 can alternatively be collapsed into a line or a bar in some embodiments. The difference between these two approaches becomes more pronounced and noticeable when some embodiments that use the line/bar implementation collapse several contiguous de-emphasized clips into a single line/bar. Several such examples will be described below.

Figure 3:
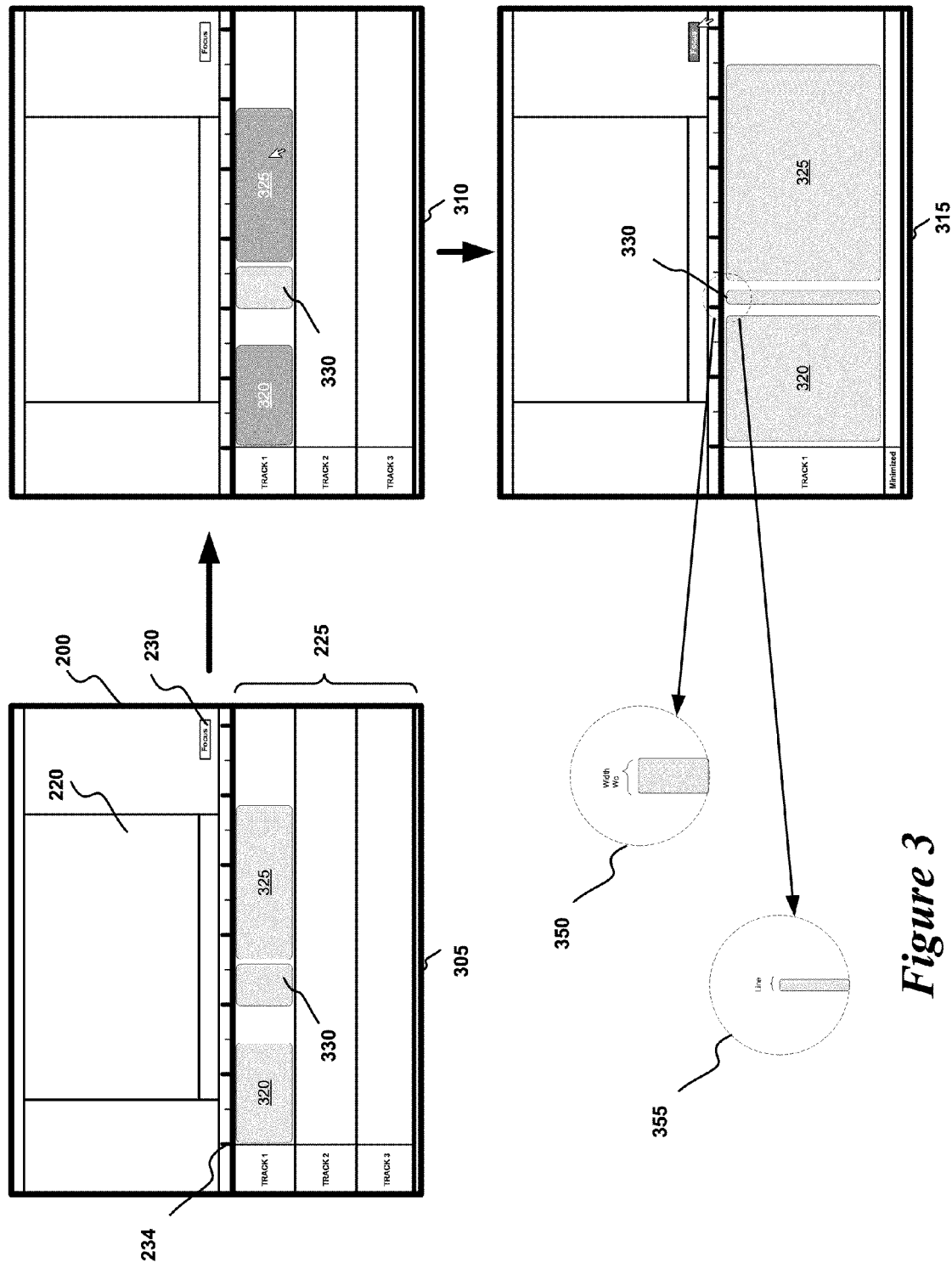
FIG. 3 conceptually illustrates a GUI at several stages that show the focusing of a subset of graphical representations in the horizontal direction in some embodiments.

FIG. 2 conceptually illustrates the shrinking of clip shapes along the y-direction (i.e., vertical direction). However, clip shapes can also be shrunk along the x-direction (i.e., horizontal direction) in some embodiments. FIG. 3 illustrates one such example. Specifically, this figure illustrates the same GUI 200 of FIG. 2, but, in this example, the GUI 200 is illustrating a different composite project that is represented by a different set of clip shapes in the composite display area 225. FIG. 3 illustrates the GUI 200 at three different stages, a first stage 305 that is before the selection of any clip shape, a second stage 310 after the selection of a set of clip shapes for focusing, and a third stage 315 after the application of the focus feature.

In the first stage 305, the composite display area 225 displays the composite project in terms of several clip shapes that span the timeline 234. These clip shapes include a first clip shape 320, a second clip shape 325 and a third clip shape 330. None of the clip shapes 320-330 have been selected by a user for focusing in the first stage 305.

In the second stage 310, the composite display area 225 displays the composite presentation with some of the clip shapes having been selected by a user. These selected clip shapes are shown as the clip shapes having a darker color. These selected clip shapes are the first clip shape 320 and the second clip shape 325. The clip shape 330 has not been selected in the composite display area 225.

In the third stage 315, the composite display area 225 displays the composite presentation after the media editing application has performed a focus operation. Specifically, the GUI 200 at the third stage 315 illustrates that after the focus item 230 has been selected by a user (which again is illustrated through the shading of the focus item 230), the clip shapes 320-325 are enlarged along the x-direction, while the clip shape 330 is shrunk in the x-direction.

FIG. 3 also illustrates two exploded views 350-355 of the unselected clip shape 330 in order to illustrate that the clip shape 330 can be shrunk differently in different embodiments. The first exploded view 350 illustrates that the clip shape 350 can be shrunk to a smaller clip shape with a width of $w_c$. The second exploded view 355 shows that the clip shape 330 can alternatively be collapsed into a line in some embodiments. Again, the difference between these two approaches becomes more pronounced and noticeable when some embodiments that use the line/bar implementation collapse several contiguous de-emphasized clips into a single line/bar. Several such examples will be described below.

In the example illustrated in FIGS. 2 and 3, the clip shapes are shrunk in either the x-direction or y-direction. However, in some embodiments, a focus operation can result in the shrinking or collapsing of clips in both x- and y-directions. This would happen in some embodiments when multiple emphasized clips are on the same track and on different tracks. Several such examples will be provided below in Section I.

The examples illustrated in Section I and several other sections, de-emphasize unselected clips according to the following approach. Specifically, these examples illustrate shrinking clips on track that has no selected clip. In other words, on a track that has no selected clip, some embodiments shrink the track and all the clips on it. Moreover, these examples illustrate that some embodiments collapse all or part of any unselected clip that is located away from any selected clip by at least a particular temporal distance, while increasing the size of all or part of any unselected clip that is within the particular temporal distance (e.g., 2 seconds) of the selected clip. For example, when a first portion of an unselected clip is located within a particular temporal distance of the selected clip, and a second portion of the unselected clip is positioned away from the selected clip by at least the particular temporal distance, some embodiments collapse the second portion while increasing the size of the first portion in the same manner as the selected clip (e.g., by the same ratio as the ratio use to increase the size of the selected clip).

However, one of ordinary skill in the art will realize that other embodiments can use different approaches. For example, some embodiments uniformly shrink the size of the de-emphasized clips. Other embodiments non-uniformly shrink the size of the de-emphasized clips. For instance, some embodiments reduce the de-emphasized clips that are farther away from the emphasized clips more than the de-emphasized clips that are closer to the emphasized clips (e.g., that neighbor the emphasized clips). The media editing application of some embodiments does this by collapsing the farther de-emphasized clips into a single graphical representation (e.g., a line or bar), while only shrinking the size of the closer de-emphasized clips. For instance, in some embodiments, the media editing application shrinks all or part of unselected clips that neighbor selected clips, while collapsing into a single graphical representation (e.g., line) contiguous unselected clips that do not neighbor any selected clips. Still other embodiments uniformly collapse (i.e., pack) all de-emphasized clips that are adjacent to each other into a single graphical representation (e.g., into a single line or bar).

After describing emphasized and de-emphasized clips in Section I, Section II then describes several examples for undoing the shrinking or packing of de-emphasized clips. Section III then describes a zoom tool of some embodiments that allows the user to get an expanded view of shrunk or collapsed de-emphasized clips. Section IV then describes alternative methods for selecting clips for emphasizing and de-emphasizing. Section V then describes the playback of emphasized and de-emphasized clips. Next, Section VI provides a description of different edit and usages that can be performed with the focus feature. Section VII then describes the software architecture of some embodiments of the invention. Next, Section VIII describes a process for designing a media editing application in some embodiments. Section IX provides a description of one computer system which can be used to implement some of the embodiments of the invention.

I. Emphasizing and Packing Clip Shapes

As mentioned above, some embodiments provide several different approaches for emphasizing a first set of clip shapes over a second set of clip shapes in a composite display area of a media editing application. Several more detailed examples of such approaches will now be described in Section A below by reference to FIGS. 4-6. Section B describes another example of a focus operation. Section C then describes a process for emphasizing clip shapes over other clip shapes in a composite display area.

A. Examples

Figure 4:
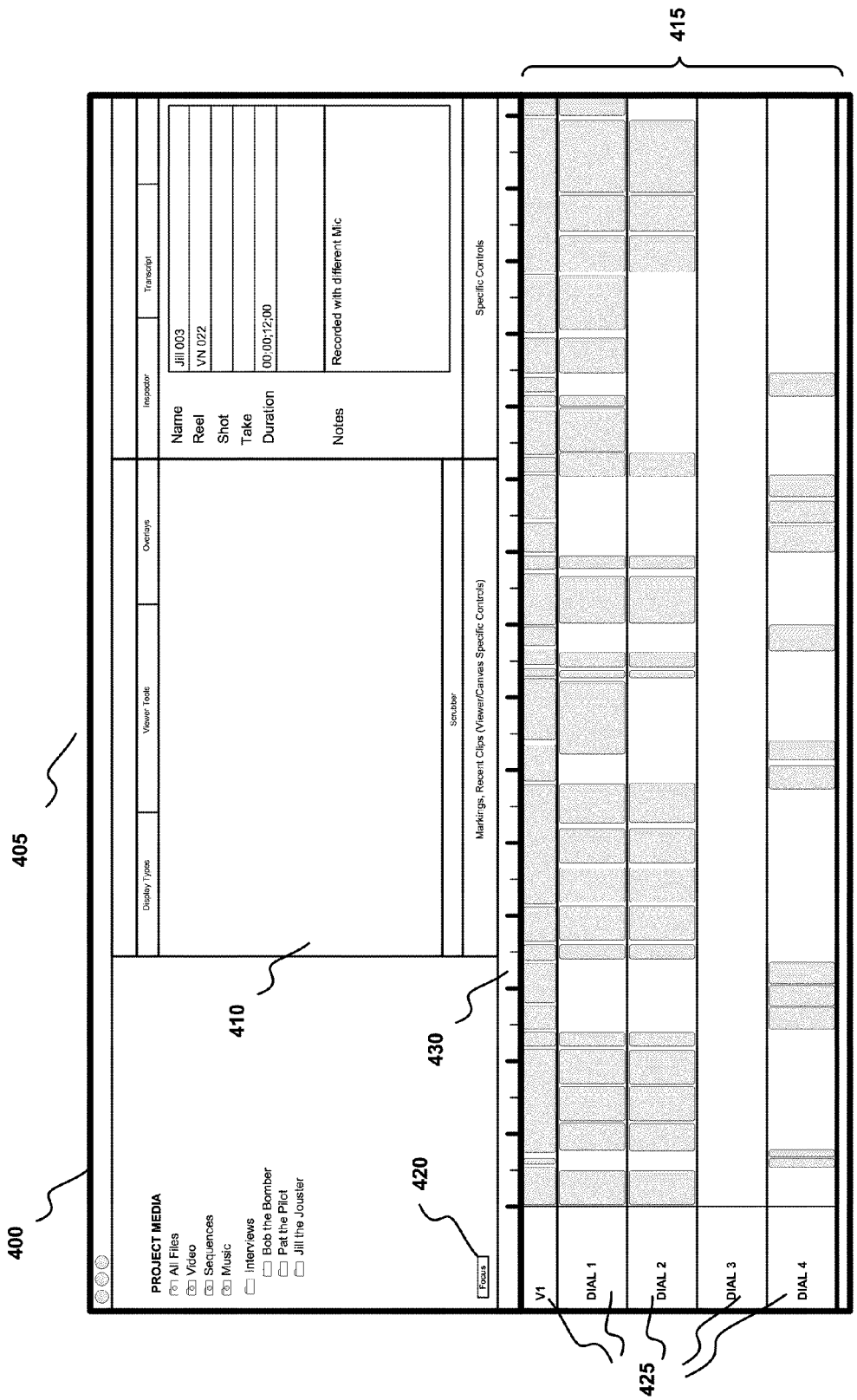
FIG. 4 illustrates a composite display area with several graphical representations in some embodiments.
Figure 5:
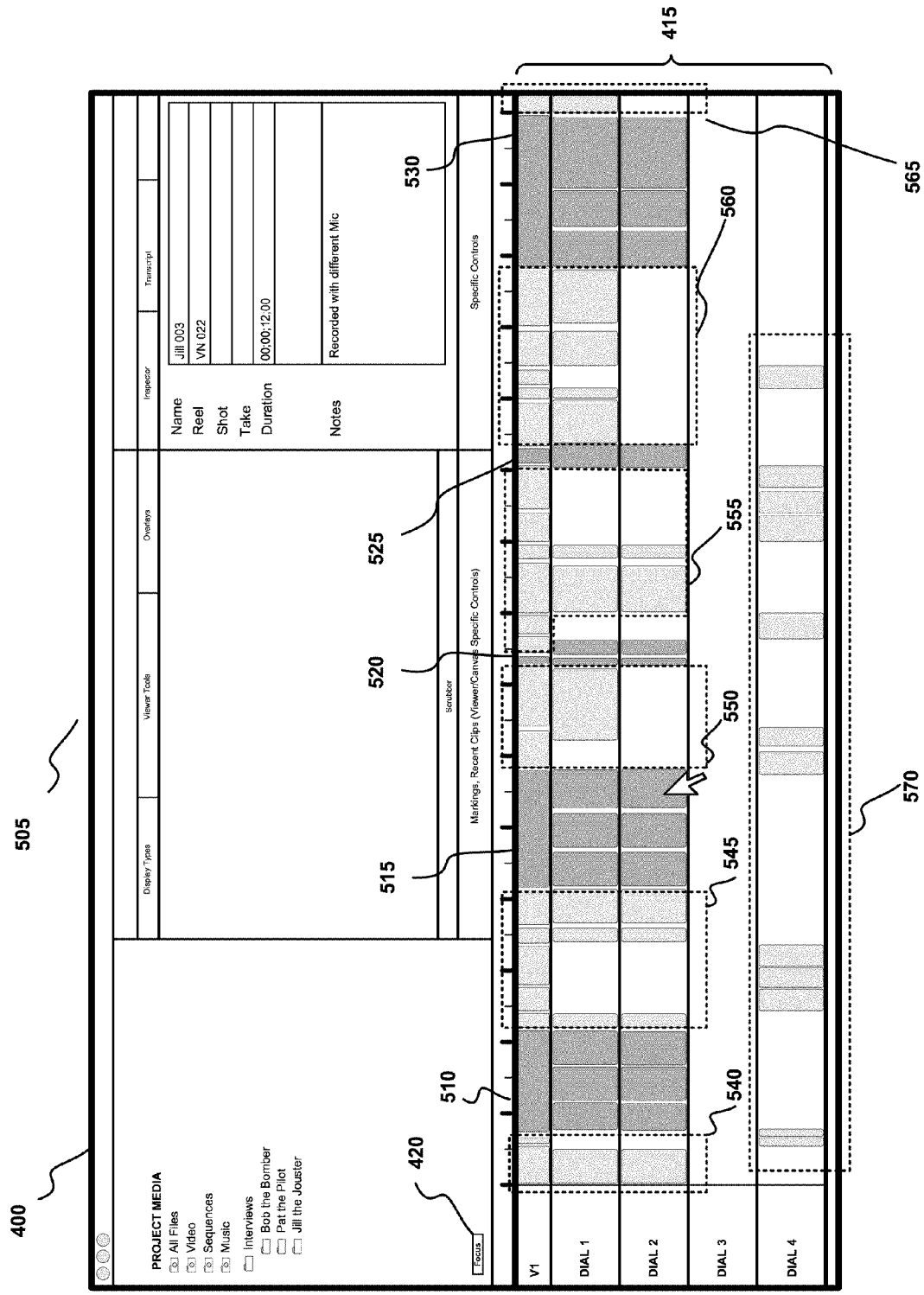
FIG. 5 illustrates a composite display area with several selected graphical representations in some embodiments.
Figure 6:
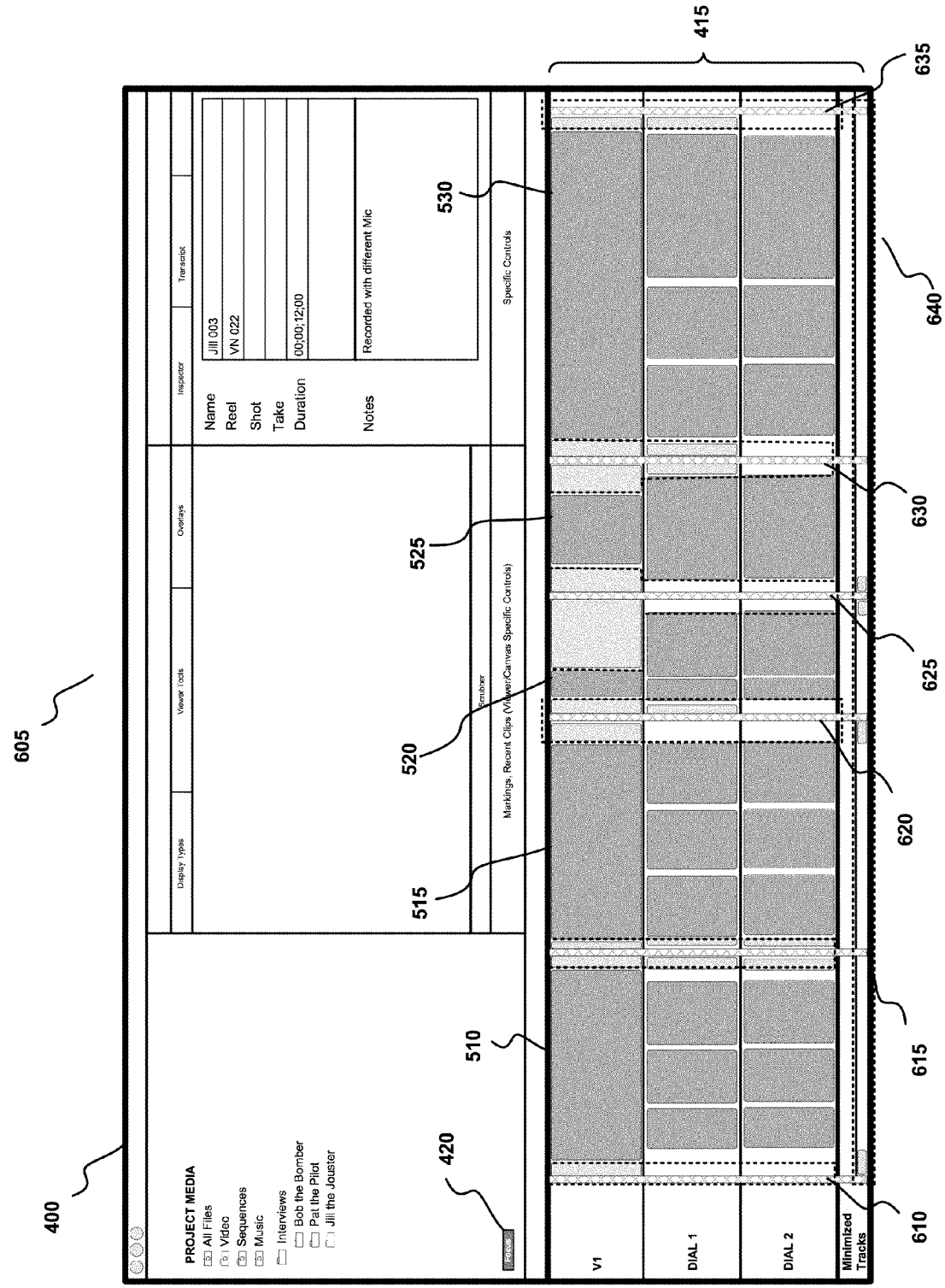
FIG. 6 illustrates a composite display area after a focus feature has been applied on several graphical representations in some embodiments.

For some embodiments of the invention, FIGS. 4-6 illustrate a GUI 400, at different stages, of a media editing application with a focus feature. FIG. 4 illustrates the GUI 400 at a first stage 405 that is before a selection of any clip shape. FIG. 5 illustrates the GUI 400 at a second stage 505 that is after the selection of several clip shapes. FIG. 6 illustrates the GUI 400 at a third stage 605 that is after the application of the focus feature.

As shown in FIG. 4, the GUI 400 includes a display area 410, a composite display area 415, and a focus UI item 420. The display area 410 displays a preview of a composite presentation that the application creates by compositing several media clips. The composite display area 415 provides a visual representation of the composite presentation being created by the user. Specifically, it displays one or more clip shapes representing one or more media clips that are part of the composite presentation. In the example illustrated in FIG. 4, the composite display area 415 is an area that includes multiple tracks 425 that span a timeline 430. Each track can receive and hold one or more clip shapes.

The focus UI item 420 is a conceptual illustration of one or more UI item that allows the media editing application to implement its focus feature for emphasizing a first subset of clip shapes over a second subset of clip shapes in the composite display area 415. Different embodiments of the invention implement this UI item differently. Some embodiments implement it as a focus UI button, others as a focus command that can be selected in a pull-down or drop-down menu, and still others as a focus command that can be invoked through one or more keystroke operations. Yet other embodiments allow the user to access the focus feature through two or more of such UI implementations or other UI implementations.

The operation of the GUI 400 will now be described by reference to the state of the GUI during the first, second and third stages 405, 505 and 605 that are illustrated in FIGS. 4-6. FIG. 4 illustrates the GUI 400 in the first stage 405. As shown in this figure, the composite display area 415 displays clip shapes on several tracks 425 defined along the timeline 430. These clip shapes represent media clips that are being composited to form a composite presentation. A user might have added these clip shapes to the composite presentation in a current editing session or by opening a composite project that was defined in a previous editing session. As further shown in FIG. 4, none of the clip shapes have been selected by a user for focusing in the first stage 405.

FIG. 5 illustrates the GUI 400 at the second stage 505 of the focus operation. Specifically, this figure illustrates the selection of several clip shapes in the composite display area 415 of the GUI 400. These selected clip shapes are shown as the clip shapes having a darker color. These selected clip shapes include a first set of clip shapes 510, a second set of clip shapes 515, a third set of clip shapes 520, a fourth set of clip shapes 525, and a fifth set of clip shapes 530. Clip shapes can be selected differently in different embodiments. In some embodiments, a user can select a particular clip shape by (1) performing a click operation (e.g., double click), (2) one or more keystroke operations or (3) a combination of a click operation and a keystroke operation (e.g., CTRL+click operation). The clip shapes that have not been selected are the clip shapes with the lighter color. These unselected clip shapes include the sets of clip shapes 540-570.

FIG. 6 illustrates the GUI 400 in the third stage 605 after the application of the focus feature by the media editing application in some embodiments. Specifically, the GUI 400 in FIG. 6 illustrates the selection of the focus UI item 420 by a user, which is illustrated through the shading of the focus UI item 420. As shown in FIG. 6, the selection of the UI item 420 results in (1) the enlarging of the size of the sets of clip shapes 510-530, (2) the enlarging of the size of part or all of some of the clip shapes in the sets of clip shapes 540-565, and (3) the collapsing of part or all of other clip shapes in the sets of clip shapes 540-565 into lines 610-635. FIG. 6 also illustrates that the collapsing of graphical representations can be in the vertical and horizontal direction in some embodiments. For instance, the sets of graphical representations (e.g., lines) 610-635 represents clip shapes that have been collapsed in the horizontal direction, while the set of graphical representations 640 represents clip shapes that have collapsed in the vertical direction in some embodiments. In some embodiments, clip shapes in tracks that are minimized are subject to the same rules and constraints as clip shapes in tracks that are enlarged.

Figure 7:
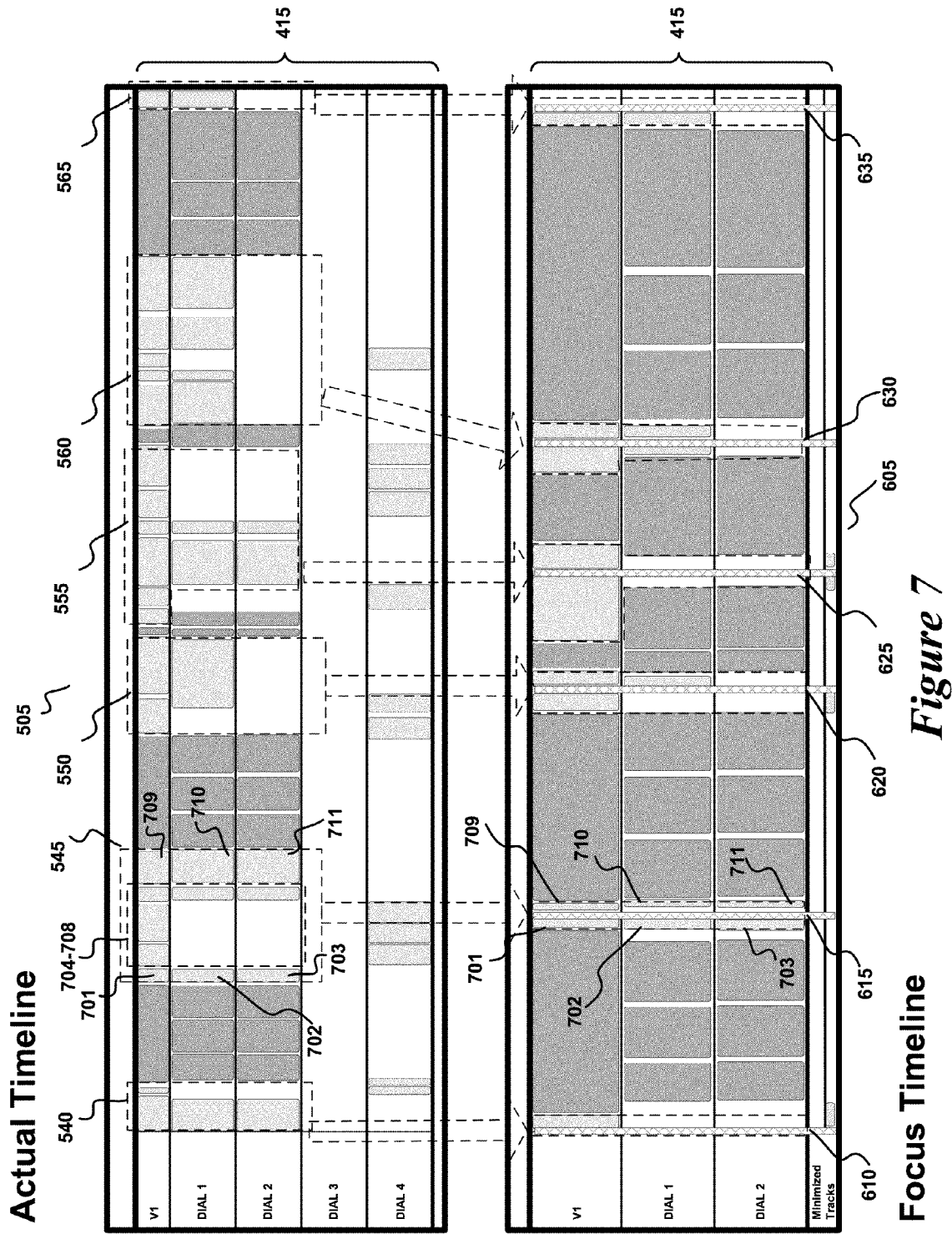
FIG. 7 conceptually illustrates the relationship between graphical representations that are not selected and de-emphasized in some embodiments.

FIG. 7 provides a larger presentation of the composite display area 425 of the GUI 400 at the second stage 505 and the third stage 605, in order to help highlight the correlation between (1) selected and unselected clip representations in the second stage 505, and (2) emphasized and de-emphasized clip representations in the third stage 605. For instance, this figure highlights how the sets of clip shapes 510-530 that are selected in the second stage 505 become enlarged sets of clip shapes 510-530 in the third stage 605.

FIG. 7 similarly helps correlate clip shapes that were not selected in the second stage 505 with de-emphasized clip representations in the third stage 605. This figure helps highlight this by using dashed arrows. In the example illustrated, the media editing application collapses all or part of some of the unselected clip shapes while enlarging all or part of some of the other unselected clip shapes. It does this by enlarging all or part of unselected clip shapes that neighbor selected clip shapes, while collapsing into a single graphical representation (e.g., line) contiguous all or part of unselected clip shapes that do not neighbor any selected clip shapes. In some embodiments, all or part of a particular unselected clip shape neighbors a selected clip shape when all or part of that particular unselected clip shape is within a temporal distance of the selected clip shape (e.g., within a buffer distance, which is further described below by reference to FIGS. 9-11).

Figure 15:
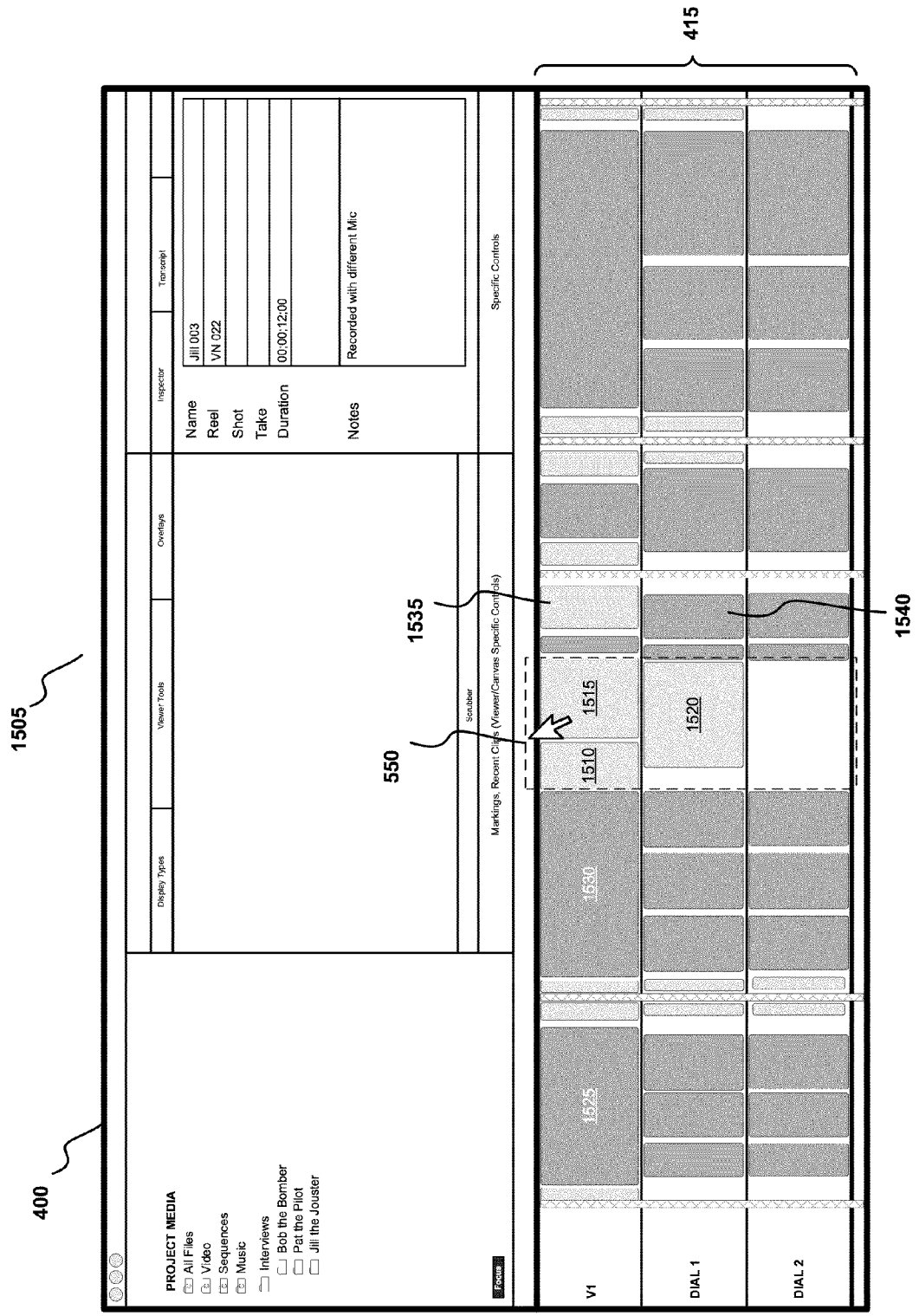
FIG. 15 illustrates a composite display area after a selection of a line associated with packed graphical representations in some embodiments.

One example of this is illustrated by the set of clip shapes 545 in FIG. 7. This set of clip shapes 545 includes eleven clip shapes 701-711 that are unselected in the second stage 505. As shown in FIG. 15, some of these unselected clip shapes (e.g., clip shapes 704-708) in the third stage 605 have been collapsed into a line 615. For the other unselected clip shapes in the set of eleven clip shapes, FIG. 15 also shows that all or part of clip shapes 701-703 and 709-711, which neighbor selected clip shapes, have been enlarged and are shown, in the third stage 605, as clip shapes 701-703 and 709-711 in the composite display area 415. FIG. 7 further shows several other sets of unselected sets of clip shapes 540 and 550-565 that include unselected clip shapes that are collapsed or enlarged in a similar way after the focus feature has been applied by the media editing application. How all or part of unselected clip shapes are collapsed or enlarged will be further described below in detail by reference to FIGS. 9-11 and 13.

Figure 8:
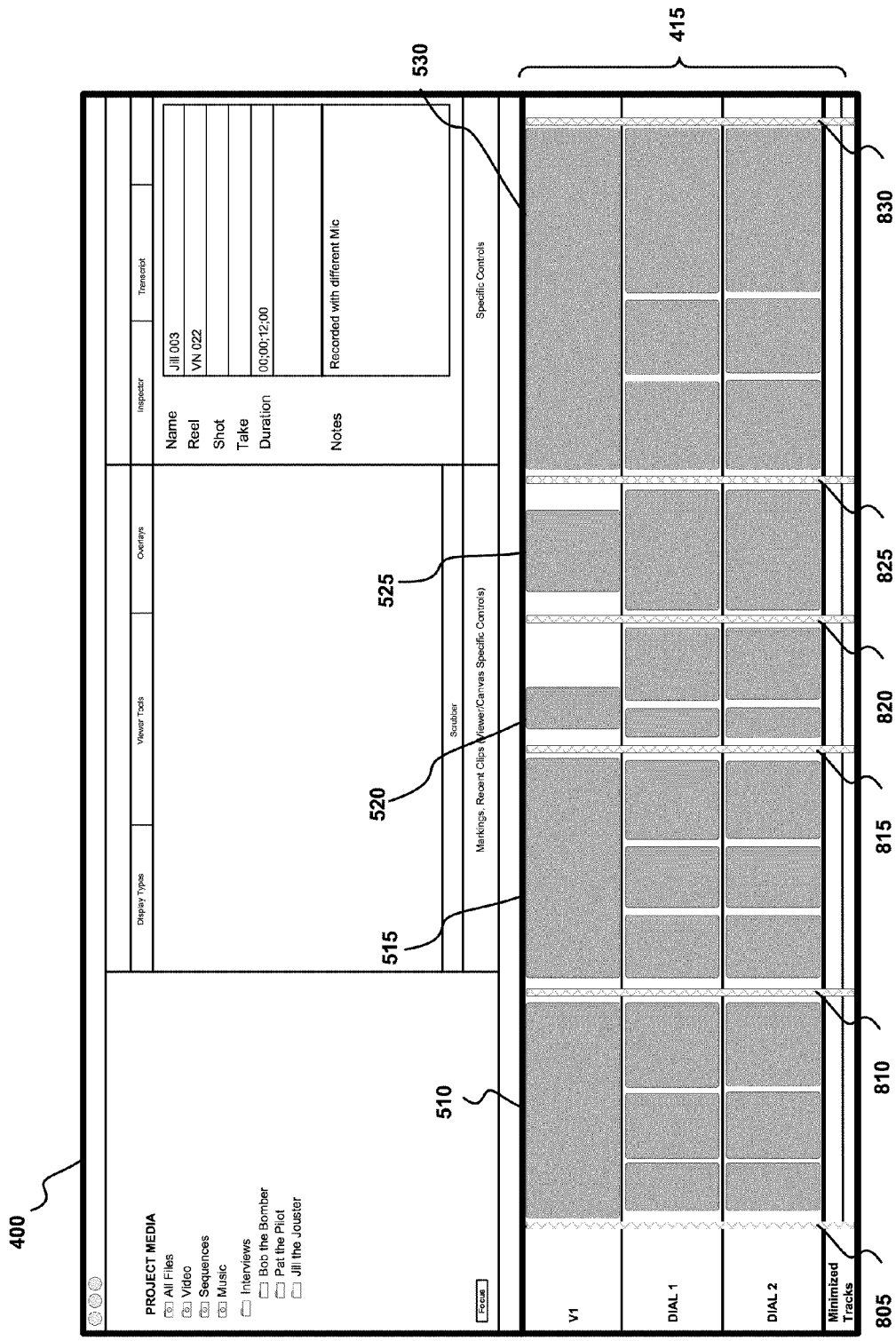
FIG. 8 illustrates a composite display area were graphical representations that are not selected are collapsed into a line in some embodiments.

As previously mentioned, other embodiments of the invention collapse or reduce the size of the de-emphasized clip shapes differently. For example, some embodiments uniformly collapse (i.e., pack) all de-emphasized clip shapes that are adjacent to each other into a single graphical representation (e.g., into a single line or bar). FIG. 8 illustrates the GUI 400 after some embodiments uniformly collapse (i.e., pack) all de-emphasized clip shapes that are adjacent to each other into a single graphical representation (e.g., into a single line or bar). As shown in this figure, each set of clip shapes 540-565 (i.e., clip shapes that have not been selected) has been collapsed into single graphical representations (i.e., lines 805-830). In such instances, the only clip shapes that are shown (not including the lines 805-830) in the composite display area 415 are clip shapes 510-530, which have been selected for focusing.

Having described a GUI at several stages of implementing a particular focus feature in some embodiments, other examples of performing a focus operation in a media editing application will now be described below in Section B.

B. Other Examples

As mentioned above, FIGS. 4-6 illustrate the GUI 400, at different stages, of a media editing application with a focus feature. These figures illustrate how some embodiments collapse or enlarge all or part of unselected clip shapes.

Figure 9:
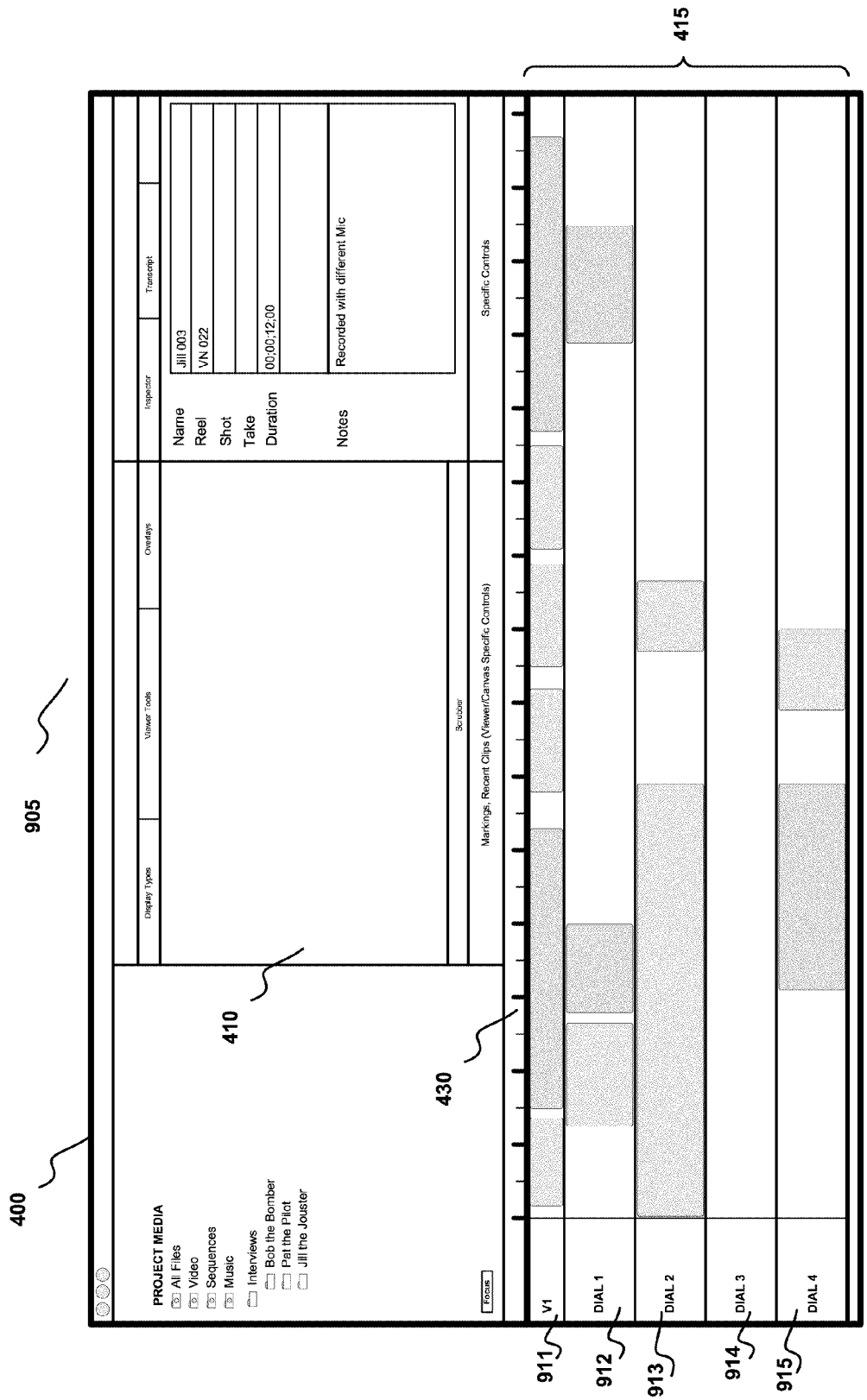
FIG. 9 illustrates a composite display area with several graphical representations in some embodiments.
Figure 10:
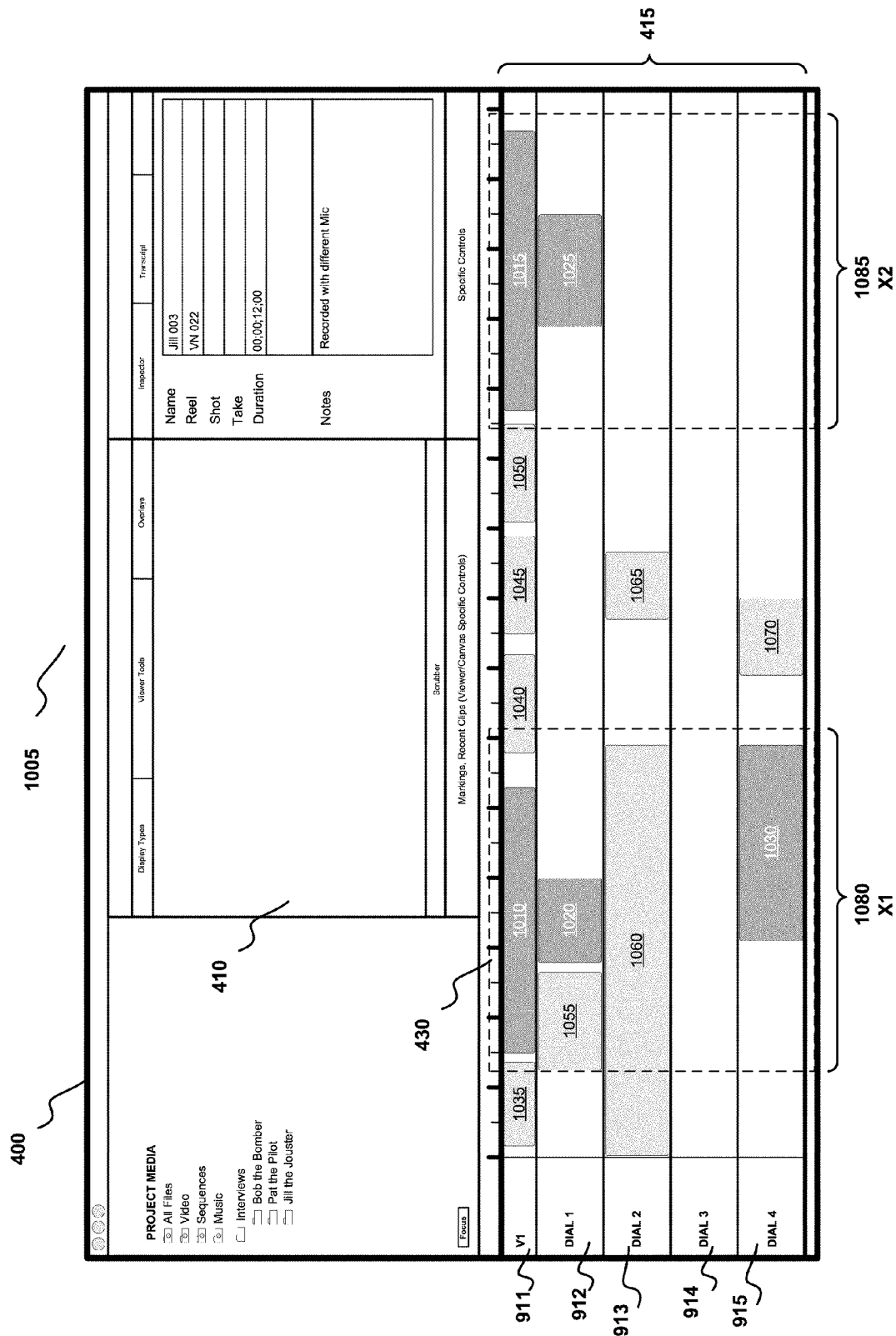
FIG. 10 illustrates a composite display area with several selected graphical representations in some embodiments.
Figure 11:
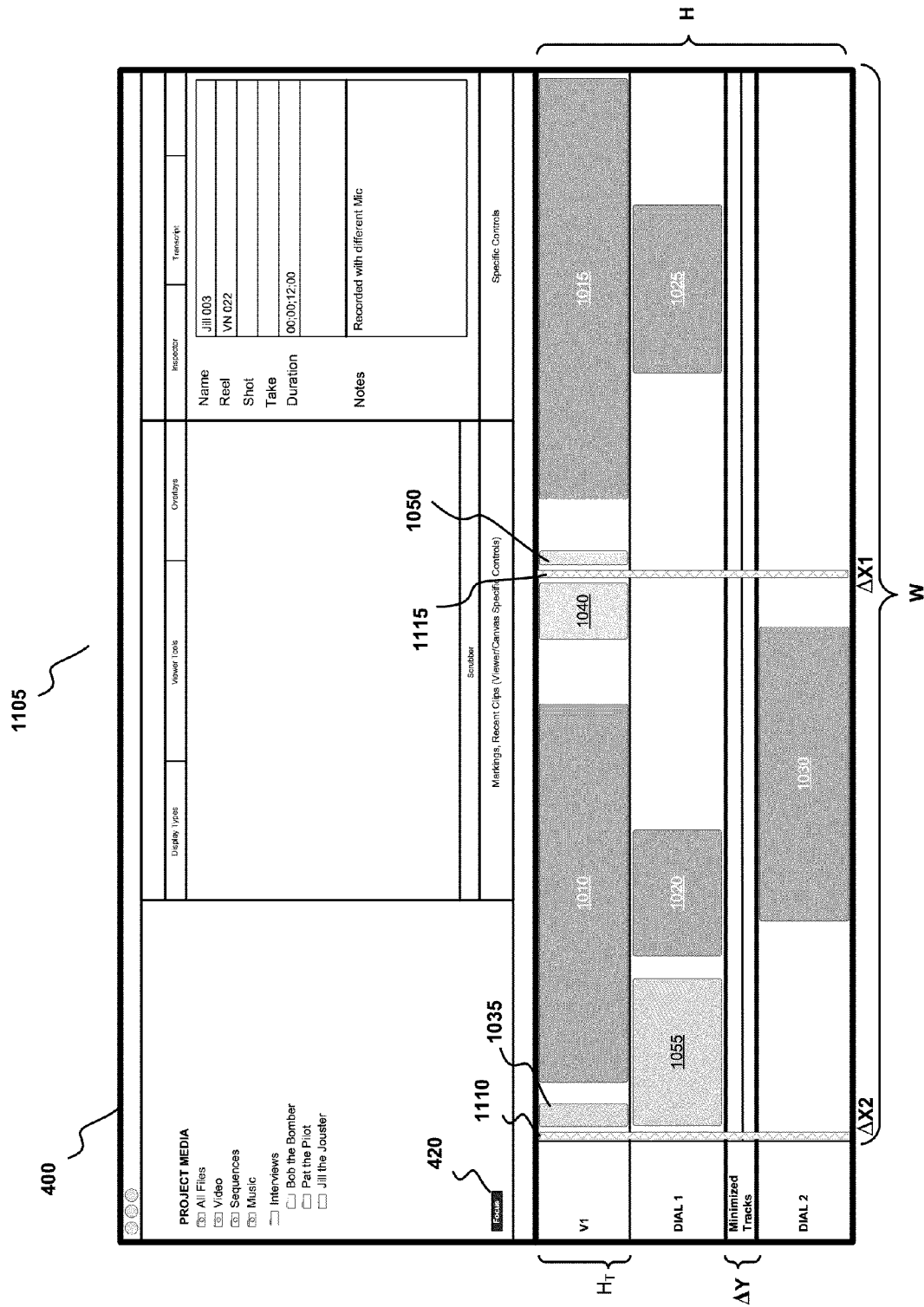
FIG. 11 illustrates a composite display area after a focus feature has been applied on several graphical representations in some embodiments.

FIGS. 9-11 illustrates another example of how all or part of unselected clip shapes are collapsed or enlarged in some embodiments. Specifically, FIGS. 9-11 illustrates the GUI 400, at different stages, which shows how some embodiments apply a focus feature when an unselected clip shape on a track with a selected clip shape temporally overlaps with a selected clip shape on another track. FIGS. 9-11 are similar to the GUI 400 of FIGS. 4-6, except that the GUI 400 includes different sets of tracks and clip shapes. FIG. 9 illustrates the GUI 400 at a first stage 905 that is before the selection of several clip shapes. FIG. 10 illustrates the GUI 400 at a second stage 1005 that is after the selection of several clip shapes. FIG. 11 illustrates the GUI 400 at a third stage 1105 that is after the application of the focus feature.

The operation of the GUI 400 will now be described by reference to the state of the GUI 400 during the first, second and third stages 905, 1005 and 1105 that are illustrated in FIGS. 9-11. As mentioned above, FIG. 9 illustrates the GUI 400 in the first stage 905. As shown in this figure, the composite display area 415 displays clip shapes on several tracks 911-915 defined along the timeline 430. These clip shapes represent media clips that are being composited to form a composite presentation. As further shown in FIG. 9, none of the clip shapes have been selected by a user for focusing in the first stage 905.

FIG. 10 illustrates the GUI 400 at the second stage 1005 of the focus operation. Specifically, this figure illustrates the selection of several clip shapes in the composite display area 415 of the GUI 400. These selected clip shapes are shown as the clip shapes having a darker color. These selected clip shapes include a first clip shape 1010, a second clip shape 1015, a third clip shape 1020, a fourth clip shape 1025, and a fifth clip shape 1030. The clip shapes that have not been selected are the clip shapes with the lighter color. These unselected clip shapes include the clip shapes 1035-1070. As further shown in this figure, the unselected clip shape 1055 overlaps in time with the selected clip shape 1010. FIG. 10 also illustrates two focus regions 1080-1085. These focus regions are used for determining which clip shapes are enlarged and by how much they are enlarged. These focus regions are further described below by reference to FIG. 13, which describes a process for collapsing and enlarging clip shapes.

FIG. 11 illustrates the GUI 400 in the third stage 1105 after the application of the focus feature by the media editing application in some embodiments. Specifically, the GUI 400 in FIG. 11 illustrates the selection of the focus UI item 420 by a user, which is illustrated through the shading of the focus UI item 420. As shown in FIG. 11, the selection of the UI item 420 results in (1) the enlarging of the size of the clip shapes 1010-1030, (2) the enlarging of the clip shape 1055, (3) the enlarging of the size of a first part of the clip shapes 1035-1040 and 1050, (4) the collapsing of the clip shapes 1045 and 1070, and (5) the collapsing of a second part of clip shapes 1035-1040 and 1050. In particular, (1) the second part of clip shape 1035 is collapsed into line 1110, and (2) the second part of clip shapes 1040 and 1050, and the clip shapes 1045 and 1070 are collapsed into line 1115. This figure illustrates that the unselected clip shape 1055 is enlarged in size along with the other selected clip shapes 1010-1030 because the unselected clip shape 1055 temporally overlaps with the selected clip shape 1010.

FIG. 11 also illustrates how some embodiments apply the focus feature on clip shapes based on buffer zones. In particular, this figure illustrates how some embodiments enlarge all or part of any unselected clip shape that is in proximity to a selected clip shape (e.g., within a buffer zone). As shown in this figure, a part of the unselected clip shape 1040 is within a certain temporal distance (e.g., buffer distance) of the selected clip shape 1030. Accordingly, the part of the unselected clip shape 1040 that is within the buffer distance is enlarged along with the selected clip shape 1030. In some embodiments, this buffer distance is specified by a user. The buffer distance can be the same for all clip shapes in some embodiments. In other embodiments, different buffer distances can be used for different clip shapes. In some embodiments, buffer distances are used to identify a focus region, which is further described below by reference to FIG. 13.

In some embodiments, all or part of any clip shape that is outside the buffer distance is collapsed. As shown in FIG. 11, the part of the unselected clip shape 1040 that is outside the buffer distance is collapsed. Since the unselected clip shapes 1045 and 1070 of FIG. 10 are also outside the buffer distance, these clip shapes 1045 and 1070 are also collapsed in FIG. 11. Similarly, since the first part of the unselected clip shape 1050 is within a buffer distance of the selected clip shape 1015 and the second part of the unselected clip shape 1050 is outside of the buffer distance of the selected clip shape 1015, the second part of the unselected clip shape 1050 is collapsed, while the first part of the unselected clip shape 1050 is enlarged.

Having described a GUI at several stages of implementing a focus feature in some embodiments, a process for performing a focus operation in a media editing application will now be described below in Section C.

C. Process for Emphasizing Graphical Representations

Figure 12:
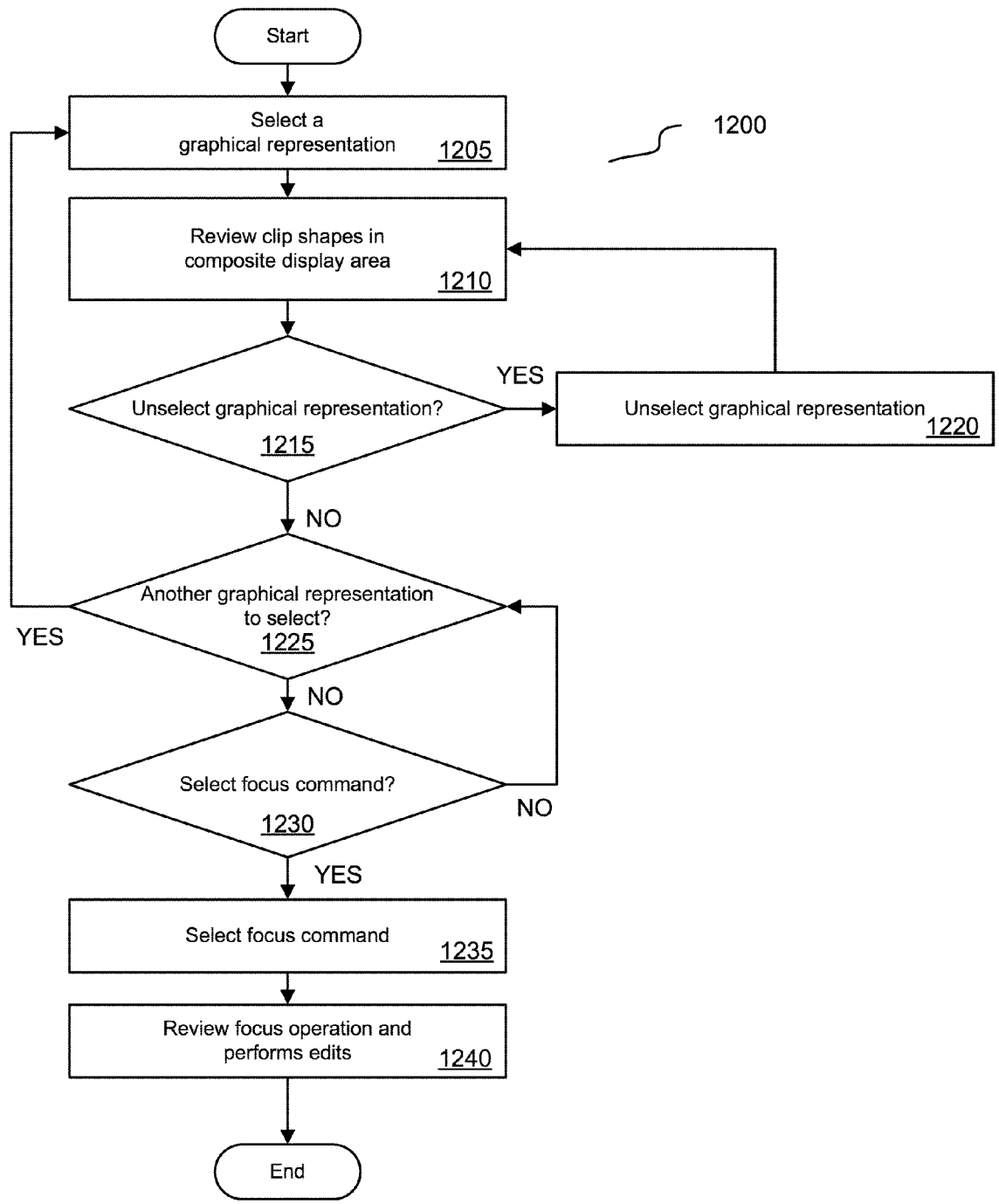
FIG. 12 illustrates a process for focusing on a set of graphical representations in a composite display area in some embodiments.

FIG. 12 illustrates a process 1200 that some users perform to focus on a first set of graphical representations in a composite display area of a media editing application. In some embodiments, the process of FIG. 12 starts when a user has enabled a focus feature by selecting a focus option. As shown in FIG. 12, the process 1200 initially selects (at 1205) a graphical representation. In some embodiments, the graphical representation that is selected (at 1205) is a clip shape in the composite display area of the media editing application. In some embodiments, the clip shape is selected though a click operation. The selected clip shape is a clip shape that a user wants to emphasize or focus in the composite display area in some embodiments. In some embodiments, the composite display area is the composite display area 415 as described with reference to FIG. 4.

Next, the process reviews (at 1210) the clip shapes in the composite display area. In some embodiments, this involves reviewing a marked graphical representation of the selected graphical representation in the composite display area. In some embodiments, the selected clip shape is marked to visually indicate which clip shapes in the composite display area has been selected (e.g., selection performed through a click operation). The selected shape is marked by a darker shading relative to other unselected clip shapes in some embodiments. After reviewing the marked graphical representation that has been selected (at 1210), the process determines (at 1215) whether to unselect a graphical representation. If so, the process proceeds to 1220 to unselect a graphical representation. In some embodiments, the graphical representation that is unselected is a graphical representation that was previously selected (e.g., selected at 1205). When a particular graphical representation is unselected, the particular graphical representation is no longer marked (e.g., does not have darker shading) in some embodiments. Once the graphical representation has been unselected (at 1220), the process proceeds back to 1210 to review the clip shapes in the composite display area.

After determining (at 1215) not to unselect a graphical representation, the process determines (at 1225) whether to select another graphical representation. If so, the process proceeds back to 1205 to select another graphical representation.

However, when the process determines (at 1225) not to select another graphical representation, the process then determines (at 1230) whether to select the focus command. In some embodiments, the focus command is selected when all desired clip shapes to focus have been selected. In other words, when a user has selected all clip shapes of interest in the composite display area, the focus command is selected.

After determining (at 1230) to select the focus command, the process selects (at 1235) the focus command. In some embodiments, selecting (at 1235) the focus command includes selecting the focus item 420 of FIG. 4. In some embodiments, selecting the focus command includes invoking the focus command through one or more keystroke operations. Once the focus command has been selected, the process reviews (at 1240) the implementation of the focus operation on clip shapes in the composite display and edits (at 1240) the clip shapes and ends. In some embodiments, the implementation of the focus operation produces a composite display area that includes enlarged selected clip shapes. In addition, the focus operation of some embodiments also collapses the unselected clip shapes. An example of a focus operation is further described below by reference to FIG. 13. The editing operation is further described below in Section VI.

Figure 13:
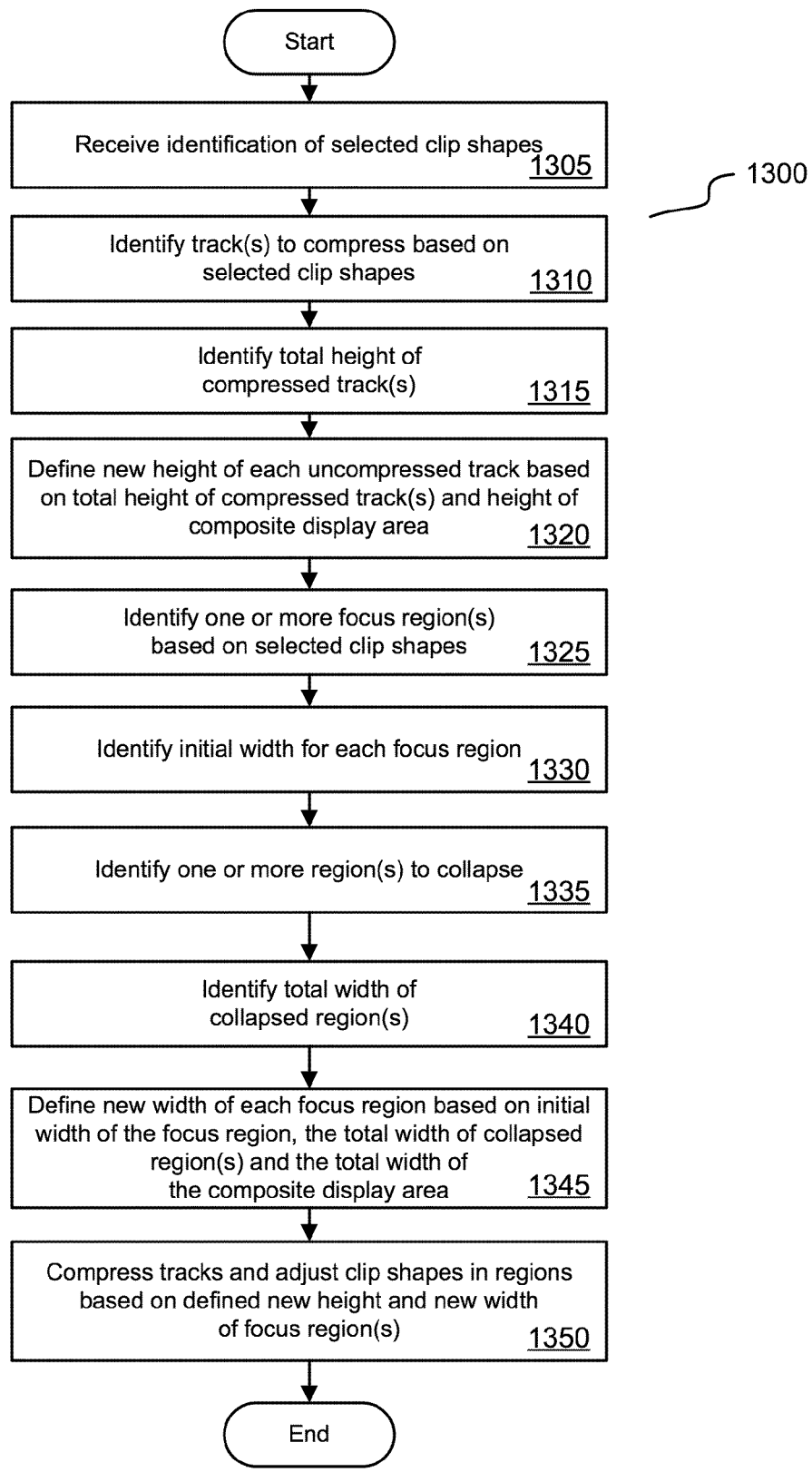
FIG. 13 illustrates a process for collapsing clip shapes and enlarging selected clip shapes in some embodiments.

Having described a process for performing a focus operation, a process for computing height and width of clip shapes for a focus operation will now be described. FIG. 13 illustrates a process 1300 that some embodiments perform to compute the height and width of clip shapes in a composite display area. In some embodiments, the process 1300 is performed after a focus command is selected (at 1235) of process 1200. FIG. 13 will be described by reference to the examples that were described above with reference to FIGS. 10-11.

In some embodiments, the process of FIG. 13 starts when clip shapes have been selected and a focus feature is invoked (e.g., selection of focus item 420). As shown in FIG. 13, the process 1300 receives (at 1305) the identification of the selected clip shapes. For example, the process receives (at 1305) an indication that the clip shapes 1010-1030 in FIG. 10 are the selected clip shapes.

Next, the process identifies (at 1310) which track to compress based on the selected clip shapes. In some embodiments, any track that does not have a selected clip shape is identified as a track to compress. For example, in FIG. 10, tracks 913-914 do not have any clip shapes that are selected. Accordingly, in this instance, these two tracks 913-914 would be identified by the process 1300 as tracks to compress in some embodiments.

After identifying (at 1310) tracks to compress, the process identifies (at 1315) a total height of the compressed tracks. Different embodiments will identify different heights for compressed tracks. Some embodiments compress all contiguous tracks that do not include a selected clip shape into a single track, while other embodiments shrink the height of each track that does not include a selected clip shape. FIG. 11 illustrates an example of the total height (ΔY) of the compressed tracks in some embodiments.

Next, the process defines (at 1320) a new height for each uncompressed track (e.g., track that includes at least one selected clip shape). In some embodiments, different uncompressed tracks can have different heights. In other embodiments, each uncompressed track will have the same height. In such instances, the process defines (at 1320) the new height by specifying and solving an equation. In some embodiments, this first entails identifying the height (H) of the composite display area, as illustrated in FIG. 11. The total height (ΔY) of the compressed tracks is then subtracted from the height (H) of the composite display area, which yields an available height ($H_A$). When the height of uncompressed tracks are all the same, then the height of each uncompressed track is defined as the available height divided by the number of uncompressed tracks. In FIG. 11, there are three uncompressed tracks. Accordingly, the height ($H_T$) of each track in FIG. 11 can be expressed as $H_T = H_A/3$. In some embodiments, defining the height of an uncompressed track includes defining the height of clip shapes that are on the uncompressed track.

After defining (at 1320) the new height for the uncompressed tracks, the process identifies (at 1325) one or more focus regions based on the selected clip shapes. In some embodiments, this entails identifying start and end points for each selected clip shape in the timeline. Once these start and end points are identified, the identified focus region is the region along the timeline that is between the start and end points. For example, if the start point is at time 1:20:45 and the end point is at time 1:21:20, then the focus region would be the region in the composite display area that is between these two times along the timeline.

In some embodiments, the focus region is identified differently. For example, some embodiments use buffer points to identify the focus region. These buffer points are near each start point and end point. These buffer points can be identified based on a buffer distance that specifies a temporal distance (e.g., time) from a start point or an end point. In some embodiments, the buffer distance is a user specified distance. If the buffer distance is specified as two seconds, then in the above example, the buffer points would be 1:20:43 and 1:21:22. Accordingly, the identified focus region would be the region along the timeline that is between 1:20:43 and 1:21:22.

FIG. 10 illustrates two focus regions 1080-1085 that are identified by using a buffer distance. As shown in this figure, the first focus region 1080 is identified by the selected clip shape 1010, the selected clip shape 1030 and a buffer distance that extends from the start side of the selected clip shape 1010 and the end side of the selected clip shape 1030. FIG. 10 also shows that the second focus region 1085 is identified by the selected clip shape 1015 and a buffer distance that extends from both sides of the selected clip shape 1015.

Next, the process identifies (at 1330) the initial width of each focus region. The width of the focus region is the width of the selected clip shapes in some embodiments. In other embodiments, the width of the focus region is the collective width of two or more clip shapes that temporally overlap each other. In yet other embodiments, the width of the focus region is the width of the selected clip shape and the buffer distance. FIG. 10 illustrates an example of focus region 1080 that has a width X1, which is the width of the selected clip shape 1010, the selected clip shape 1030 and a buffer distance.

After identifying (at 1330) the width, the process identifies (at 1335) one or more regions in the composite display area to collapse. FIG. 10 illustrates an example of regions to collapse in some embodiments. As shown in this figure, the regions to collapse are (1) a first unfocus region that is before the first focus region 1080 and (2) a second unfocus region that is between the first and second focus regions 1080-1085. The first unfocus region includes a part of the unselected clip shape 1035 and a part of the unselected clip shape 1060. The second unfocus region to collapse includes clip shapes 1045 and 1065-1070. In addition, the second unfocus region to collapse also includes parts of clip shapes 1040 and 1050.

Next, the process identifies (at 1340) the total width of all regions to collapse after the focus feature has been applied. In some embodiments, this entails collapsing all clip shapes and computing how much space in the horizontal direction will such collapsed clip shapes collectively occupy in the composite display area. FIG. 11 illustrates two lines 1110 and 1115 that each represents a particular collapsed region and clip shapes in the particular region. As shown in this figure, the line 1110 has a width of ΔX1 and the line 1115 has a width of ΔX2.

Once the total width of the collapsed region is identified (at 1340), the process computes (at 1345) the new width of each focus region based on the (1) initial width of the focus region, (2) the total width of the collapsed region and (3) the total width of the composite display area. As shown in FIG. 11, the total width of the composite display area is W. Some embodiments define (at 1345) the width of focus region(s) by subtracting the total width (e.g., ΔX1+ΔX2) of the collapsed region from the total width (W) of the composite display area, which yield an available width ($W_A$). In some embodiments, the available width ($W_A$) is multiplied by the initial width (e.g., X1) of the focus region. The product of the available width and initial width is then divided by the total width (e.g., X1+X2) of the focus regions to yield the new width for the focus region. In some embodiments, computing the new width includes computing a scaling factor for the focus region. This scaling factor can be computed by taking the ratio of the available width over the total width of the focus regions ($W_A/(X1+X2)$) in some embodiments. This scaling factor is then multiplied to the initial width of the focus region to define the new width for the focus region.

Once the process has defined (at 1345) the new width for each focus region, the process compress (at 1350) any unselected track and adjusts (at 1350) the clip shapes based on the defined new width and height and ends. In some embodiments, adjusting the new width of a particular focus region includes adjusting the new width of the clip shapes that are within the particular focus region. The change to the width of the clip shape in the focus region is also proportional to the change in the width of the focus region in some embodiments. For example, if the width of the focus region is increased by 100 percent then the width of any clip shape in the focus region will also increase by 100 percent in some embodiments. In addition to changing the size of clip shapes, the process also adjusts the location of these clip shapes in the composite display area in order to maintain the temporal relationship between the clip shapes that are adjusted.

Having described several processes for collapsing clip shapes, Section II will now describes the unpacking of collapsed clip shapes.

II. Unpacking Clip Shapes That Have Been Collapsed

After working on multimedia clips that have been emphasized or focused on, it may be desirable to work (e.g., edit) on graphical representations that were de-emphasized. Accordingly, some embodiments of the invention provide a feature that unpacks or enlarges some or all of the collapsed or shrunk set of clip shapes. The following Section A describes in detail examples of unpacking or enlarging clip shapes and the subsequent focusing of clip shapes in some embodiments. Section B then describes a process for unpacking clip shapes.

A. Examples

Figure 14:
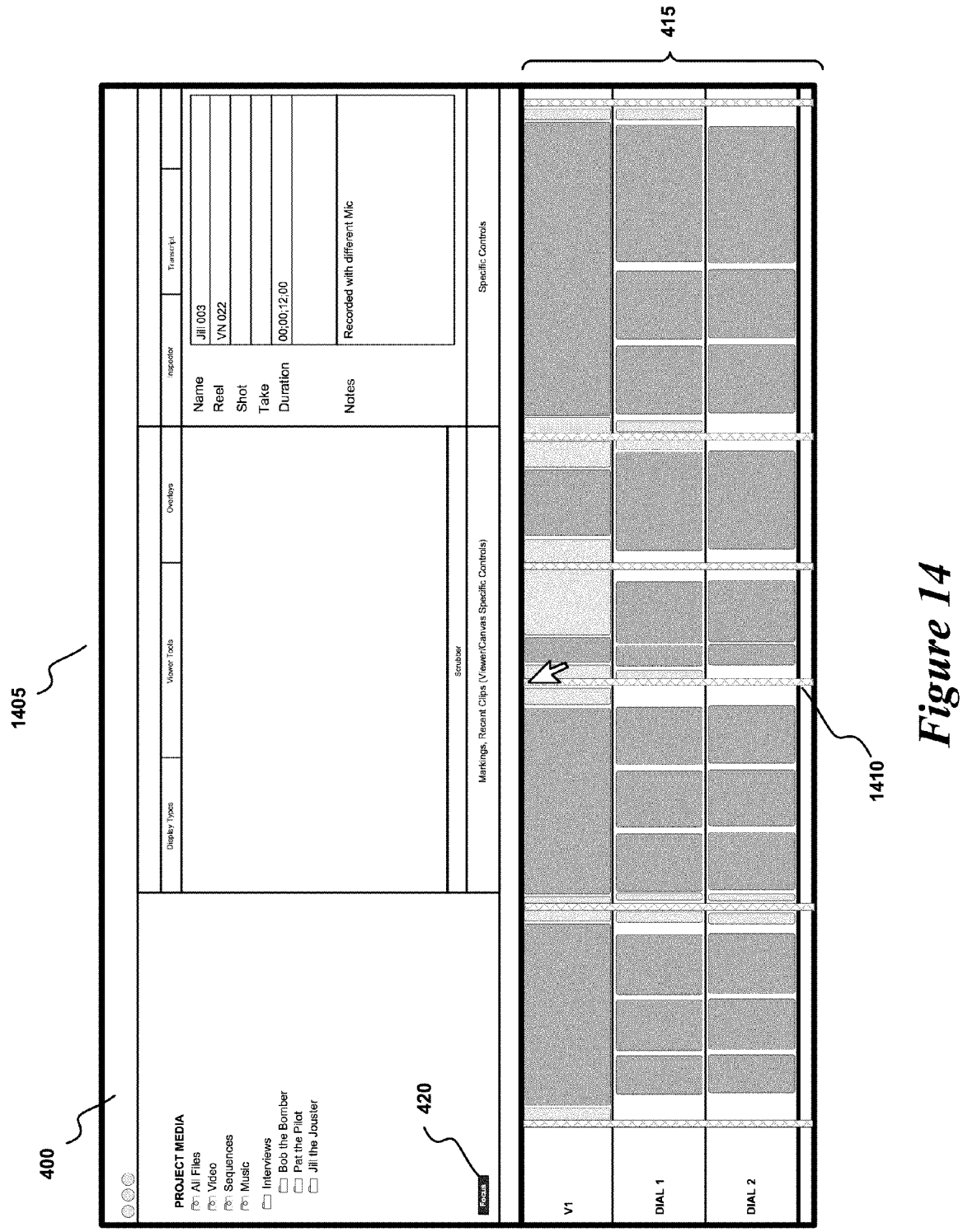
FIG. 14 illustrates a composite display area after a focus feature has been applied on several graphical representations in some embodiments.

For some embodiments of the invention, FIGS. 14-17 illustrate the GUI 400 at different stages during and after the unpacking or enlarging of several clip shapes in the composite display area 415. FIG. 14 illustrates the GUI 400 at a first stage 1405 before the unpacking or enlarging of several clip shapes. In some embodiments, the first stage 1405 of FIG. 14 is a stage that is after the stage 605 that was described above by reference to FIG. 6. In stage 1405, a user positions a cursor over the line 1410 in the set of graphical representations, in order to select this line to unpack the set of graphical representations that it represents.

FIG. 15 illustrates the GUI 400 at a second stage 1505 that is after the selection of a single graphical representation (e.g., line) to unpack or enlarge several clip shapes. The line 1410 of FIG. 14 can be selected by a through a click operation or through a keyboard command in some embodiments. As shown in FIG. 15, the set of clip shapes 550 is unpacked in the composite display area 415 when a user selects the line 1410. This figure further shows that the unpacked set of clip shapes 550 includes a first clip shape 1510, a second clip shape 1515 and a third clip shape 1520. In some instances, as shown in FIG. 15, unpacking collapsed clip shapes includes enlarging shrunk clip shapes.

As further shown in FIG. 15, some embodiments adjust the size of some or all emphasized sets of clip shapes in the composite display area 415 to accommodate the unpacking of the set of clip shapes 550. For example, some embodiments, adjust the size (e.g., reducing the width) of selected clip shapes 1525-1530 and 1540. In addition, some embodiments also adjust the size (e.g., reducing the width) of some or all de-emphasized clip shapes (e.g., clip shape 1535) to make room in the composite display area 415 for clip shapes that have been unpacked or enlarged. Different embodiments will adjust the size of clip shapes differently.

Figure 16:
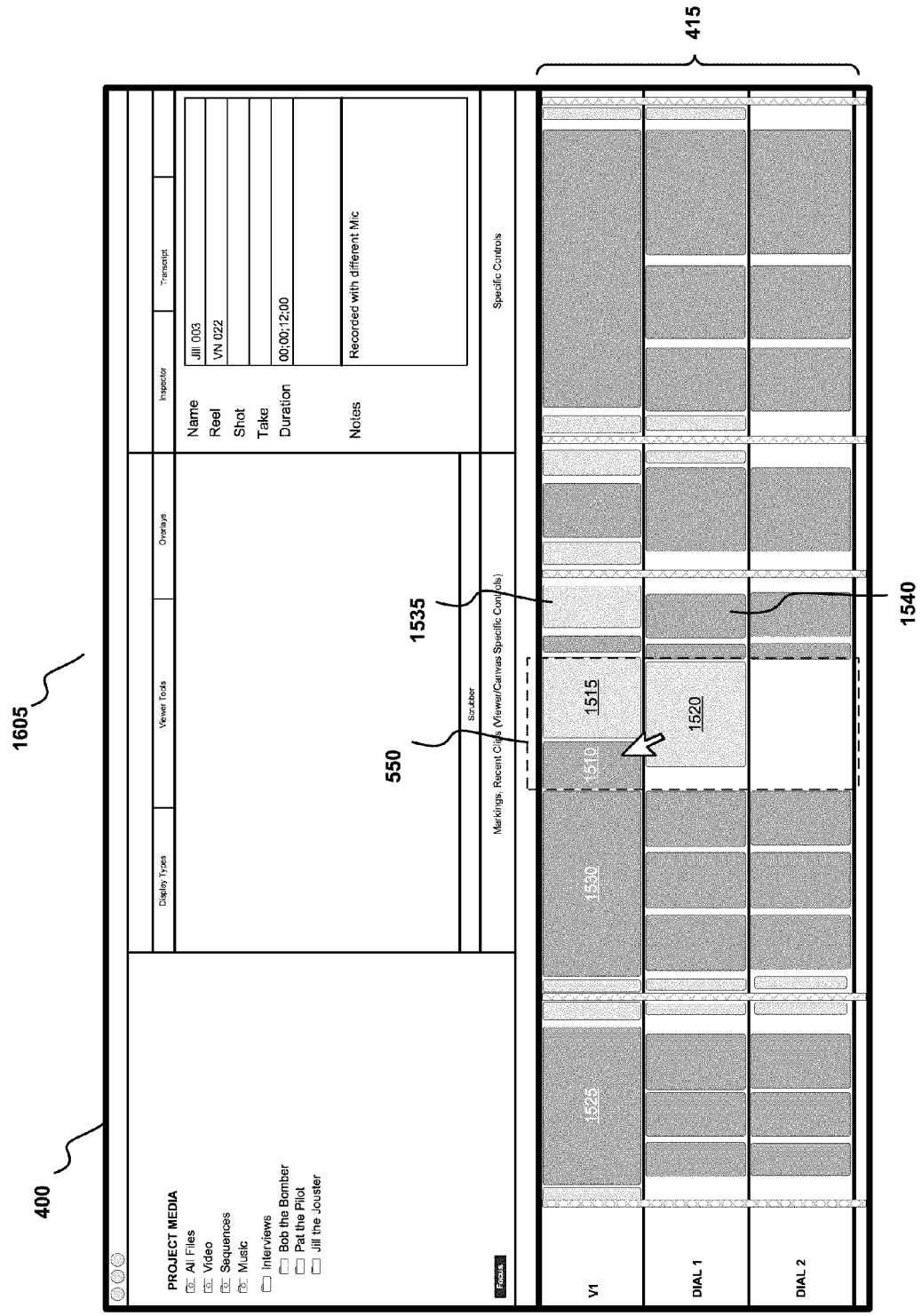
FIG. 16 illustrates a composite display area after a selection of graphical representation in some embodiments.

FIG. 16 illustrates the GUI 400 at a third stage 1605 that is after the selection of clip shape that has been unpacked or enlarged. Specifically, this figure illustrates that the second clip shape 1510 has been selected for focusing (i.e., emphasizing). The selection of the clip shape 1510 is indicated by the darker color of the clip shape 1510 relative to the other clip shapes 1515 and 1520.

Figure 17:
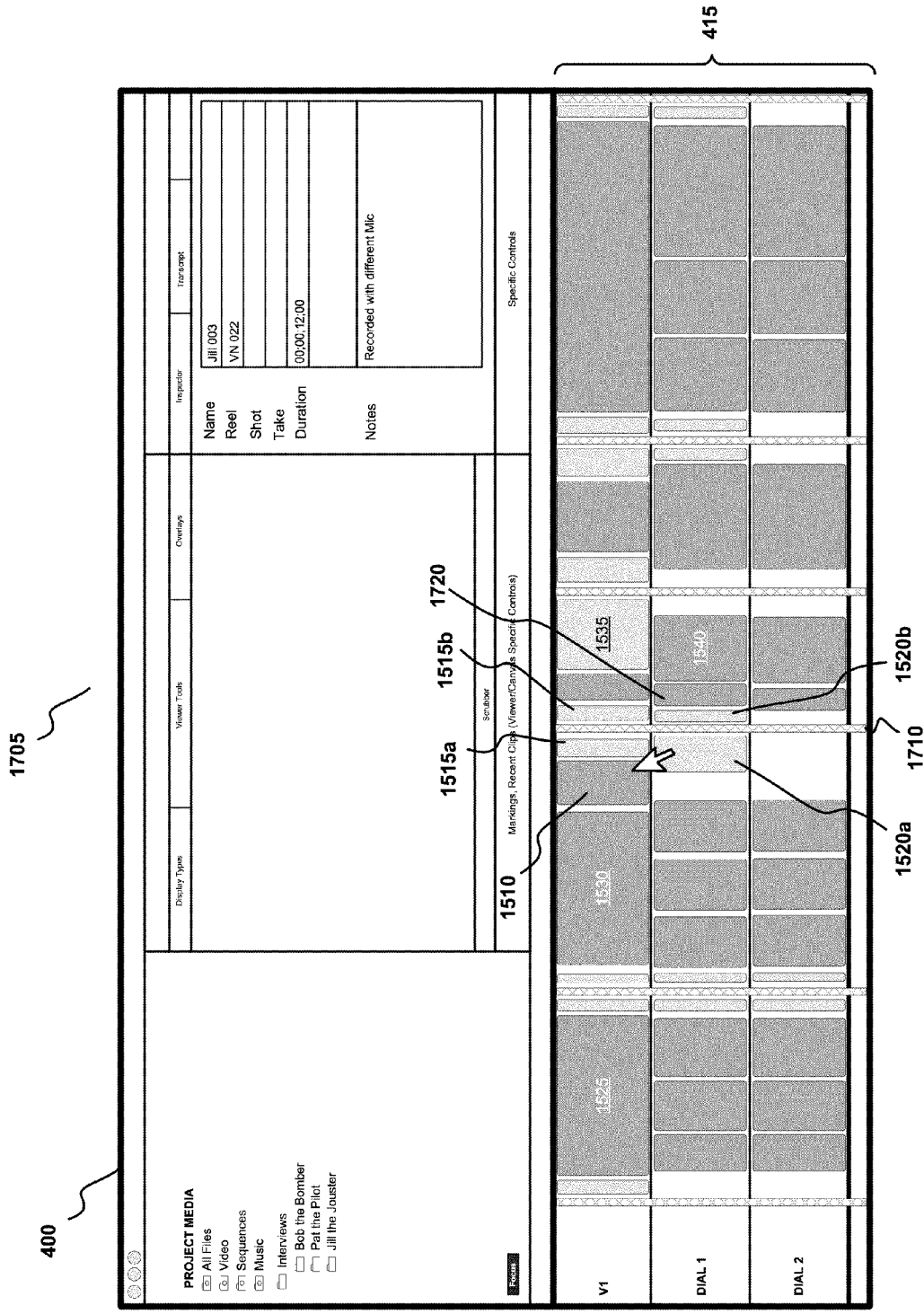
FIG. 17 illustrates a composite display area after a focus feature has been applied on several graphical representations in some embodiments.

FIG. 17 illustrates the GUI 400 in a third stage 1705 after application of the focus feature by the media editing application in some embodiments. In particular, this figure shows the GUI 400 after an unpacked clip shape 1510 has been emphasized. In some embodiments, the unpacked clip shape 1510 is emphasized after a user has selected the focus button 420. In other embodiments, the unpacked clip shape 1510 is emphasized after a focus command that is invoked through one or more keystroke operations is received. As illustrated in this figure, a first portion of the clip shapes 1515 and 1520 are shown after the focus feature is implemented. The first portion of clip shape 1515 is shown as clip shape 1515a and the first portion of clip shape 1520 is shown as clip shape 1520a. The first portion of the clip shapes 1515a and 1520a are shown because they are within a buffer distance of the clip shape 1510 in some embodiments. This figure also illustrates that a second portion of the clip shapes 1515 and 1520 have been collapsed into a line 1710 after the focus operation.

Moreover, FIG. 17 shows that a third portion of clip shapes 1515 and 1520 are shown after the focus operation. The third portion of clip shape 1515 is shown as clip shape 1515b and the third portion of clip shape 1520 is shown as clip shape 1520b. The third portion of the clip shapes 1515b and 1520b are shown because they are within a buffer distance of clip shape 1720 in some embodiments.

As shown in FIG. 17, some of the other clip shapes in the composite display area 415 are adjusted after the selection of the clip shape 1510. In some embodiments, this entails changing (e.g., increasing) the width of some or all of the other clip shapes (e.g., selected and unselected clip shapes) in the composite display area 415. For example, as shown in FIG. 17, the widths of clip shapes 1525-1540 have been increased in size. Although, the widths of other clip shapes in the composite display area 415 can also be increased. In some embodiments, the widths of the clip shapes are increased differently for different clip shapes. Moreover, some embodiments proportionally increase the widths of the clip shapes. For example, in some embodiments, clip shapes that are between two lines (i.e., lines that represent collapsed clip shapes) are all adjusted proportionally. Thus, when one clip shape between two particular lines is adjusted (e.g., reduce or increase size of width), all other clip shapes between the two particular lines are also proportionally adjusted. In some embodiments, a combination of increasing the width of some of the clip shapes and reducing the width of other clip shapes is implemented.

In some cases, a focus operation that is performed after an unpacked clip shape is selected does not change the size of any of the clip shapes in the composite display area. Such a scenario can occur when, the unselected clip shapes are within a buffer distance of any newly selected clip shapes. For example, FIG. 16 illustrates that clip shapes 1515 and 1520 are unselected clip shapes. Assuming that clip shapes 1515 and 1520 are within a buffer distance (e.g., 2 seconds) of selected clip shapes 1510 and 1720, these clip shapes 1515-1520 would not be collapsed at all. Accordingly, after the focus operation, the GUI 400 during a fourth stage would look similar to the GUI in third stage as shown in FIG. 16.

Having described a GUI at several stages of implementing unpacking and focusing on clip shapes in some embodiments, a process for performing unpacking and focusing in a media editing application will now be described in Section B.

B. Process for Unpacking

Figure 18:
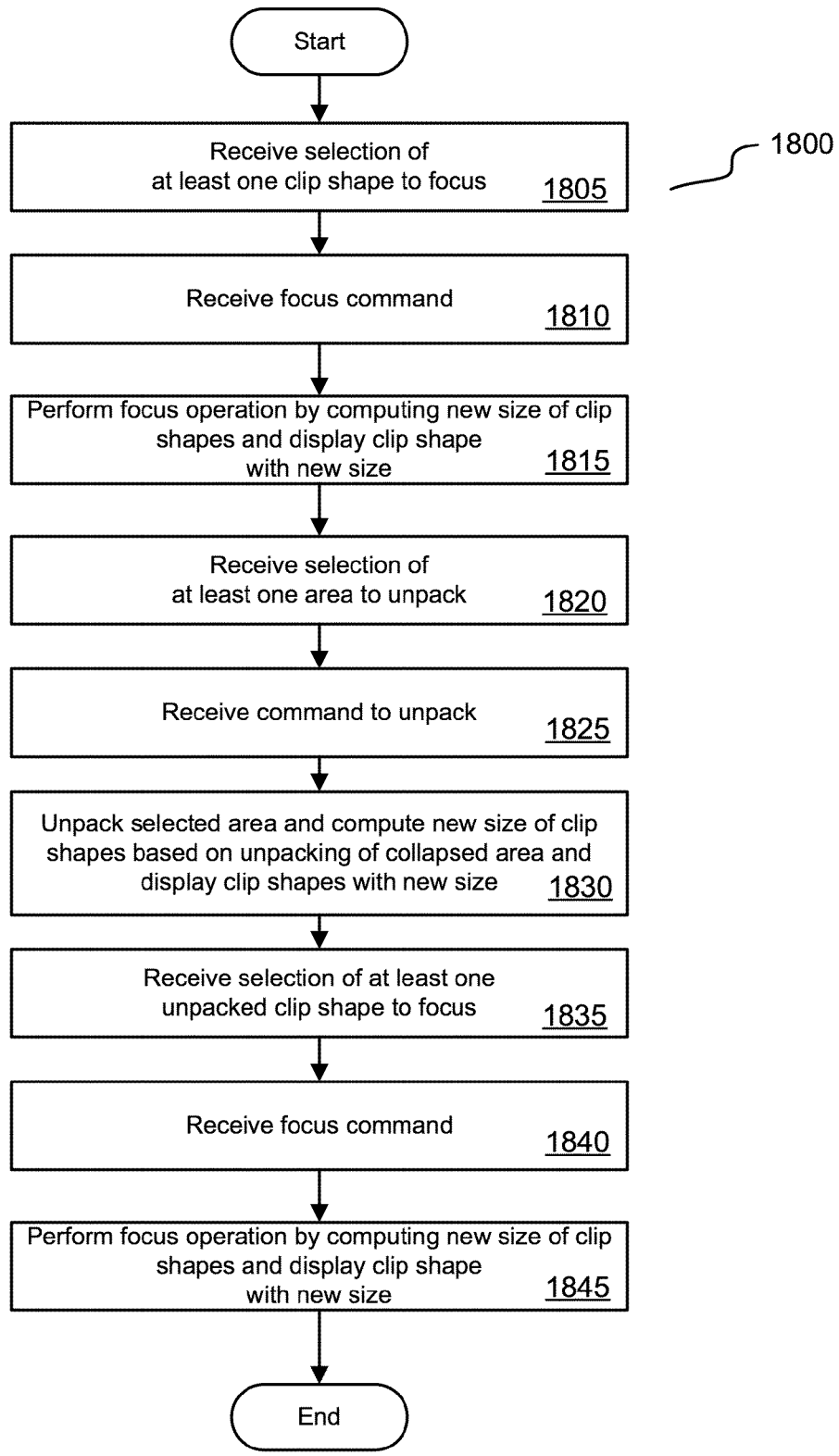
FIG. 18 illustrates a process for unpacking a set of graphical representations in a composite display area in some embodiments.

FIG. 18 illustrates a process 1800 that some embodiments perform to focus and unpack a set of graphical representations in a composite display area of a media editing application. In some embodiments, the process of FIG. 18 starts when a composite project is opened and clip shapes associated with the composite project are displayed in the composite display area. In some embodiments, the process 1800 starts after the focus feature has been enabled when a selection of a focus option is received from a user.

As shown in FIG. 18, the process 1800 receives (at 1805) a selection of at least one clip shape to focus. Different embodiments receive the selection of the clip shapes differently. In some embodiments, the selection is received when a user selects a particular clip shape through a click operation or a double click operation. The selection of several clip shapes is also received when a user selects various clip shapes by a combination of keystroke operation and click operation (e.g., CRTL+click operation).

Next, the process receives (at 1810) the selection of a focus command. In some embodiments, the process receives the focus command when a user selects the focus item 420 of FIG. 4. In addition, the focus command is received in some embodiments, when a set of keystroke operations is received.

After receiving (at 1810) the focus command, the process performs (at 1815) the focus operation. In some embodiments, the focus operation includes computing the new size of clip shapes in the composite display area and displaying these clip shapes with the new size. An example of a focus operation was previously described above with reference to FIG. 13. As shown in FIG. 13, the focus operation includes enlarging selected clip shapes and collapsing unselected clip shapes in some embodiments. Different embodiments collapse the clip shapes differently. For instance, some embodiments collapse all or part of any unselected clip shape that is located away from any selected clip shape by at least a particular temporal distance, while increasing the size of all or part of any unselected clip shape that is within the particular temporal distance (e.g., 2 seconds) of the selected clip shape.

Moreover, some embodiments uniformly shrink the size of the unselected clip shapes. Other embodiments non-uniformly shrink the size of the unselected clip shapes. In still other embodiments, all unselected clip shapes that are adjacent to each other are uniformly collapsed (e.g., packed) into a single graphical representation (e.g., into a single line or bar).

Once the process performs (at 1815) the focus operation, the process receives (at 1820) a selection of at least one area to unpack. In some embodiments, the selection of the area can be performed by selecting a single graphical representation (e.g., line) that is a representation of collapsed clip shapes. FIG. 14 illustrates the selection of a line to unpack an area in the composite display area in some embodiments. In other embodiments, an unselected clip shape can also be selected to unpack an area in the composite display area.

Next, the process receives (at 1825) a command to unpack. Different embodiments receive the command differently. In some embodiments, the command to unpack is one or more keystroke operations. In addition, the command to unpack can be a separate UI item in some embodiments. Moreover, in some embodiments, the command to unpack is the selection of the area (e.g., selection of line that represents the collapsed clip shapes). In such instances, the selection of the area and the command are received (at 1820 and 1825) concurrently. In other words, the selection of a particular line is also the command to unpack in some embodiments.

After receiving (at 1825) the command to unpack, the process unpacks (at 1830) the selected area. In some embodiments, unpacking a particular area includes unpacking clip shapes that have been collapsed after a focus operation. FIG. 15 illustrates the unpacking of clip shapes that were previously collapsed. As shown in this figure, when a particular line is selected, the clip shapes 1510-1520 are unpacked. These clip shapes 1510-1520 were previously collapsed clip shapes.

Different embodiments, unpack the clip shapes differently. In some embodiments, the process unpacks the area or clip shapes by recomputing the size of all the clip shapes based on the unpacked clip shapes. Some embodiments recompute the size of the clip shapes to make room for the unpacked clip shapes. Accordingly, some embodiments shrink the width of all or some of the clip shapes in the composite display area to make room for unpacked clip shapes. Once the clip shapes have been unpacked and the size of the clip shapes have been computed, some embodiments display in the composite display area, the unpacked clip shapes and the clip shapes with the new size. FIG. 15 illustrates that the width of clip shapes 1525-1530 have been shrunk to accommodate the unpacking of the clip shapes 1510-1520. Although the width of other clip shapes can also be shrunk in some embodiments.

Next, the process receives (at 1835) the selection of at least one clip shape to focus, from the unpacked clip shapes. FIG. 16 illustrates an example of the selection of one of these unpacked clip shapes. As shown in this figure, clip shape 1510 has been selected for focusing. After receiving the selection of the clip shape to focus, the process receives (at 1840) the selection of the focus command. In some embodiments, this includes receiving the selection of the focus item 420.

Once the process receives (at 1840) the focus command, the process performs (at 1845) the focus operation and ends. In some embodiments, performing the focus operation entails computing the size of the clip shapes based on the selected clip shapes and displaying the clip shapes with the new size. FIG. 17 illustrates an example of a GUI after the focus operation has been implemented. As shown in this figure, the width of clip shapes 1525-1530 have been increased, since part of the unselected clip shapes 1515-1520 have been collapsed. However, different embodiments, will adjust the size of clip shapes (e.g., selected and unselected clip shapes) differently.

Having describes one approach for unpacking clip shapes after a focus operation, an approach for previewing clip shapes will now be described in Section III.

III. Hover Zoom—Providing a Preview of Collapsed Clip Shapes

As mentioned above, graphical representations that have been collapsed into a line in a composite display area can be unpacked by selecting (e.g., through click selection) the line associated with the graphical representations. In such instances, the size of other graphical representations (e.g., emphasized and de-emphasized graphical representations) in the composite display area is adjusted as well to make room for the unpacked graphical representations.

However, in some instances, it may be preferable to preview enlarged versions of collapsed or shrunk graphical representations (e.g., de-emphasized graphical representations) without affecting the size and/or shape of other graphical representations in the composite display area. Accordingly, some embodiments of the invention provide a feature that automatically presents a preview of a set of de-emphasized graphical representations without affecting the size and/or shape of other graphical representations in the composite display area. In other words, some embodiments provide a feature that allows for the previewing of enlarged versions of collapsed or shrunk graphical representations without actually unpacking the de-emphasized graphical representations in the composite display area. In some embodiments, after the previewing of the packed graphical representations, one or more previewed graphical representation can be unpacked. Thus, the preview feature can be used in addition, or in conjunction with the unpacking feature in some embodiments. The following Section A describes in detail examples of providing a preview of de-emphasized clip shapes in some embodiments. Section B then describes a process for providing a preview of de-emphasized clip shapes.

A. Examples

For some embodiments of the invention, FIGS. 14 and 19-21 illustrate the GUI 400 at different stages of previewing and unpacking several clip shapes. In some embodiments, FIG. 14 illustrates the GUI 400 at a first stage 1405 before the previewing of several clip shapes. In some embodiments, the first stage 1405 of FIG. 14 is a stage that is after stage 605 of FIG. 6. As shown in FIG. 14, a cursor is positioned over the set of graphical representations 620. The set of graphical representation includes the line 1410. In some embodiments, the user selects the line 1410 to preview the set of graphical representations 620. The line 1410 can be selected by a click operation or through a keyboard command in some embodiments. In other embodiments, the line 1410 is automatically selected whenever the cursor is positioned over the line. In such instances, a preview is automatically provided when the cursor is moved over the line 1410.

Figure 19:
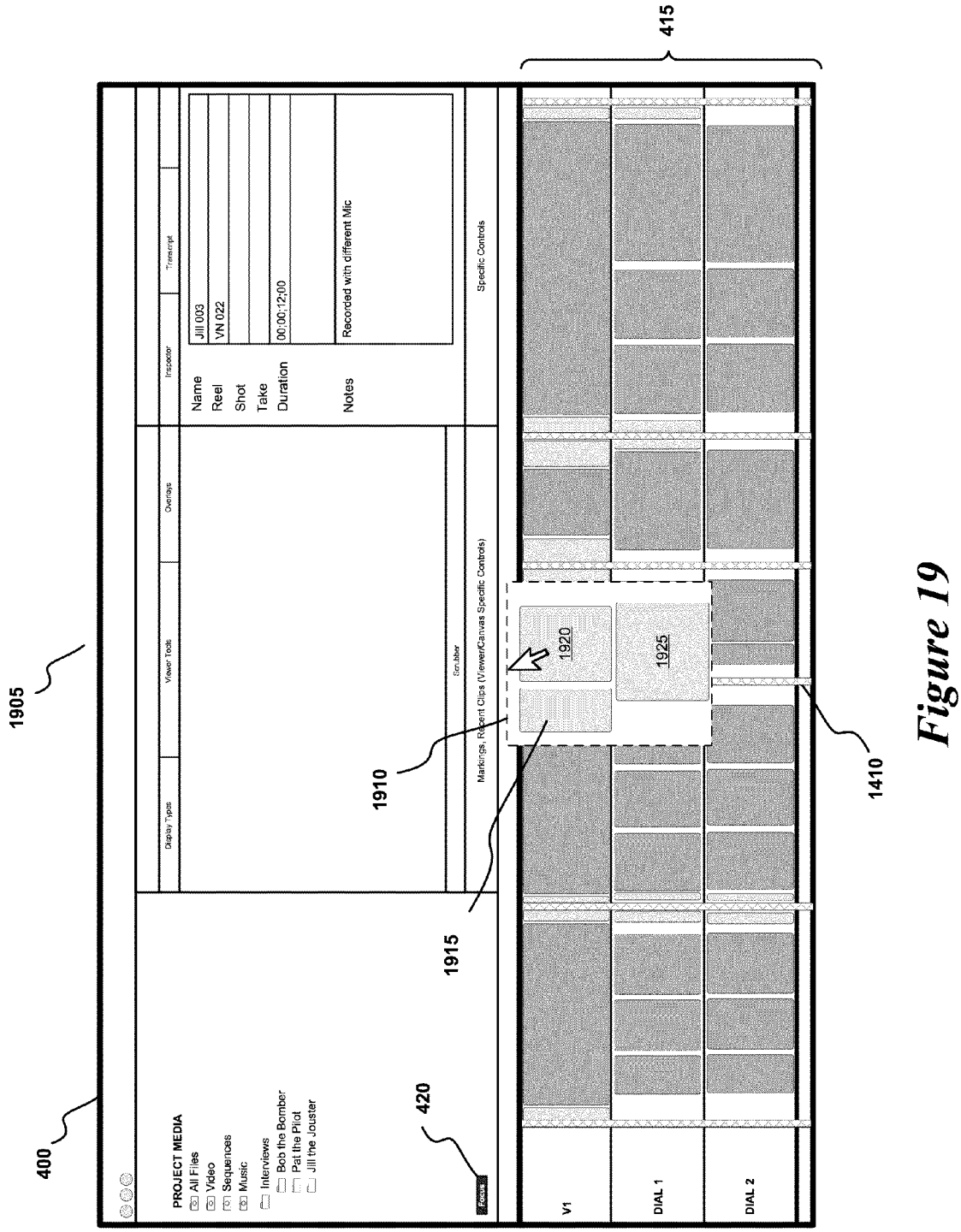
FIG. 19 illustrates a composite display area with a preview of collapsed graphical representations in some embodiments.

FIG. 19 illustrates the GUI 400 at a second stage 1905 that is after a display of a preview area of collapsed or shrunk clip shapes. As shown in FIG. 19, when a user moves a cursor over the line 1410, a preview area 1910 that includes a set of clip shapes is provided. In some embodiments, the preview area 1910 is a representative view of the set of clip shapes 550. As further shown in this figure, the set of clip shapes 550 includes a first clip shape 1915, a second clip shape 1920 and a third clip shape 1925. In some embodiments, the size of the set of clip shapes 550 in the preview area 1910 can be their size before the focus operation. Alternatively, the size of the set of clip shapes 550 in the preview area 1910 can be the size that the set of clip shapes 550 would have if the set of clip shapes 550 were selected for focusing in some embodiments. For example, the size of the set of clip shapes 550 would the size of the clip shapes 550 multiplied by the same factor used for enlarging clip shapes that were emphasized in the composite display area. In some embodiments, the representative view of the set of clip shapes 550 does not affect the size of other clip shapes in the composite display area 415.

Figure 20:
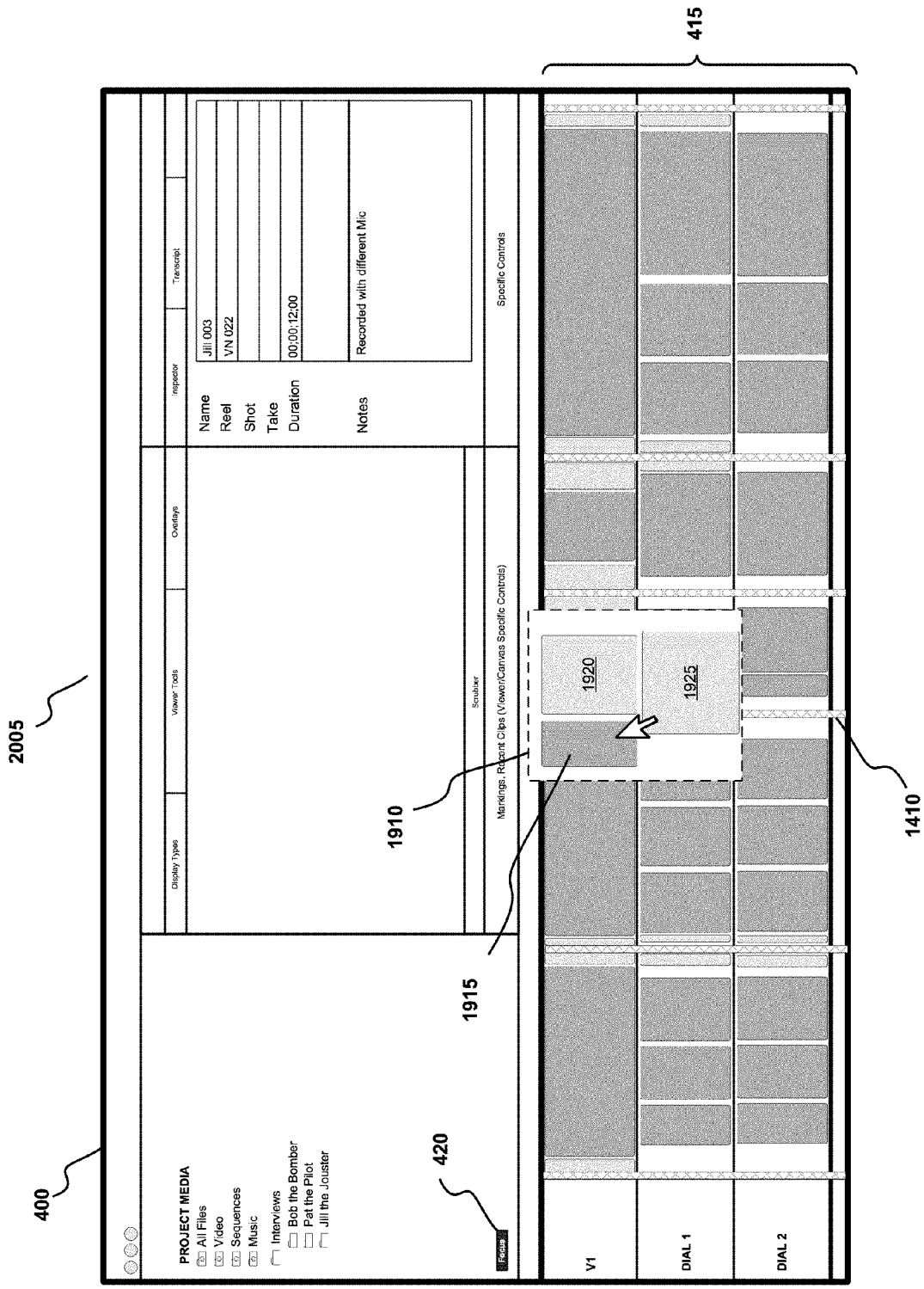
FIG. 20 illustrates a composite display area with a selection of graphical representation in a preview area in some embodiments.

FIG. 20 illustrates the GUI 400 at a third stage 2005 that is after the selection of a clip shape in the preview area. Specifically, this figure illustrates that the second clip shape 1915 has been selected (e.g., through a click selection) for focusing (i.e., emphasizing). The selection of the clip shape 1915 is indicated by the shading of the clip shape 1915 relative to the other previewed clip shapes 1920 and 1925.

Figure 21:
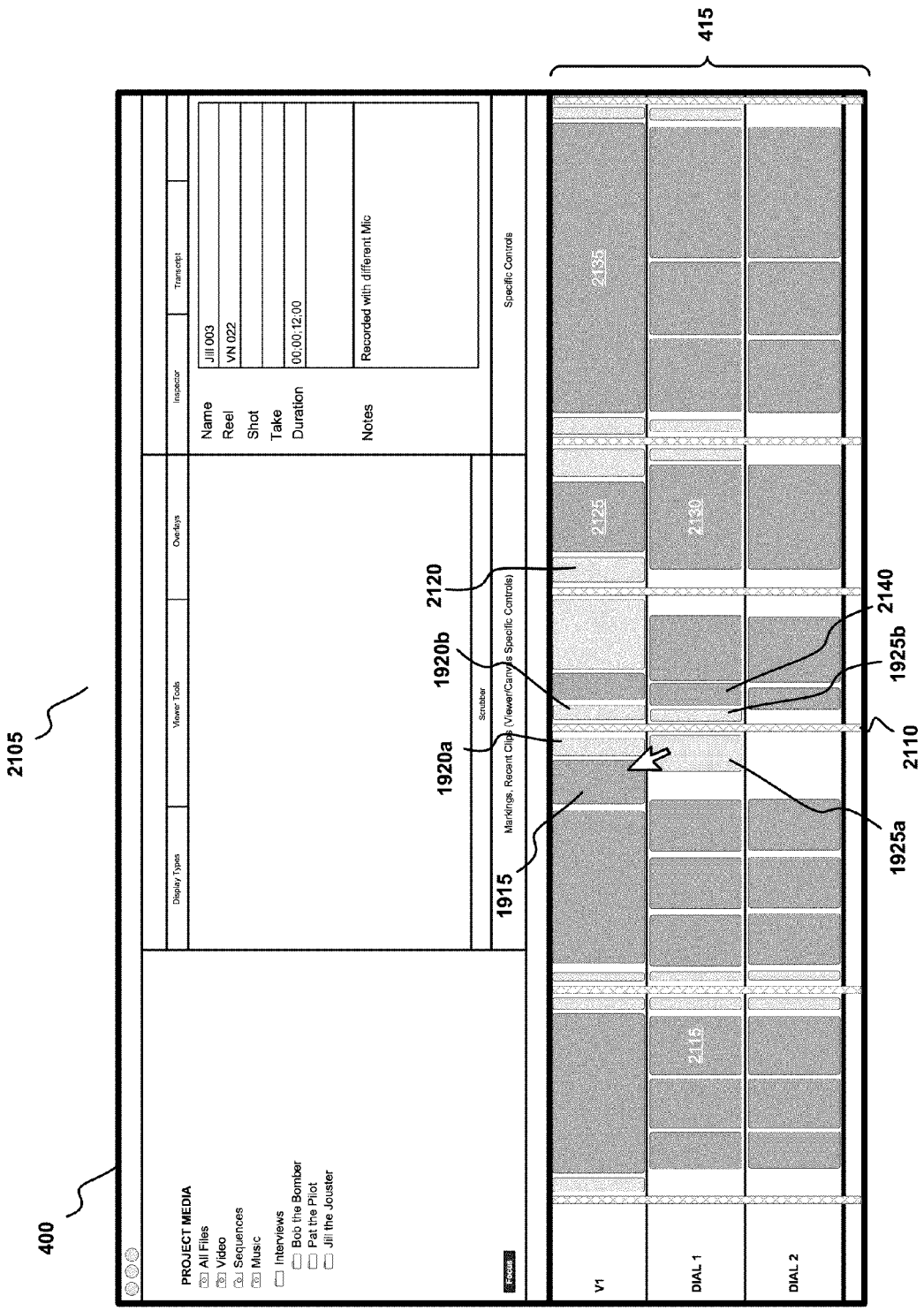
FIG. 21 illustrates a composite display area after a focus feature has been applied on several graphical representations in some embodiments.

FIG. 21 illustrates the GUI 400 in a fourth stage 2105 after the application of the focus feature by the media editing application in some embodiments. In particular, this figure shows the GUI 400 after a previewed clip shape 1915 has been emphasized. In some embodiments, the previewed clip shape 1915 is emphasized after a user has selected the focus button 420. In other embodiments, the clip shape is emphasized after a focus command that is invoked through one or more keystroke operation is received.

As illustrated in this figure, a first portion of the clip shapes 1920 and 1925 are shown after the focus feature is implemented. The first portion of clip shape 1920 is shown as clip shape 1920a and the first portion of clip shape 1925 is shown as clip shape 1925a. The first portion of the clip shapes 1920a and 1925a are shown because they are within a buffer distance of the clip shape 1915.

FIG. 21 also illustrates that a second portion of the clip shapes 1920 and 1925 have been collapsed into a line 2110 after the focus operation. Moreover, FIG. 21 shows that a third portion of clip shapes 1920 and 1925 are shown after the focus operation. The third portion of clip shape 1920 is shown as clip shape 1920b and the third portion of clip shape 1925 is shown as clip shape 1925b. The third portion of the clip shapes 1920b and 1925b are shown because they are within a buffer distance of the clip shape 2140.

As shown in FIG. 21, some of the other clip shapes in the composite display area 415 are adjusted in order to make room for the selected clip shape 1915 in the composite display area 415. In some embodiments, this entails changing the width of some or all of the other clip shapes (e.g., selected and unselected clip shapes) in the composite display area 415. For example, as shown in FIG. 21, the widths of (1) selected clip shapes 2115 and 2125-2135 and unselected clip shapes 2120 have been reduced in size. Although, the widths of other clip shapes in the composite display area 415 can also be reduced. In some embodiments, the widths of the clip shapes are reduced differently for different clip shapes. Moreover, some embodiments proportionally reduce the widths of the clip shapes. For example, in some embodiments, clip shapes that are between two lines (i.e., lines that represent collapsed clip shapes) are all adjusted proportionally. Thus, when one clip shape between two particular lines is adjusted (e.g., reduce or increase size of width), all other clip shapes between the two particular lines are also proportionally adjusted.

Having described a GUI at several stages of implementing previewing, unpacking and focusing on clip shapes in some embodiments, a process for previewing, unpacking and focusing in a media editing application will now be described in Section B.

B. Process for Providing a Preview

Figure 22:
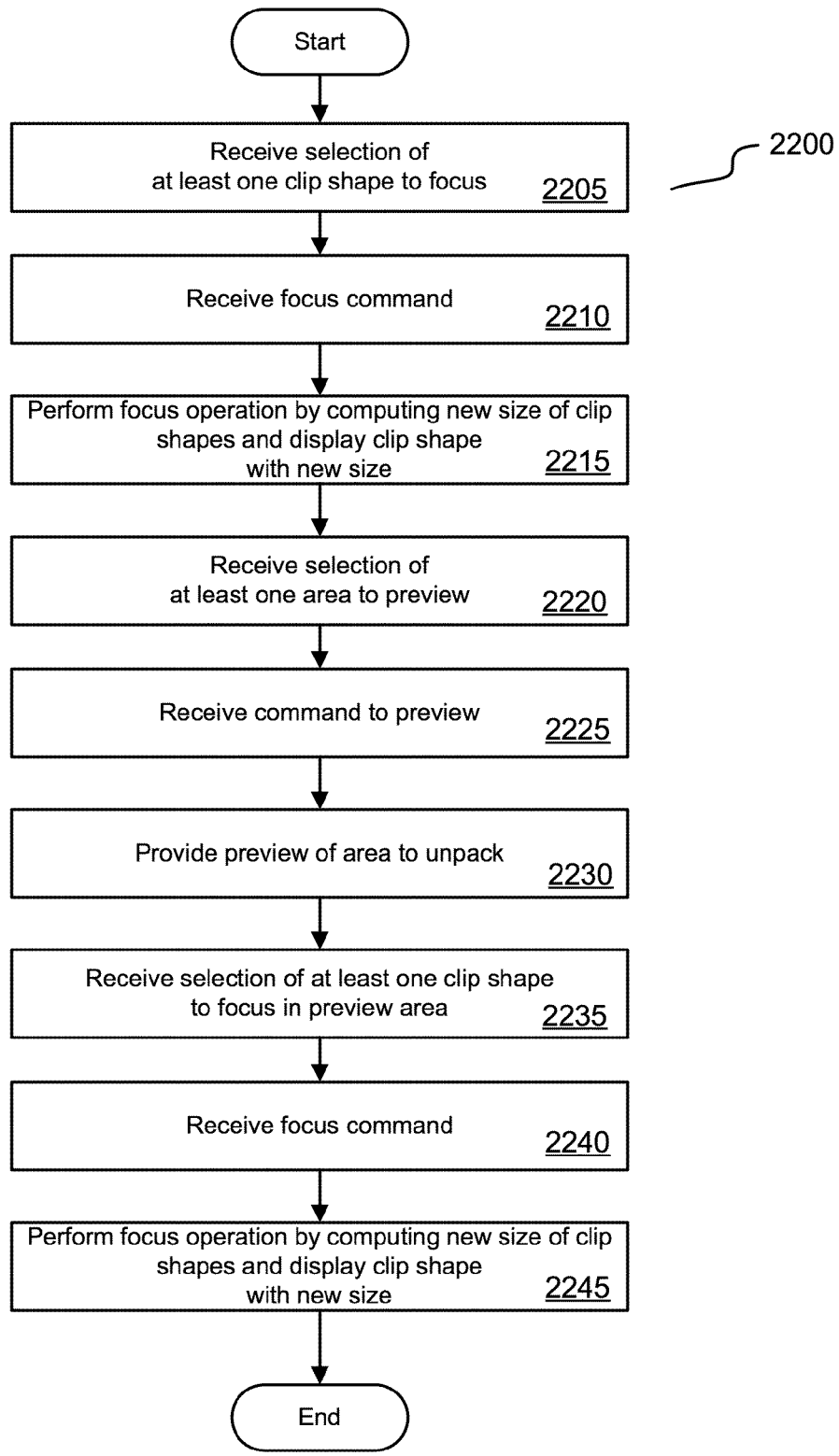
FIG. 22 illustrates a process for providing a preview in some embodiments.

FIG. 22 illustrates a process 2200 that some embodiments perform to focus on clip shapes and provide a preview a de-emphasized first set of graphical representations in a composite display area of a media editing application. In some embodiments, the process of FIG. 22 starts when a composite project is opened and clip shapes associated with the composite project are displayed in the composite display area. In some embodiments, the process 1800 starts after the focus feature has been enabled when a selection of a focus option is received from a user. In some embodiments, FIG. 22 is similar to FIG. 18, except for 1820-1835. As shown in FIG. 22, the process 2200 receives (at 2205) a selection of at least one clip shape to focus. Different embodiments receive the selection of the clip shapes differently. In some embodiments, the selection is received when a user selects a particular clip shape through a click operation or a double click operation. The selection of several clip shapes is also received when a user selects various clip shape by a combination of keystroke operation and click operation (e.g., CRTL+click operation).

Next, the process receives (at 2210) the selection of a focus command. In some embodiments, the process receives the focus command when a user selects the focus item 420 of FIG. 4. In addition, the focus command is received in some embodiments, when a set of keystroke operations is received.

After receiving (at 2210) the focus command, the process performs (at 2215) the focus operation. In some embodiments, the focus operation includes computing the new size of clip shapes in the composite display area and displaying these clip shapes with the new size. An example of a focus operation was previously described above with reference to FIG. 13. As shown in FIG. 13, the focus operation includes enlarging selected clip shapes and collapsing unselected clip shapes in some embodiments.

Different embodiments collapse the clip shapes differently. For instance, some embodiments collapse all or part of any unselected clip shape that is located away from any selected clip shape by at least a particular temporal distance, while increasing the size of all or part of any unselected clip shape that is within the particular temporal distance (e.g., 2 seconds) of the selected clip shape.

Moreover, some embodiments uniformly shrink the size of the unselected clip shapes. Other embodiments non-uniformly shrink the size of the unselected clip shapes. In still other embodiments, all unselected clip shapes that are adjacent to each other are uniformly collapsed (e.g., packed) into a single graphical representation (e.g., into a single line or bar).

Once the process performs (at 2215) the focus operation, the process receives (at 2220) a selection of at least one area to preview. In some embodiments, the selection of the area can be performed by selecting a single graphical representation (e.g., line) that is a representation of collapsed clip shapes. In some embodiments, the selection is received (at 2215) when a cursor is positioned over the area or line and a set of keystroke operation is received.

Next, the process receives (at 2225) a command to preview a collapsed area. Different embodiments receive the command differently. In some embodiments, the command to preview is one or more keystroke operations. In addition, the command to preview can be a received through a separate UI item in some embodiments. Moreover, in some embodiments, the command to preview is the selection of the area (e.g., selection of line that represents the collapsed clip shapes). In such instances, the selection of the area and the command are received (at 2220 and 2225) concurrently. In other words, when a particular line is selected, the selection of the particular line is also the command to preview in some embodiments. For example the selection and command are concurrently received when a cursor is positioned over the line or area that is collapsed in some embodiments.

After receiving (at 2225) the command to preview, the process provides (at 2230) a preview area that includes unpacked clip shapes. In some embodiments, the preview area is similar to the preview area 1920 as described in FIG. 19. The preview area allows a user to view a collapsed area without having to unpack the collapsed clip shapes. Accordingly, the size of the other clip shapes in the composite display area does not need to be adjusted.

Next, the process receives (at 2235) the selection of at least one clip shape to focus, from the clip shapes in the preview area. FIG. 20 illustrates an example of the selection of one of these clip shapes in a preview area. As shown in this figure, the clip shape 1915 has been selected for focusing. After receiving the selection of the clip shape to focus, the process receives (at 2240) the selection of the focus command. In some embodiments, this includes receiving the selection of the focus item 420.

Once the process receives (at 2240) the focus command, the process performs (at 2245) the focus operation and ends. In some embodiments, performing the focus operation entails computing the size of the clip shapes based on the selected clip shapes and displaying the clip shapes with the new size. FIG. 21 illustrates an example of a GUI after the focus operation has been implemented. As shown in this figure, the width of clip shapes 2115-2135 have been decreased, since clip shape 1915 has been expanded. However, different embodiments, will adjust the size of clip shapes (e.g., selected and unselected clip shapes) differently. In some embodiments, none of the sizes of the clip shapes are adjusted after a focus operation.

IV. Focusing Based on Track Selection

In the previous sections, the graphical representations in the composite display area are selected by directly selecting the graphical representation (i.e., directly selecting the clip shapes in the composite display area). However, in some instances, it may be more practical for a user to select tracks than graphical representations. Alternatively, some users may prefer to focus on a particular track than on one particular graphical representation. Accordingly, some embodiments of the invention allow user to indirectly select one or more graphical representations by selecting a track. Such examples of track selection will now be described in Section A. Section B then describes a process for emphasizing clip shapes by selecting a track.

A. Examples

Figure 23:
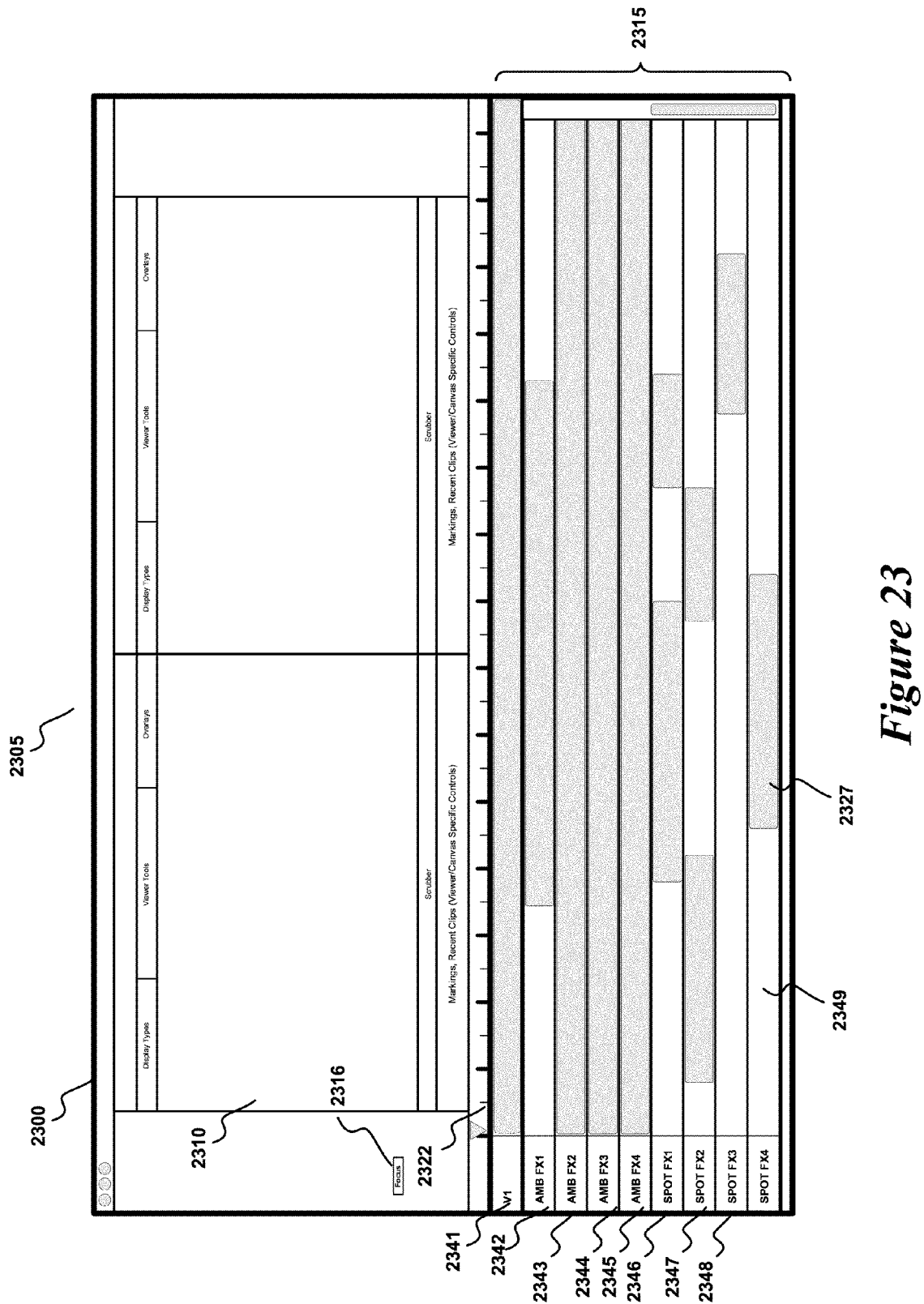
FIG. 23 illustrates a GUI that includes a composite display area in some embodiments.
Figure 24:
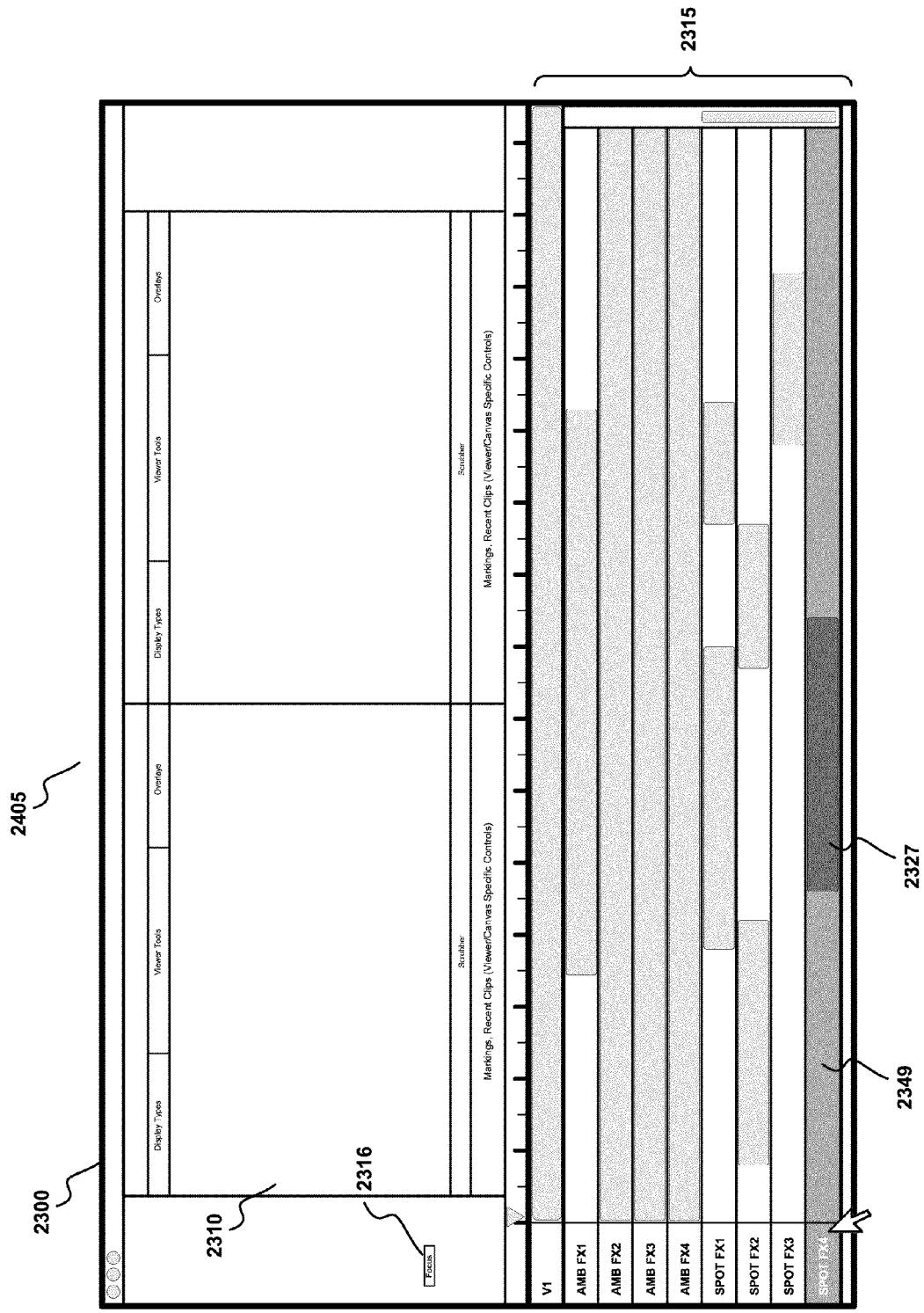
FIG. 24 illustrates a composite display area with one track selected in some embodiments.
Figure 25:
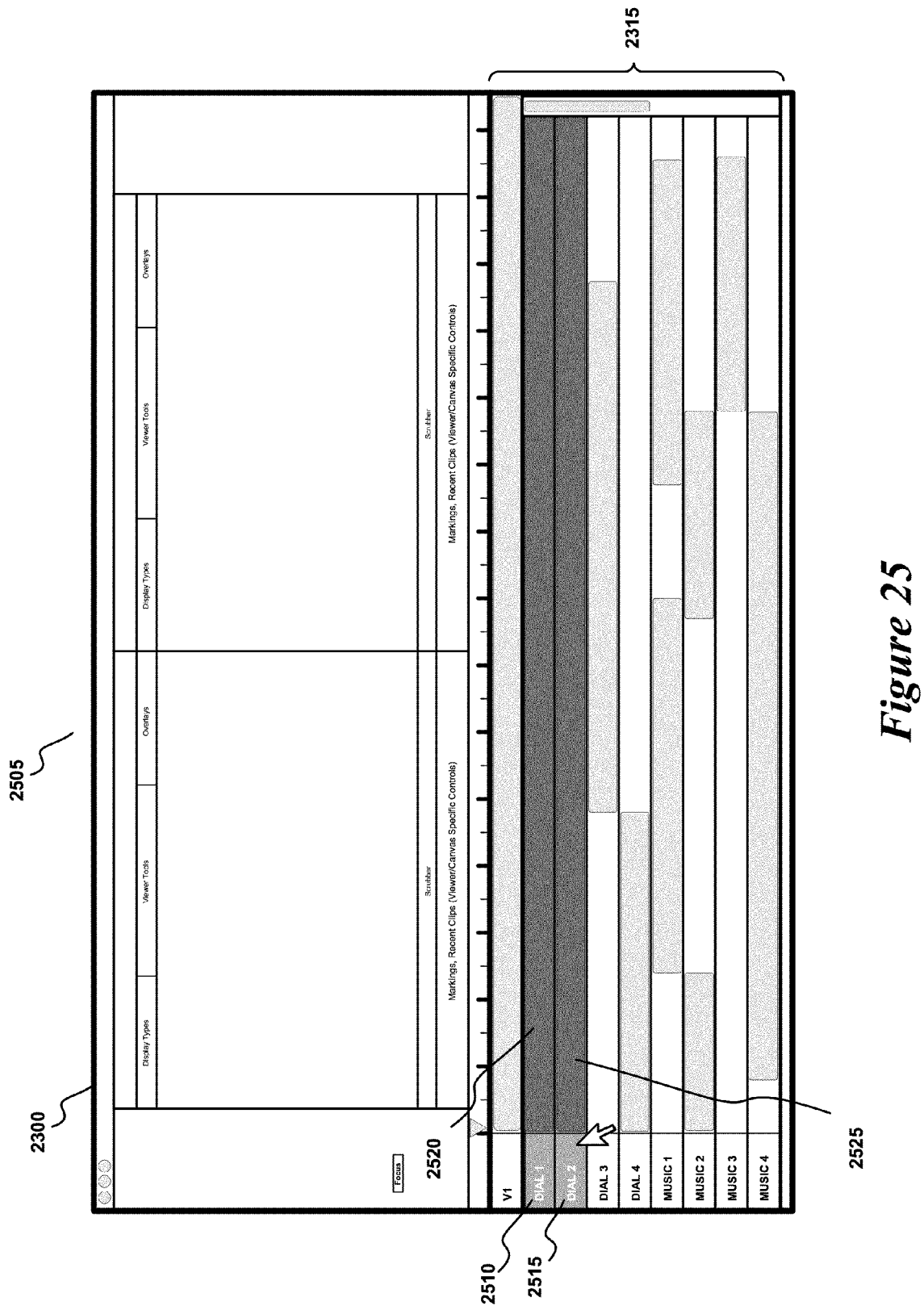
FIG. 25 illustrates a composite display area with other tracks selected in some embodiments.
Figure 26:
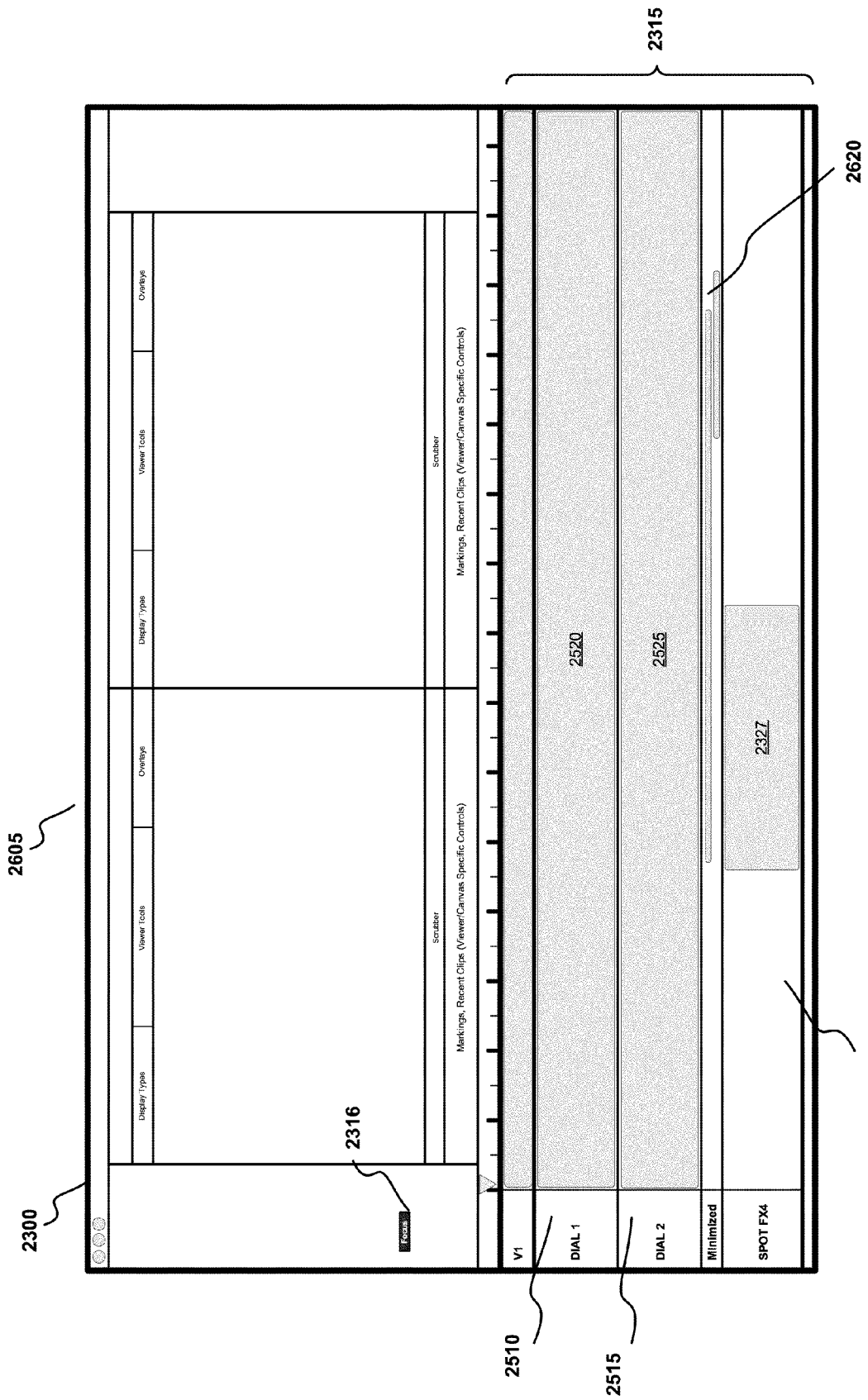
FIG. 26 illustrates a composite display area after a focus feature has been applied on several graphical representations associated with selected tracks in some embodiments.

For some embodiments of the invention, FIGS. 23-26 illustrate a GUI 2300 of a media editing application with such a focus feature at four different stages. FIG. 23 illustrates the GUI 2300 at a first stage 2305 that is before a selection of a track. FIG. 24 illustrates the GUI 2300 at a second stage 2405 that is after a selection of a first track. FIG. 25 illustrates the GUI 2300 at a third stage 2505 that is after the selection of several other tracks. FIG. 26 illustrates the GUI 2300 at a fourth stage 2605 that is after an application of a focus feature by the media editing application.

As shown in FIG. 23, the GUI 2300 includes a display area 2310, a composite display area 2315 and a focus UI item 2316. The display area 2310 displays a preview of a composite presentation that the application creates by compositing several media clips. The composite display area 2315 provides a visual representation of the composite presentation being created by the user. Specifically, it displays one or more clip shapes representing one or more media clips that are part of the composite presentation. In the example illustrated in FIG. 23, the composite display area 2315 is an area that includes multiple tracks 2341-2349 that span a timeline 2322. Each track can hold one or more clip shapes. For example, the track 2349 holds a clip shape 2327. Each track also has a track header that identifies the track. For example, the track header would be the region that indicates the name (e.g., AMB FX1, SPOT FX1) of the track in some embodiments.

The focus UI item 2316 is a conceptual illustration of one or more UI item that allows the media editing application to implement its focus feature for emphasizing a first subset of clip shapes over a second subset of clip shapes in the composite display area 2315. Different embodiments of the invention implement this UI item differently. Some embodiments implement it as a focus UI button, others as a focus command that can be selected in a pull-down or drop-down menu, and still others as a focus command that can be invoked through one or more keystroke operations. Yet other embodiments allow the user to access the focus feature through two or more of such UI implementations or other UI implementations.

The operation of the GUI 2300 will now be described by reference to the state of the GUI during the first, second third and fourth stages 2305, 2405, 2505 and 2605 that are illustrated in FIGS. 23-26. FIG. 23 illustrates the GUI 2300 in the first stage 2305. As shown in this figure, the composite display area 2315 displays clip shapes on several tracks 2341-2349 defined along the timeline 2322. These clip shapes represent media clips that are being composited to form a composite presentation.

FIG. 24 illustrates the GUI 2300 in the second stage after the selection of the first track 2349. As shown in this figure, the selection of the first track 2349 is illustrated by the shading of the background area of the first track 2349. In some embodiments, the selection of the first track 2349 is done by selecting (e.g., through a cursor) the track head of the first track 2349 (i.e., by selecting track head "SPOT FX4"). As previously mentioned, the first track 2349 includes a clip shape 2327. Accordingly, the clip shape 2327 is indirectly selected when the first track 2349 is selected in some embodiments.

FIG. 25 illustrates the GUI 2300 in the third stage 2505 after the selection of other tracks. Specifically this figure the selection of tracks 2510-2515 through their respective track heads (i.e., through cursor selection of "DIAL 1" and "DIAL 2"). Both tracks 2510-2515 have been selected, as indicated by the shading of these tracks 2510-2515. The track 2510 has a clip shape 2520 and the track 2515 has a clip shape 2525. When the tracks 2510-2515 are selected, the clip shapes 2520-2525 are indirectly selected.

FIG. 26 illustrates the GUI 2300 in the fourth stage 2605 after the application of the focus feature by the media editing application in some embodiments. Specifically, the GUI 2300 in FIG. 26 illustrates the composite display area 2315 after the selection of the focus UI item 2316 by a user. The selection of the focus UI item 2316 is illustrated through the shading of the focus UI item 2316 in some embodiments. As shown in FIG. 26, the selection of the UI item 2316 results in the enlarging of clip shapes 2327 and 2520-2525.

In addition to showing the enlarging of clip shapes through the selection of a track, FIG. 26 further shows the collapsing of several tracks into a single track 2620. In some embodiments, the collapsed track 2620 represents all tracks between the track 2349 and the track 2515. As shown in this figure, the track 2620 includes several clip shapes. These clip shapes represent collapsed clip shapes on tracks that have not been selected for emphasizing in some embodiments.

In some embodiments, tracks can also be selected by using a window, such as a drop down or pop-up menu window, that provides a list of tracks. In some embodiments, a user can select tracks on this list. One advantage of using a window is that it allows a user to select tracks that are not displayed in the composite display area 2315. Without the menu, if a user wanted to select a particular track that is not displayed in the composite display area 2315, the user would have to scroll up or down the composite display area 2315 until the desired track is displayed. Thus, with the window, a user can efficiently select tracks to focus on without having to scroll back and forth in the composite display area 2315.

Having described a GUI at several stages of implementing a focus feature of some embodiments, a process for performing a focus operation by selecting a track will now be described in Section B.

B. Process for Selecting Track

Figure 27:
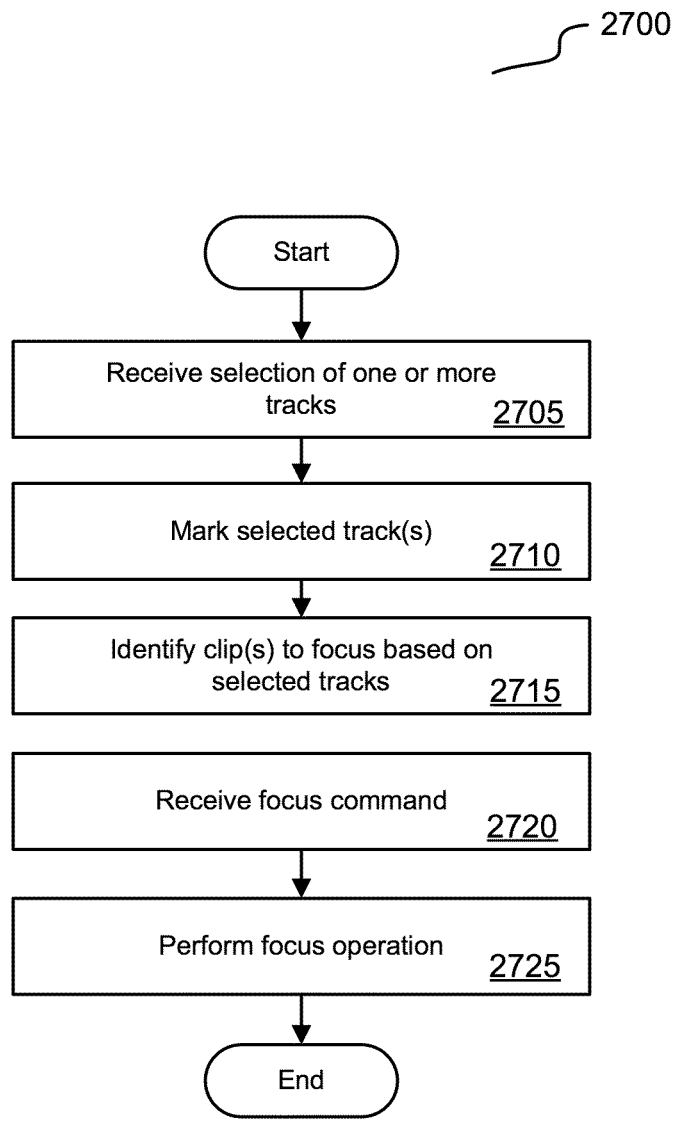
FIG. 27 illustrates a process for focusing based on a track selection in some embodiments.

FIG. 27 illustrates a process 2700 that some embodiments perform to focus on a first set of graphical representations in a composite display area of a media editing application. In some embodiments, the process of FIG. 27 starts when a user enables the focus feature in the media editing application (e.g., by selecting a focus option). As shown in FIG. 27, the process 2700 receives (at 2705) the selection of one or more tracks on a composite display area (e.g., timeline). FIG. 24 illustrates the selection of track 2349 (as indicated by the darker shade of track 2349) in some embodiments. As shown in this figure the selection of the track is performed by selecting the track head of the track 2349. In this example, the track head is the area of the track that is shown with the text "SPOT FX4". However, other embodiments can select the track by selecting other parts of the tracks. In addition, a track can be selected by selecting a clip shape that is on the track in some embodiments. FIG. 25 illustrates another example of selecting tracks in some embodiments. As shown in this example, tracks 2510-2515 have been selected (as indicated by the darker shade of the tracks relative to other tracks in the composite display area). FIG. 25 does not illustrate the selected track 2349 because a scroll tool was used to scroll up the composite display area.

After receiving (at 2705) the selection of the tracks, the process marks (at 2710) the track as a selected track. In some embodiments, marking (at 2710) the track includes providing a visual indication that the track has been selected. For example, some embodiments highlight the particular selected track with a different color (e.g., shading), such as shown and previously described by reference to FIG. 24.

Next, the process identifies (at 2715) clip shapes to focus based on the selected tracks. In some embodiments, the clip shapes that are identified for focusing are the clip shapes that are on the tracks that are selected. FIGS. 23 and 25 illustrate examples of clip shapes that are identified for focusing.

Next, the process receives (at 2720) a focus command. In some embodiments, the focus command is received by the process when a user selects the focus item 420. In some embodiments, the focus command is received when one or more keystroke operations are performed by the user.

After receiving (at 2720) the focus command, the process performs (at 2725) the focus operation on the identified clip shapes and ends. Different embodiments perform the focus operation differently. Some embodiments enlarge the identified clip shapes while collapsing any unselected track. In some embodiments, performing the focus operation includes displaying the enlarged clip shapes and collapsed unselected tracks. FIG. 26 illustrates an example of a GUI after the focus operation in some embodiments. As shown in this figure, the clip shapes 2327 and 2520-2525 are enlarged, while all unselected tracks have been collapsed.

The process 2700 describes indirectly selecting a clip shape for focusing through the selection of a track. The previously described processes 1200, 1800 and 2200 of FIGS. 12, 18 and 22 describes selecting clip shapes directly in order to perform a focus operation. However, one of ordinary skill in the art will realize that some embodiments will allow a user to select clip shapes for performing a focus operation through both a direct selection method (e.g., as illustrated by process 1200 and examples in FIGS. 4-6) and an indirect selection method that is illustrated by process 2700 and examples in FIGS. 24-26. Once the focus operation has been performed a user can work on creating the composite multimedia presentation, such as editing the multimedia clips by modifying the graphical representations. However, before describing the editing of the multimedia clips, Section V will describe a playback feature of a media editing application in some embodiments.

V. Playback After Focus Operation

In some instances, a user may want to preview how clip shapes will look and sound. A playback feature of a media editing application allows a user to preview clip shapes in the display area 410. In some embodiments, the playback feature can implemented while the focus feature is still in effect. In other words, even when clip shapes are collapsed or enlarged, some embodiments allow a user to playback clips that are on the composite display area 415.

Figure 28:
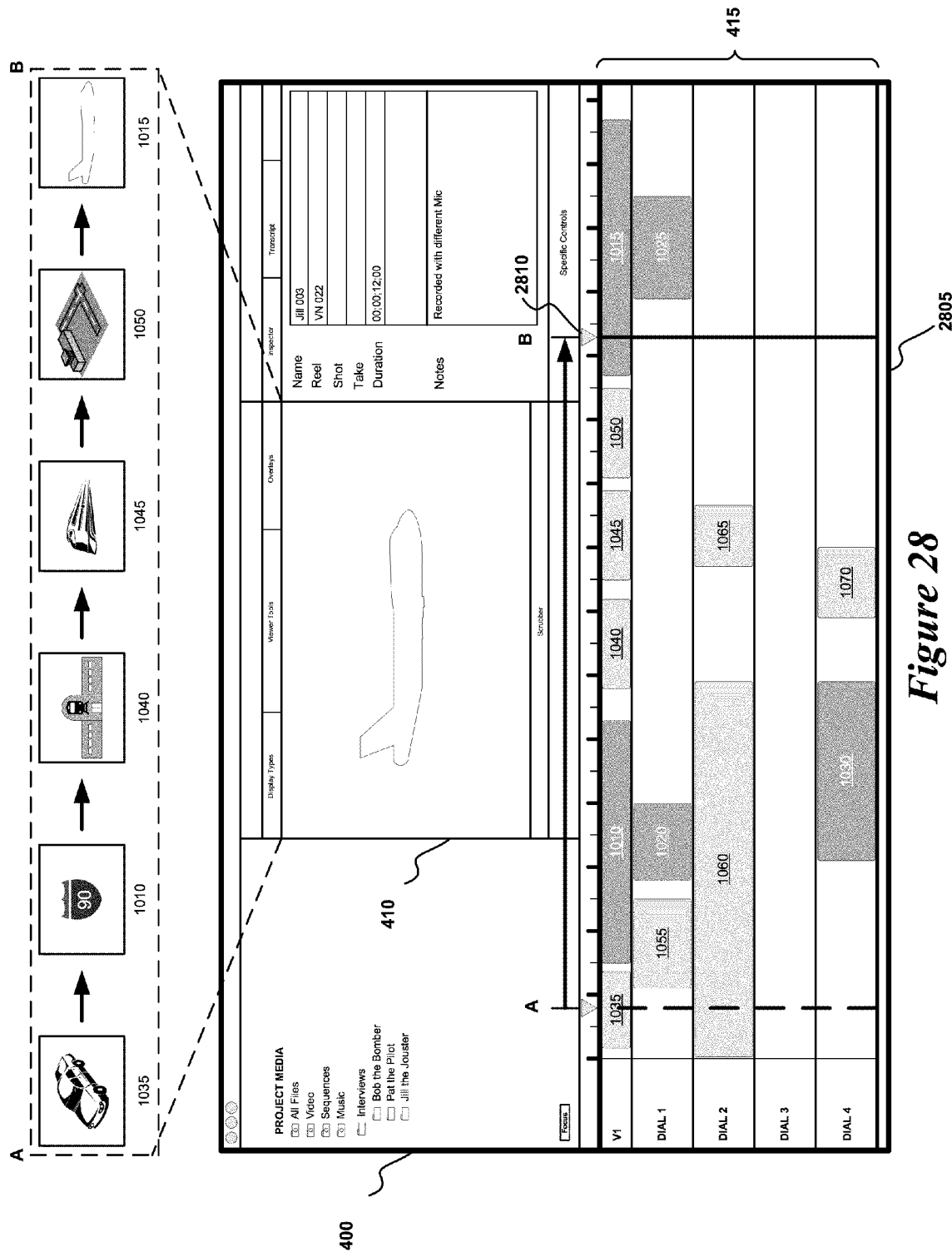
FIG. 28 illustrates a composite display during playback in some embodiments.
Figure 29:
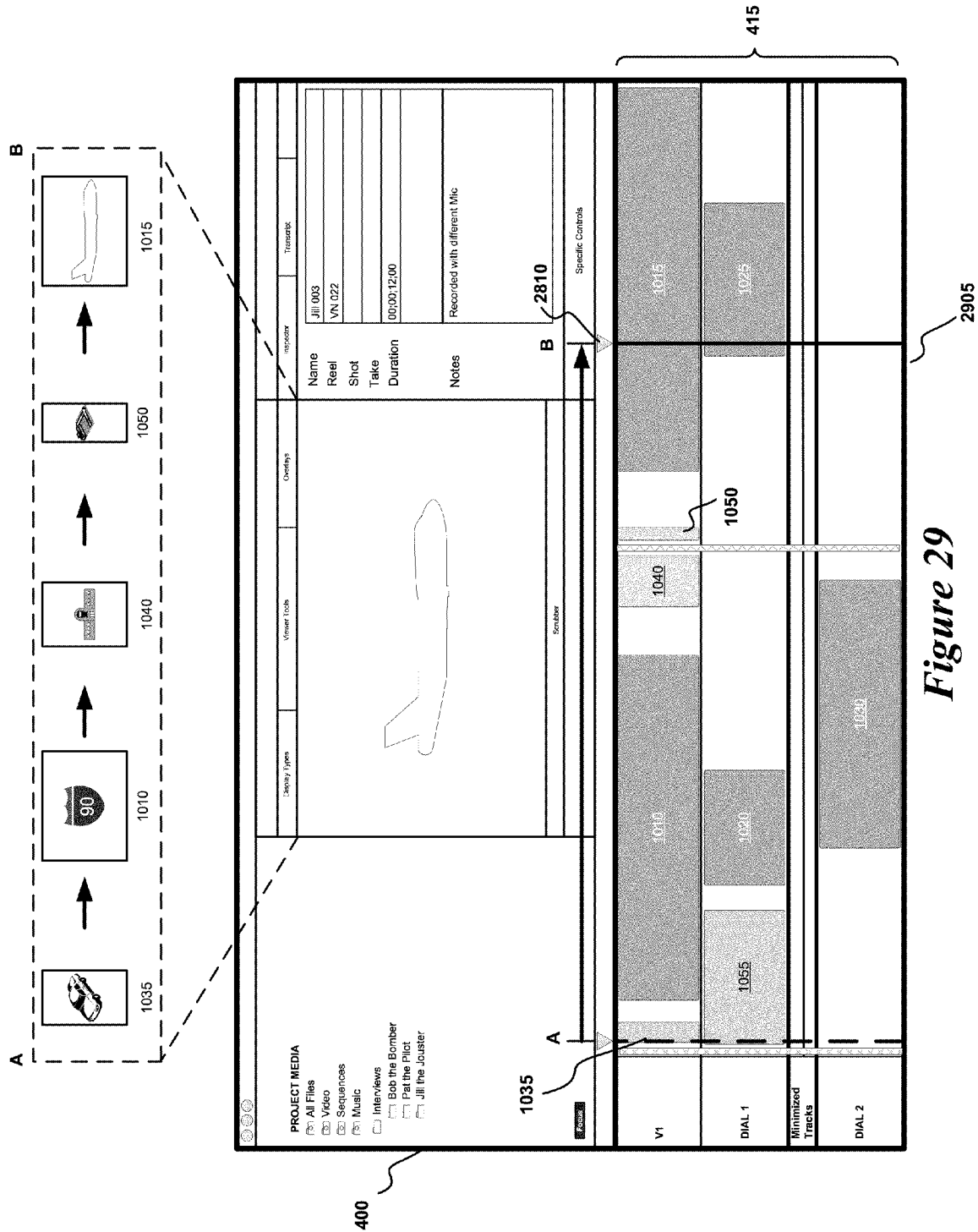
FIG. 29 illustrates a composite display area during playback after a focus feature has been applied in some embodiments.

FIGS. 28-29 illustrate how the playback feature is performed in the media editing application. Specifically, FIGS. 28-29 illustrate the GUI 400 at two different stages when the playback of the media clips is performed. FIGS. 28-29 are similar to the GUI 400 of FIGS. 9 and 11, except that the GUI 400 includes a playhead 2810. FIG. 28 illustrates the GUI 400 at a first stage 2805 during playback before a focus feature has been implemented by the media editing application. FIG. 29 illustrates the GUI 400 at a second stage 2905 during playback after the focus feature has been implemented by the media editing application.

As shown in FIG. 28, during playback, the media editing application displays in the display area 410 the media clips that correspond to several clip shapes. Specifically, this figure shows that as the playhead 2810 moves from point A to point B, the display area 410 display several media clips, which are associated with the clip shapes 1035, 1010, 1040, 1045, 1050 and 1015. As shown in FIG. 28, the display area 410 sequentially displays (1) a media clip that has a car scene, (2) a media clip that has road scene, (3) a media clip that has train station scene, (4) a media clip that has a train scene, (5) a media clip that has a airport scene, and (6) a media clip that has an airplane scene.

FIG. 29 illustrates the playback after a focus feature has been implemented by a media editing application. This figure shows that after the focus operation, (1) selected clip shapes 1010-1030, (2) clip shape 1055 and (3) portions of clip shapes 104 and 1050 have been enlarged. As shown in this figure, the playback after a focus feature has been implemented is similar to the playback shown in FIG. 28, except that some of the media clips are not shown in the display area 410. In this particular example, as the playhead 2810 moves from point A to B, the display area 410 displays media clips which are associated with the emphasized clip shapes 1035, 1010, 1040, 1050 and 1015. Thus, in this particular example, the media clip associated with the clip shape 1045 is not shown in the display area 410 (i.e., the train scene of clip shape 1045 is not shown).

In addition, as the playhead 2810 moves along the timeline, in some embodiments, only a portion of the media clips associated with clip shapes 1035-1040 and 1050 are shown. This notion is conceptually illustrated in FIG. 29 by the truncated clip shapes 1035-1040 and 1050 in the projection area of the display area. In this particular example, the display area 410 would only display a portion of the car scene (e.g., last second of clip shape 1035), a portion of the train station scene (e.g., the first 2 seconds of clip shape 1040) and a portion of the airport scene (e.g., the last 1 second of clip shape 1050). In addition, some embodiments may display media clips associated with clip shapes 1035-1040 and 1050 at a faster rate.

The playback feature can also be similarly applied to audio clips. Accordingly, in some embodiments, when audio clips are played back after implementing a focus feature, the media editing application may (1) skip one or more of the audio clips, (2) play a portion of the audio clip, and/or (3) play the audio clip(s) at a faster rate. Having described several focusing features of a media editing application, the following Section VI will now describe the editing and usage of clip shapes in some embodiments.

VI. Edit and Usage

The use of the focus feature provides several benefits and advantages to a user of a media editing application. For example, the focus features reduces "clutter" in the composite display area by allowing a user to emphasize clip shapes of interest or clip shapes that the user is currently working on from clip shapes that the user is not currently interested in. In addition, the focus feature allows the user to view several clip shapes that would otherwise not be displayed together in the composite display area. In particular, the focus feature allows non-adjacent clip shapes to be focused on (e.g., enlarged) without focusing on (e.g., without enlarging) any clip shape that might be between the two non-adjacent clip shapes in the composite display area. In other words, two non-continuous areas of the composite display area can be emphasized (e.g., enlarged) without also emphasizing an area between the two non-continuous areas.

Accordingly, the focus feature is helpful in making it easier and faster for users to edit media clips that are used to create the composite multimedia presentation. For example, the focus feature allows a user to easily perform consistent editing operations on several media clips that are separated by a sufficiently large duration of time and/or one more sufficiently large sequence of tracks. In some cases, consistent editing operations on such media clips can include the same editing operations, similar editing operations, and/or different editing operations that are needed to produce a desired composite presentation. A particular editing operation can be a color correction operation, a special effects operation, a scaling operation, an opacity operation, a rotation operation. In some embodiments, these editing operations can be performed after receiving a selection of one or more emphasized clip shapes. The selection of these emphasized clip shapes to perform editing operations are similar to the selection of clip shapes prior to a focus operation.

Figure 30:
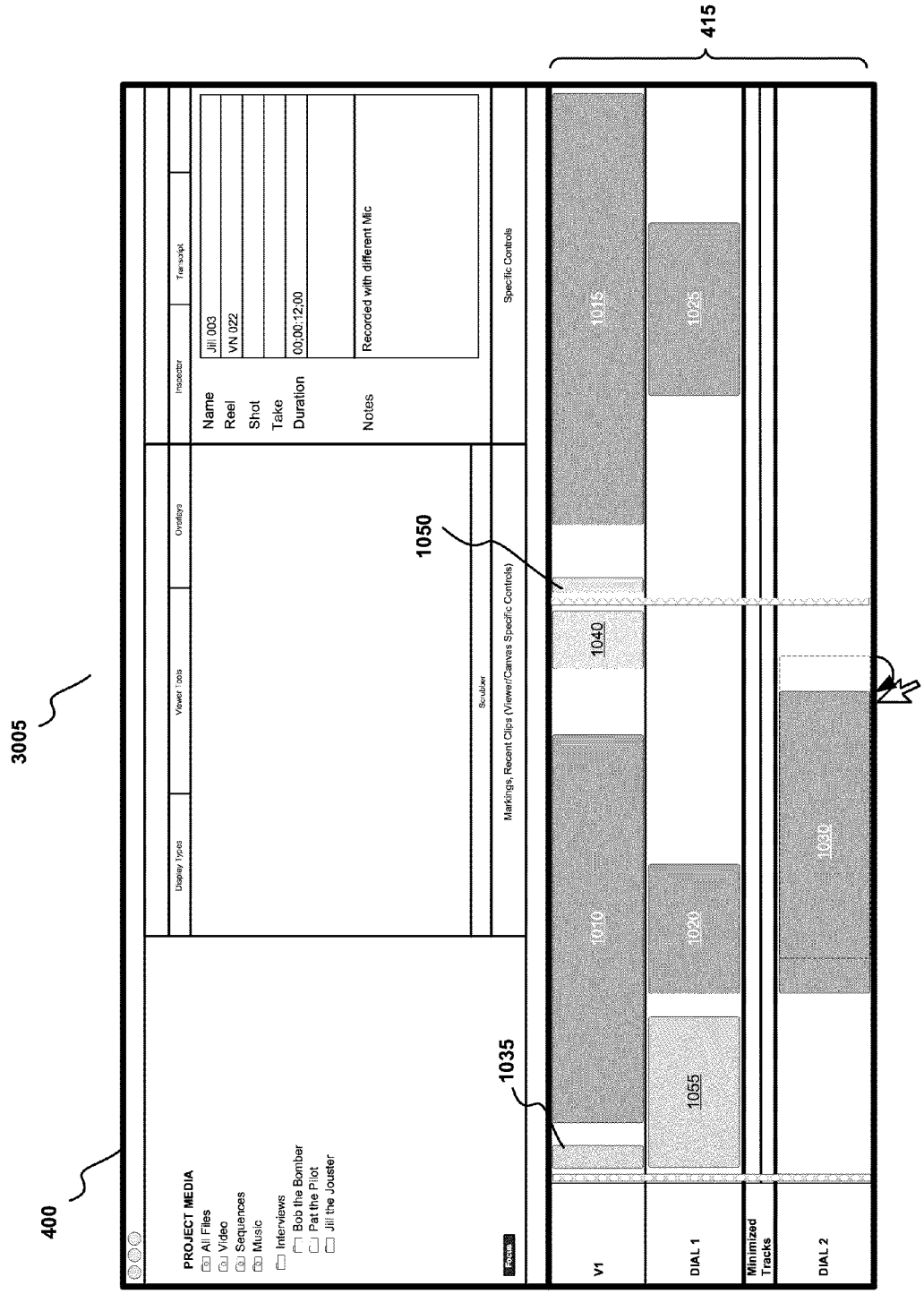
FIG. 30 illustrates a composite display area after moving an emphasized clip shape in some embodiments.

FIG. 30 illustrates how the focus feature allows a user to accurately align media clips that are on different tracks. In some embodiments, FIG. 30 illustrates the GUI 400 at a fourth stage 3005 that is after the third stage 1105 in FIG. 11. As shown in this figure, the clip shape 1020 and clip shape 1030 are on different tracks. The start time of clip shape 1030 along the timeline should be the same as the start time of the clip shape 1020. However, as shown in this figure, the start of the clip shape 1030 is after the start of the clip shape 1020. Before the focus operation, it is difficult to accurately align these two clip shapes 1020 and 1030 because several tracks separated the two clip shapes 1020 and 1030 (See FIG. 10). However, as a result of the focus operation, these two clip shapes 1020 and 1030 are vertically closer to each other because any track that was between the two clip shapes 1020 and 1030 have been collapsed. Accordingly, it is much easier for a user to accurately align these two clip shapes 1020 and 1030. As shown in this figure, the alignment is performed through a click and drag operation of the clip shape 1030 in some embodiments.

Figure 31:
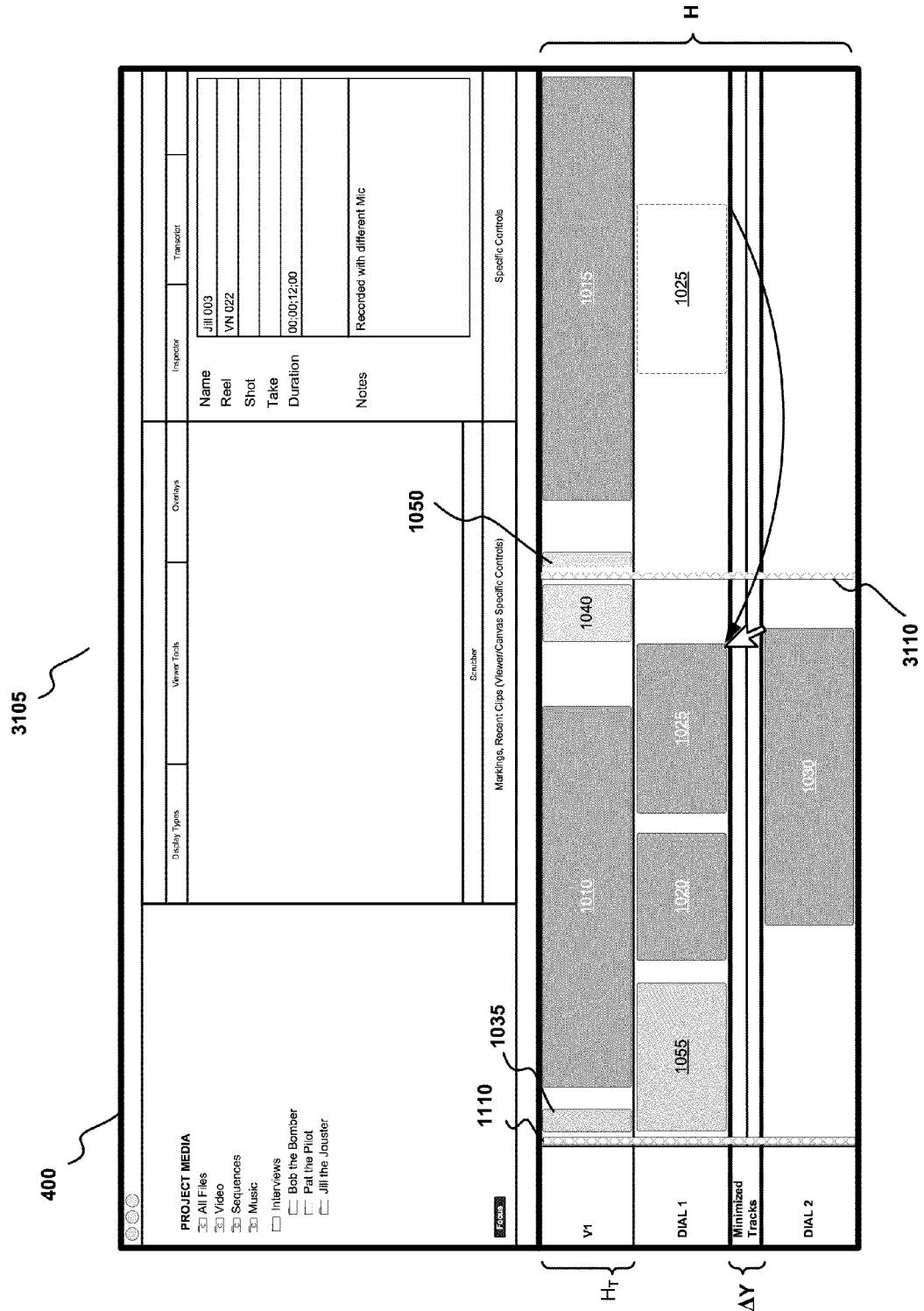
FIG. 31 illustrates a composite display area after moving an emphasized clip shape across a collapsed region in some embodiments.

In some embodiments, the editing of clip shapes after a focus operation is not limited to aligning clip shapes to other clip shapes. For example, some embodiments allow clip shapes to be moved across one or more collapsed regions. Such an example is illustrated in FIG. 31. Specifically, this figure illustrates an emphasized clip shape that is moved from a first location to a second location across a collapsed region in the composite display area. This figure illustrates the GUI 400 at a fourth stage 3105. In some embodiments, the fourth stage 3105 is after the third stage 1105 in FIG. 11. As shown in FIG. 31, an emphasized clip shape 1025 has been moved from its first location to a second location that is across a collapsed region (e.g., line 3110) in the composite display area 415. In some embodiments, an emphasized clip shape can be moved across a collapsed region as long as the entire emphasized clip shape "crosses" the collapsed region. In other words, if any move causes any part of the emphasized clip shape to lie within the collapsed region of the composite display area, then such a move will not be allowed in some embodiments.

By allowing a clip shape to be moved across a collapsed region, the focus feature makes it easier for a user to move a clip shape from one end of the timeline to another end of the timeline (e.g., from the end of the timeline to the beginning of the timeline). In addition to moving clip shapes across one or more collapsed regions, clip shapes can also be moved from one track to another in some embodiments. Having described the advantages of the focus feature when performing editing operation, a process that performs the focus feature and editing will now be described by reference to FIG. 32.

Figure 32:
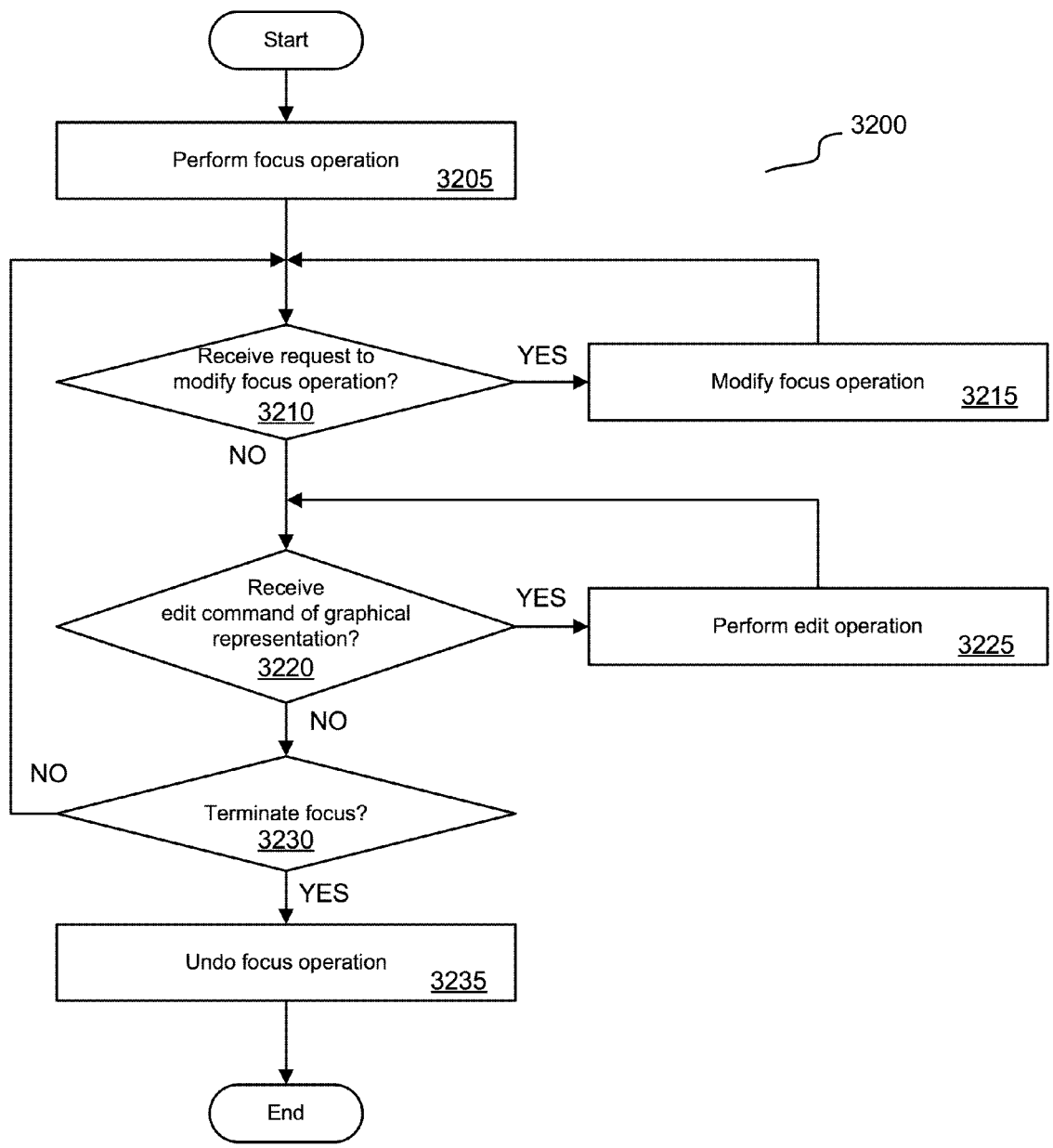
FIG. 32 illustrates a process for focusing and editing in some embodiments.

FIG. 32 illustrates a process 3200 that some embodiments perform to edit graphical representations in a composite display area of a media editing application. In some embodiments, the process of FIG. 32 starts after a focus command has been received from a user (e.g., when a user selects the focus item 420). As shown in FIG. 32, the process 3200 initially performs (at 3205) a focus operation. In some embodiments, the focus operation includes process 1300 of FIG. 13. Thus, some embodiments enlarge selected graphical representations and collapse unselected graphical representations when performing the focus operation. In addition, performing (at 3205) the focus operation also includes displaying graphical representations that have been adjusted (e.g., enlarged, collapsed) in some embodiments.

Next, the process determines (at 3210) whether a request to modify the focus operation has been received. For example, the process 3200 determines (at 3210) whether a selection of a line that represents a collapsed area or collapsed graphical representations has been received. If a request is received (at 3210), the process proceeds to 3215 to modify the focus operation. In some embodiments, modifying the focus operation includes unpacking one or more of the collapsed areas or collapsed graphical representations in the composite display area, as shown in FIGS. 15-17. In some embodiments, modifying the focus operation includes modifying the size of some or all of the graphical representations in a composite display area. This entails recomputing the size of the graphical representations (e.g., selected clip shapes and unselected clip shapes) in some embodiments. In addition to modifying the size of some or all of the graphical representations, modifying (at 3215) includes displaying the modified graphical representations.

After modifying (at 3215) the focus operation, the process proceeds back to 3210 to determine whether a request to modify the focus operation has been received. For example, the process determines (at 3210) whether a selection of another line that represents another collapsed area or collapsed clip shapes has been received.

When the process does not receive (at 3210) a request, the process determines (at 3220) whether an edit command has been received. This edit command can be any command that modifies one or more of the media clips represented by graphical representations. For example, the edit command can be a command to (1) move a clip shape (e.g., from one track to another track) and/or (2) change a duration of a clip shape. When an edit command is received, the process performs (at 3225) an edit operation based on the edit command. Moreover, in some embodiments, performing the edit operation includes displaying in the composite display area, the clip shapes after edit operation.

After performing (3225) the edit operation, the process determines (at 3220) whether another edit command has been received. If so, the process performs (at 3225) another edit operation. However, when the process determines (at 3220) that an edit command has not been received, the process determines (at 3230) whether to terminate the focus feature. In some embodiments, the process determines (at 3230) to terminate the focus feature when an unfocus command is received. For example, the process determines to terminate the focus feature when a user selects the focus item 420. If an unfocus command is not received, the process proceeds back to 3210 to determine whether a request to modify the focus operation has been received. However, when the process determines (at 3230) to terminate the focus feature (e.g., because a user has selected the focus item 420, which disables the focus feature in some embodiments or because a time out has occurred (no action received from user for a threshold period of time)), the process undoes (at 3235) the focus operation performed (at 3205 or 3215) and ends.

Accordingly, when undoing (at 3235) the focus operation, some embodiments change the size of clip shapes back to their previous size prior to the focus operation. However, when one or more edit operations have been performed (at 3225) on clip shapes, some embodiments do not undo changes made to the clip shapes when undoing the focus operation. Thus, in some embodiments, the location and/or size of some of the clip shapes can be different than the location and/or size of these clip shapes prior to the focus operation. In some embodiments, undoing the focus operation (at 3235) also includes displaying the clip shapes without the focus operation being implemented.

Having described editing and usage in a media editing application, the following Section VII will now describe in detail the software architecture of a media editing application in some embodiments.

VII. Editing Software Architecture

Figure 33:
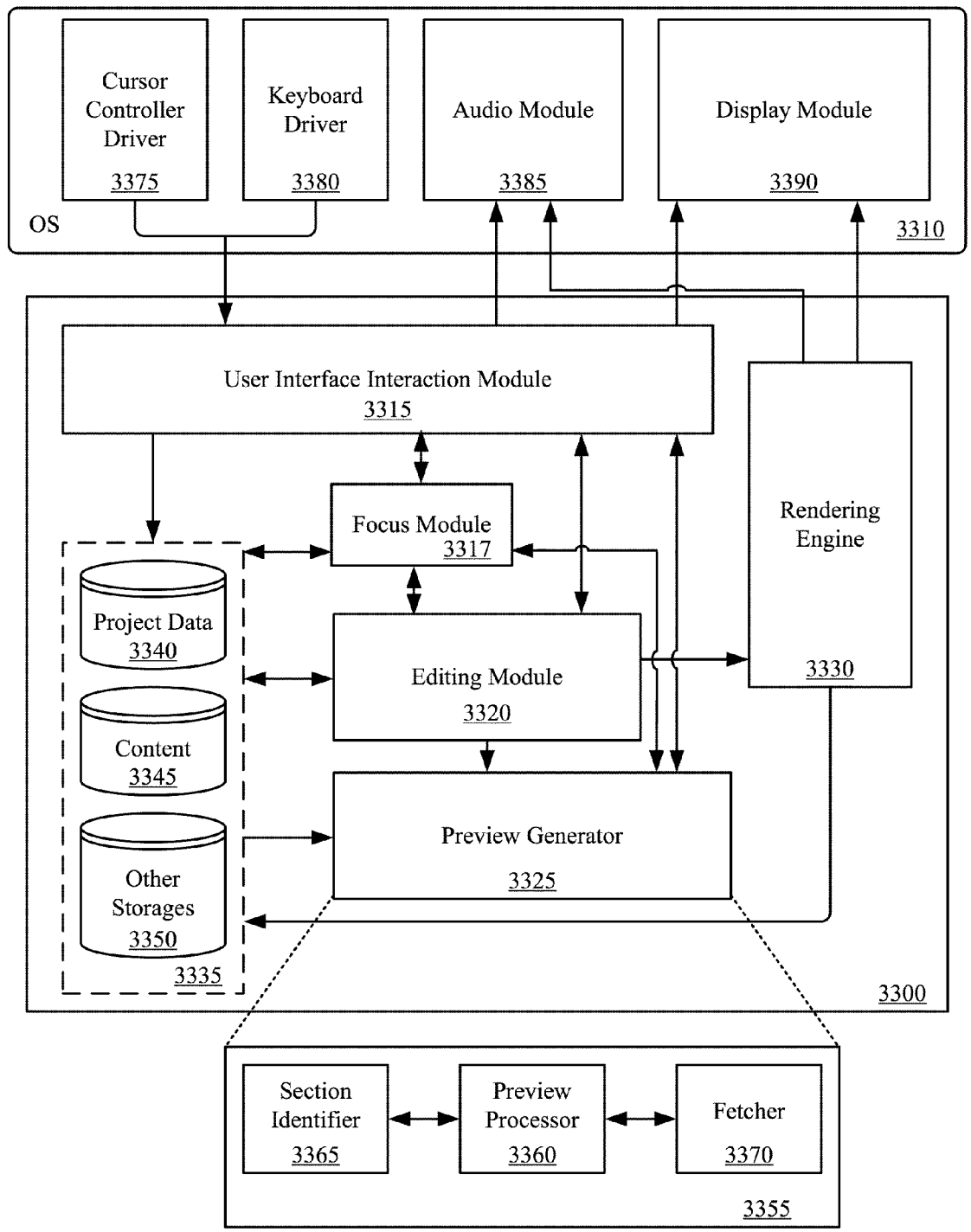
FIG. 33 illustrates a software architecture of a media editing application that includes several modules in some embodiments.

In some embodiments, the processes described above are implemented as software running on a particular machine, such as a computer or a handheld device, or stored in a computer readable medium. FIG. 33 conceptually illustrates the software architecture of a media-editing application 3300 of some embodiments. In some embodiments, the media-editing application is a stand-alone application or is integrated into another application, while in other embodiments the application might be implemented within an operating system.

The media editing application 3300 includes a user interface interaction module 3315 for sending data to and receiving data from a user, a focus module 3317 for processing selected and unselected clip shapes in a composite display area, an editing module 3320 for receiving and processing edits to a composite project, a preview generator 3325 for creating a composite presentation based on stored project data, a rendering engine 3330 used to generate image data for storage or display, and a set of storages 3335 for storing data used by the application 3300. The set of storages 3335 includes storages for project data 3340, content data 3345, as well as other data 3350 (e.g., data about media objects in a video scene). The sub-components of the preview generator 3325 of some embodiments are shown in breakout section 3355. As shown, the preview generator includes a preview processor 3360, a section identifier 3365, and a fetcher 3370.

The operating system 3310 of some embodiments includes a cursor controller driver 3375 that allows the application 3300 to receive data from a cursor control device, a keyboard driver 3380 for that allows the application 3300 to receive data from a keyboard, an audio module 3385 for processing audio data that will be supplied to an audio device (e.g., a soundcard and speakers), and a display module 3390 for processing video data that will be supplied to a display device (e.g., a monitor).

A user interacts with items in the user interface of the media editing application 3300 via input devices (not shown) such as a cursor controller (e.g., a mouse, touchpad, trackpad, etc.) and/or keyboard. The input from these devices is processed by the cursor controller driver 3375 and/or the keyboard driver 3380, and passed to the user interface interaction module 3315.

The user interface interaction module 3315 translates the data from the drivers 3375 and 3380 into the user's desired effect on the media editing application 3300. For example, when the user edits content in a display area of the media editing application, the user interface interaction module 3315 may translate these edits into instructions that are processed by the editing module 3320 in some embodiments. In other embodiments, the edits may be applied directly to project data 3340, or other data stored by the application 3300 in the set of storages 3335. The user interface interaction module 3315 also receives input data that is translated as instructions to preview visual content in a preview display area (for example, if a user clicks a play control while editing a media project). This information is passed to preview generator 3325 through the editing module 3320 in some embodiments.

The focus module 3317 processes instructions received from the user interface module 3315 and data retrieved from the set of data storages 3335. In some embodiments, the focus module 3317 also sends instructions and/or data to the preview generator 3325. For example, during playback of one or more clips, the focus module 3317 may send instructions to the preview generator 3325 about which clip on a timeline to play or display. In some embodiments, the focus module 3317 can perform some or all of the operations of processes 1200, 1300, 2200, 1800 and 2700.

The editing module 3320 of some embodiments processes edit instructions received from the user interface interaction module 3315 and data retrieved from the set of data storages 3335. The editing module 3320 may also create and/or update data stored within the set of data storages 3335 based on received instructions that affect the project data 3340, content 3345, or other stored data 3350. In addition, the editing module 3320 may send instructions and/or data to the preview generator 3325 of some embodiments. Furthermore, the editing module 3320 may also send data and/or instructions to the rendering engine 3330 of some embodiments.

The preview generator 3325 of some embodiments generates a preview based on instructions received from the editing module 3320, the focus module 3317 and/or the user interface interaction module 3315 and project data stored in storage 3340, content stored in storage 3345, and/or other data stored in storage 3350. In some embodiments, preview generator 3325 also generates a preview window (through the user interface interaction module 3315) after generating the preview, and manages the movement of the preview window. In some of these embodiments, the preview generator 3325 may also provide content to the user interface interaction module 3315 for display.

The operation of the preview generator 3325 will be further described in reference to breakout section 3355. As shown, the preview generator of some embodiments includes a preview processor 3360 that may be used to communicate with the editing module 3320, send and receive data to and from the user interface interaction module 3315 and/or the set of data storages 3335. In addition, the preview processor 3360 may be used to send and receive data to and from the section identifier 3365 and/or the fetcher 3370. In some embodiments, the preview processor 3360 sends timeline data to the section identifier 3365, which generates a table or other appropriate set of data. In some embodiments, the section identifier 3365 identifies which frames in unselected media clips are going to be played during playback. For example, the section identifier 3365 may identify the frames associated with the first two seconds (e.g., frames 1-60) of a particular unselected media clips as clip to play during playback.

In some embodiments, the preview processor 3360 may supply the set of data (e.g., a segment table or frame set) generated by the section identifier 3365 to the fetcher 3370. In some embodiments, audio data may be passed directly to the user interface interaction module, while video data is processed through the fetcher 3370. In other embodiments, the preview processor 3360 may supply both audio and video data to the user interface interaction module 3315. If project data, content, and/or other data are edited, that modified data is passed to the preview generator 3325 so that a new preview can be generated.

The fetcher 3370 of some embodiments retrieves frames of video data from the set of data storages 3335 based on data provided by the preview processor 3360. In some embodiments, the fetcher 3370 may also receive data from the editing module 3320 or focus module 3317 (either directly, or through the preview processor 3360). The data received by the fetcher 3370 may take the form of a table or list of frames. In addition to processing video frames through the fetcher 3370, some embodiments may use the fetcher to retrieve and send audio data.

The rendering engine 3330 enables the storage or output of audio and video from the media editing application 3300. For example, rendering engine 3330 uses data about media objects in a video scene to render the video scene from the particular location, direction, etc. defined by a camera object. As such, the rendering engine receives, in some embodiments, data from the editing module 3320 so that a preview can be displayed. In other embodiments (not shown), the rendering engine 3330 may receive data from the preview generator 3325 in order to generate a preview display. The data from the rendering engine 3330 (e.g., audio and video data of a video scene, preview data, etc.) is passed to the display module 3390 and/or the audio module 3385. The audio module enables audio from the media editing application 3300 on an audio device (e.g., a set of speakers or headphones). The display module 3390 enables the display of the media editing application 3300 on a display device (e.g., a CRT monitor, LCD screen, etc.). Alternatively, data may be passed from the rendering engine 3330 to the set of storages 3335 for later playback.

While many of the features have been described as being performed by one module (e.g., the UI interaction module 3315 or preview generator 3325), one of ordinary skill would recognize that a particular operation might be split up into multiple modules, and the performance of one feature might even require multiple modules in some embodiments. In addition, the application 3300 may include a separate audio module that performs functions analogous to the fetcher 3370.

Furthermore, in some embodiments, the application is provided as part of a server-based (e.g., web-based) solution. In some such embodiments, the application is provided via a thin client. That is, the application runs on a server while a user interacts with the application via a separate client machine remote from the server (e.g., via a browser on the client machine). In other such embodiments, the application is provided via a thick client. That is, the application is distributed from the server to the client machine and runs on the client machine.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc). For example, the present application describes the use of a cursor in the graphical user interface to control (e.g., select, move) objects in the graphical user interface.

However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

Having described a software architecture of a media editing application, the following Section VIII will now describe a process for designing a media editing application in some embodiments.

VIII. Process for Designing a Media Editing Application

The above software architecture of the media editing application can be manufactured by defining one or more modules that can perform the operations and functionalities described above. An example of manufacturing a computer readable storage medium that stores a computer program for performing the above features is described below with reference to FIG. 34. In some embodiments, the computer readable storage medium is a disk (e.g., CD, DVD, hard disk, etc.) or a solid-state storage device (e.g., flash memory). In some embodiments, the computer readable storage medium is only a CD.

Figure 34:
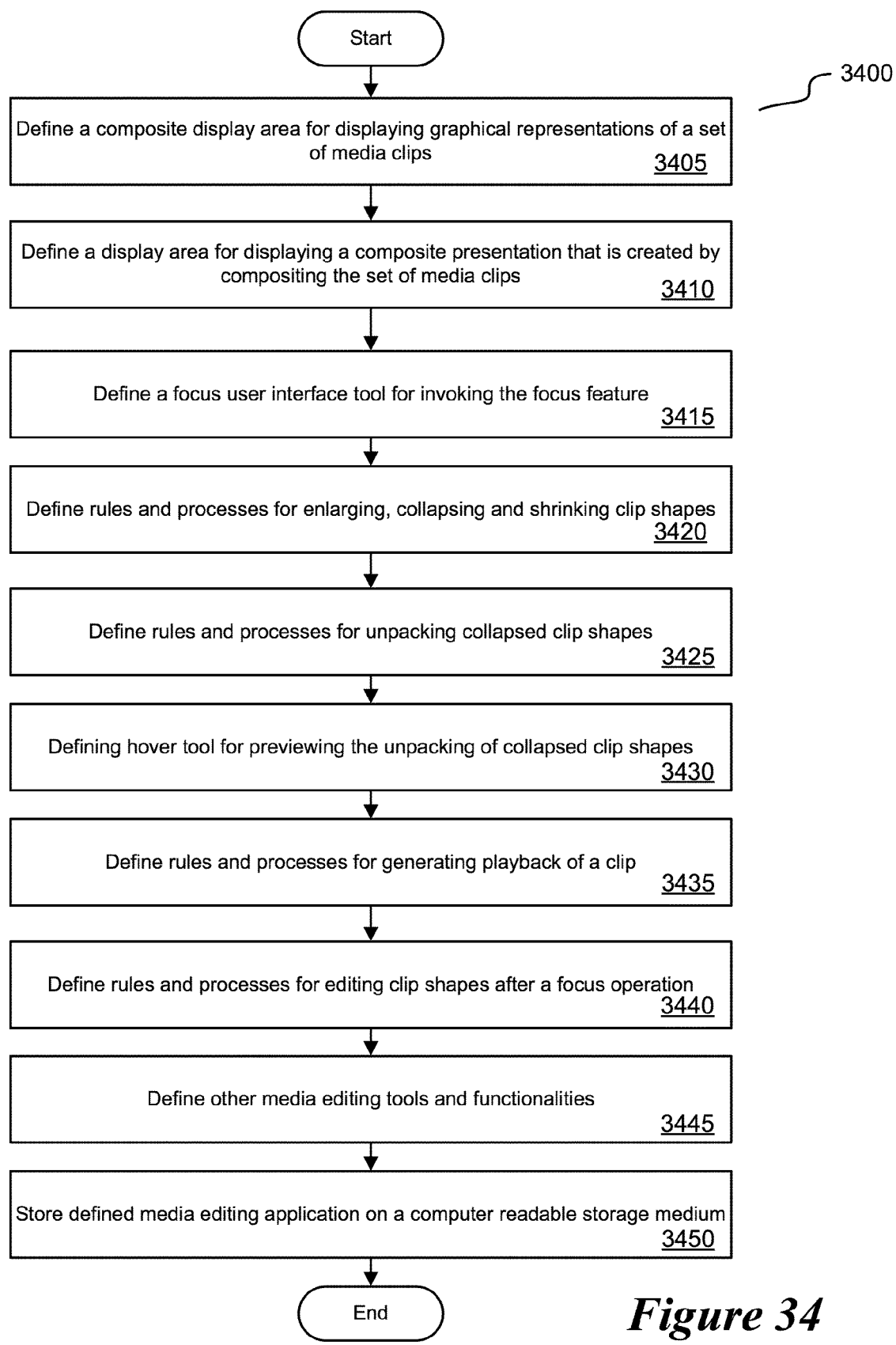
FIG. 34 illustrates a process for defining a media editing application in some embodiments.

FIG. 34 conceptually illustrates a process 3400 of some embodiments for defining a media-editing application of some embodiments, such as application 3300. Specifically, process 3400 illustrates the operations used to define several of the objects and tool shown in the GUI 400. As shown in FIG. 34, the process 3400 begins by defining (at 3405) a composite display area for displaying graphical representations of a set of media clips. The composite display area 415 in FIG. 4 is one example of such a display area.

The process then defines (at 3410) a display area for displaying a composite presentation that is created by compositing the set of media clips. For instance, the preview display area 410 is such a display area. Next, the process defines (at 3415) a focus user interface tool for invoking the focus feature. The focus item 420 is an example of such a user interface tool. In other embodiments, defining the focus tool comprises defining one or more keyboard command for invoking the focus feature. In some embodiments, defining the focus tool can also include defining a track menu for selecting tracks to focus.

After defining (at 3415) the focus user interface tool for invoking the focus feature, the process defines (at 3420) rules and processes for enlarging, collapsing and shrinking clip shapes. In some embodiments, this includes defining (1) how to compress a track that does not include any selected clip shape, (2) how to identify focus regions, (3) how to specify buffer zones. An example of a process that performs the focus operation based on these defined rules is shown in FIG. 13.

The process then defines (at 3425) rules and processes for unpacking collapsed clip shapes. An example of unpacking is described in process 1800. FIGS. 14-17 also illustrates a GUI during an unpacking process.

After defining (at 3425) rules and processes for unpacking, the process 3400 defines (at 3430) a hover tool for previewing the unpacking of collapsed clip shapes. FIGS. 19-21 illustrate several examples of such previewing of unpacked collapsed clip shapes. In addition, a process for using the hover tool is show in FIG. 22.

Next, the process defines (at 3435) rules and processes for generating playback of one or more clips. Several examples of these rules and processes were described above in reference to FIGS. 28-29.

After defining the process for defining (at 3435) rules and processes for generating playback, the process defines (at 3440) rules and processes for editing clip shapes after a focus operation. In some embodiments, editing includes (1) moving clip shapes from one location to another, and/or (2) performing color correction on media clips. Several examples of these rules and processes were described above in reference to FIGS. 30-31.

The process then defines (at 3445) other media editing tools and functionalities. Examples of such editing tools may include zoom, color enhancement, blemish removal, audio mixing, etc. In addition, various other media editing functionalities may be defined. Such functionalities may include library functions, format conversion functions, etc. The process defines these additional tools in order to create a media editing application that has many additional features to the features described above.

Figure 35:
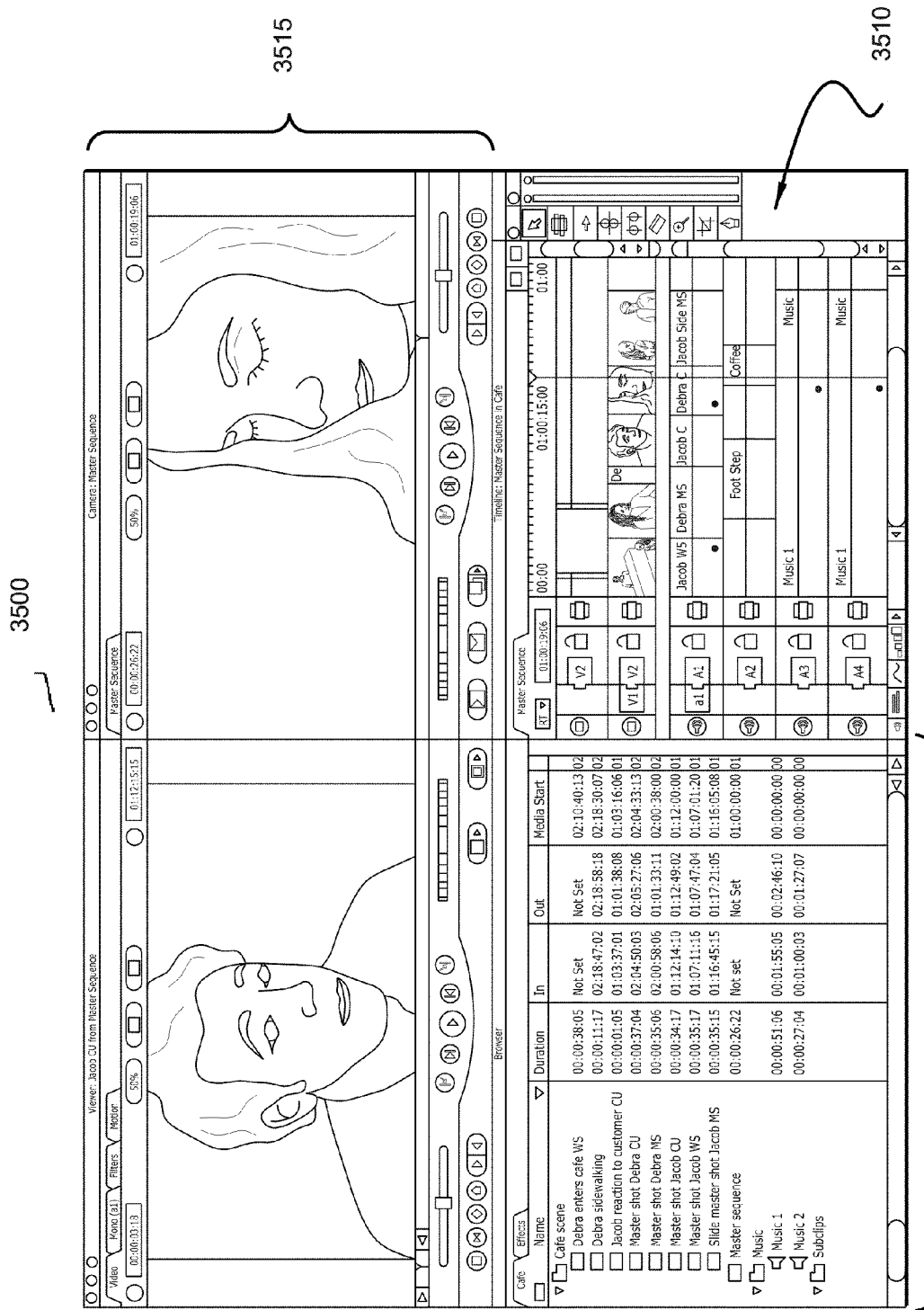
FIG. 35 illustrates a GUI of an editing application in some embodiments.

A more detailed view of a media editing application with these additional features is illustrated in FIG. 35. Specifically, this figure shows a media editing application with a list of video clips 3505, video editing tools 3510, and video displays 3515. The list of video clips 3505 includes video clips along with metadata (e.g., timecode information) about the video clips. In some embodiments, the list of video clips is the list of video clips in a particular sequence of video clips, and the metadata specifies in and out points, durations, etc. for the video clips.

The video editing tools 3510 include tools that allow a user to graphically set in and out points for video clips (in other words, where in the final product a specific clip or part of a clip will be shown). For instance, the video editing tools 3510 include a number of timelines that can be used to modify the temporal sequence of the video frame and to synchronize audio tracks with video tracks (e.g., in order to add music over a video clip). In some embodiments, video editing tools 3510 also give users the ability to edit in effects or perform other video editing functions.

Video displays 3515 allow a user to watch multiple video clips at once, thereby enabling easier selection of in and out points for the video clips. The screen shot 3500 illustrates a few of many different editing tools that a video editing application of some embodiments may have to edit digital video.

In some cases, some or all of the video clips that are displayed in the list of video clips 3505, played in displays 3515, and edited by a user with video editing tools 3510, are video clips of real-world objects (e.g., people, landscapes, etc.) filmed by a camera and include real-world audio (e.g., conversations, real-world noises, etc.) recorded by a camera, microphone, etc. In some cases, some or all of the video clips are computer-generated animations or include computer generated animations (e.g., animated objects, computer-generated effects, etc.).

The process 3400 then stores (at 3450) the defined media editing application on a computer readable storage medium and ends. The computer readable storage medium may be a disk (e.g., CD, DVD, hard disk, etc.) or a solid-state storage device (e.g., flash memory) in some embodiments.

One of ordinary skill in the art will recognize that the various elements defined by process 3400 are not exhaustive of the modules, rules, processes, and UI items that could be defined and stored on a computer readable storage medium for a media editing application incorporating some embodiments of the invention. In addition, the process 3400 is a conceptual process, and the actual implementations may vary. For example, different embodiments may define the various elements in a different order, may define several elements in one operation, may decompose the definition of a single element into multiple operations, etc. In addition, the process 3400 may be implemented as several sub-processes or combined with other operations within a macro-process. Section IX will now describe a computer system for implementing and executing the computer program that is stored on the computer readable storage medium.

IX. Computer System

Many of the above-described processes are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 36:
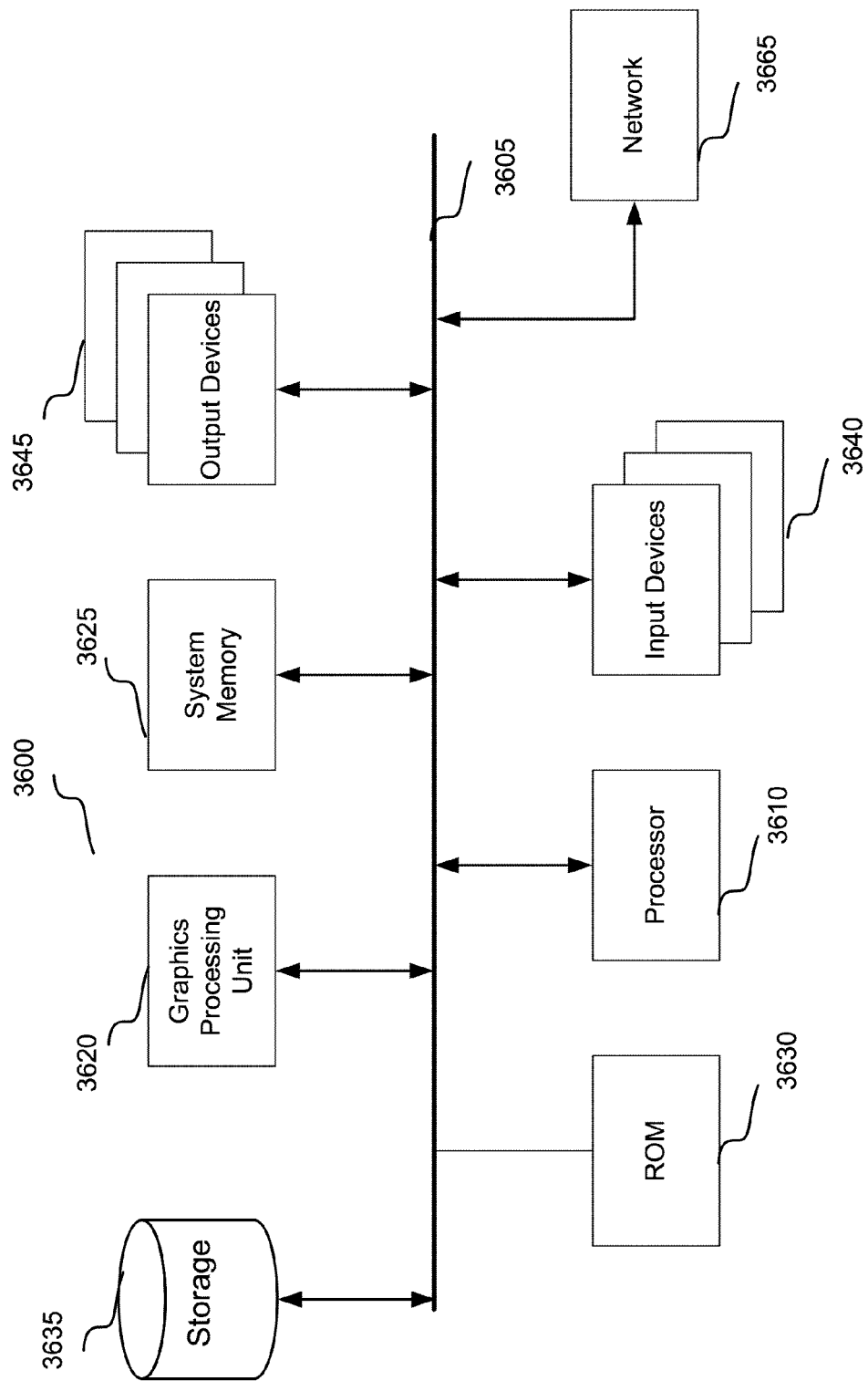
FIG. 36 conceptually illustrates a computer system with which some embodiments of the invention are implemented.

FIG. 36 illustrates a computer system with which some embodiments of the invention are implemented. Such a computer system includes various types of computer readable media and interfaces for various other types of computer readable media. Computer system 3600 includes a bus 3605, a processor 3610, a graphics processing unit (GPU) 3620, a system memory 3625, a read-only memory 3630, a permanent storage device 3635, input devices 3640, and output devices 3645.

The bus 3605 collectively represents all system, peripheral, and chipset buses that communicatively connect the numerous internal devices of the computer system 3600. For instance, the bus 3605 communicatively connects the processor 3610 with the read-only memory 3630, the GPU 3620, the system memory 3625, and the permanent storage device 3635.

From these various memory units, the processor 3610 retrieves instructions to execute and data to process in order to execute the processes of the invention. In some embodiments the processor comprises a Field Programmable Gate Array (FPGA), an ASIC, or various other electronic components for executing instructions. Some instructions are passed to and executed by the GPU 3620. The GPU 3620 can offload various computations or complement the image processing provided by the processor 3610.

The read-only-memory (ROM) 3630 stores static data and instructions that are needed by the processor 3610 and other modules of the computer system. The permanent storage device 3635, on the other hand, is a read-and-write memory device. This device is a non-volatile memory unit that stores instructions and data even when the computer system 3600 is off. Some embodiments of the invention use a mass-storage device (such as a magnetic or optical disk and its corresponding disk drive) as the permanent storage device 3635.

Other embodiments use a removable storage device (such as a floppy disk, flash drive, or ZIP® disk, and its corresponding disk drive) as the permanent storage device. Like the permanent storage device 3635, the system memory 3625 is a read-and-write memory device. However, unlike storage device 3635, the system memory is a volatile read-and-write memory, such a random access memory. The system memory stores some of the instructions and data that the processor needs at runtime.

In some embodiments, the instructions and/or data needed to perform the processes are stored in the system memory 3625, the permanent storage device 3635, and/or the read-only memory 3630, or any combination of the three. For example, the various memory units include instructions for processing multimedia items in accordance with some embodiments. From these various memory units, the processor 4710 retrieves instructions to execute and data to process in order to execute the processes of some embodiments.

The bus 3605 also connects to the input and output devices 3640 and 3645. The input devices enable the user to communicate information and select commands to the computer system. The input devices 3640 include alphanumeric keyboards and pointing devices (also called "cursor control devices"). The output devices 3645 display images generated by the computer system. For instance, these devices display a GUI. The output devices include printers and display devices, such as cathode ray tubes (CRT) or liquid crystal displays (LCD).

Finally, as shown in FIG. 36, bus 3605 also couples computer 3600 to a network 3665 through a network adapter (not shown). In this manner, the computer can be a part of a network of computers (such as a local area network ("LAN"), a wide area network ("WAN"), or an Intranet, or a network of networks, such as the internet. For example, the computer 3600 may be coupled to a web server (network 3665) so that a web browser executing on the computer 3600 can interact with the web server as a user interacts with a GUI that operates in the web browser.

Any or all components of computer system 3600 may be used in conjunction with the invention. For instance, in some embodiments the execution of the frames of the rendering is performed by the GPU 3620 instead of the CPU 3610. Similarly, other image editing functions can be offloaded to the GPU 3620 where they are executed before the results are passed back into memory or the processor 3610. However, a common limitation of the GPU 3620 is the number of instructions that the GPU 3620 is able to store and process at any given time. Therefore, some embodiments adapt instructions for implementing processes so that these processes fit onto the instruction buffer of the GPU 3620 for execution locally on the GPU 3620. Additionally, some GPUs 3620 do not contain sufficient processing resources to execute the processes of some embodiments and therefore the CPU 3610 executes the instructions. One of ordinary skill in the art would appreciate that any other system configuration may also be used in conjunction with the present invention.

Some embodiments of the computer system include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, ultra density optical discs, any other optical or magnetic media, and floppy disks. The computer-readable media may store a computer program that is executable by at least one processor and includes sets of instructions for performing various operations. Examples of hardware devices configured to store and execute sets of instructions include, but are not limited to application specific integrated circuits (ASICs), field programmable gate arrays (FPGA), programmable logic devices (PLDs), ROM, and RAM devices. Examples of computer programs or computer code include machine code, such as produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. Furthermore, many of the features have been described as being performed by one particular module (e.g., the editing module 3315 of FIG. 33). However, one of ordinary skill would recognize that the functions attributed to these modules might be split up into multiple modules, and the performance of one feature might even require multiple modules. Similarly, multiple features that are described as being performed by multiple modules might in fact be performed by a single module. A module is a set of processes in some embodiments. In addition, the invention was described with the use of a particular color scheme to distinguish between selected and unselected graphical representations. However, different color schemes can be used to pictorially indicate graphical representations that are selected or not selected. Throughout the disclosure of the invention, selected graphical representations in a composite display area are described as being enlarged in size. However, one of ordinary skill in the art will understand that in some embodiments, the size of selected graphical representations can remain the same while the size of graphical representations are reduced or that graphical representations are hidden in the composite display area. Thus, one of ordinary skill in the art would understand that the invention is not to be limited by the foregoing illustrative details, but rather is to be defined by the appended claims.

What is claimed is:

1. A non-transitory computer readable medium storing a media editing application for creating media presentations, said application comprising a graphical user interface (GUI), said GUI comprising:
    a preview display area for displaying a preview of a composite presentation that the application creates by compositing a plurality of media clips;
    a composite display area for (i) displaying a graphical representation of the composite presentation in terms of graphical representations of media clips that are part of the composite presentation, and (ii) receiving a selection of a subset of the clip representations; and
    a tool for (i) enlarging a size of each clip representation in the subset of clip representations, (ii) collapsing any clip representation that is unselected, and (iii) concurrently displaying the enlarged and collapsed clip representations in the composite display area in order to focus on the selected subset of clip representations in the composite display area,
        wherein enlarging the size of the clip representation in the subset of clip representations comprises increasing a height of the clip representation while maintaining a width of the clip representation, wherein collapsing the clip representation that is unselected comprises decreasing the height of the unselected clip representation while maintaining the width of the unselected clip representation.

2. The non-transitory computer readable medium of claim 1, wherein the tool is further for enlarging a size of a first part of a particular unselected clip representation and collapsing a second different part of the particular unselected clip representation in order to focus on the subset of graphical representations.

3. The non-transitory computer readable medium of claim 1, wherein a set of unselected clip representations comprises any unselected clip representation that is within a buffer threshold distance of any selected clip representation.

4. The non-transitory computer readable medium of claim 1, wherein the clip representations that are not in the subset include any unselected clip representation that is outside a buffer threshold distance of any selected clip representation.

5. The non-transitory computer readable medium of claim 1, wherein the subset of clip representations includes two non-adjacent clip representations, wherein at least one clip representation that is not in the subset is located between the two non-adjacent clip representations.

6. The non-transitory computer readable medium of claim 1, wherein enlarging the size of the clip representation comprises increasing the width of the clip representation while maintaining the height of the clip representation, wherein collapsing the unselected clip representation comprises decreasing the width of the unselected clip representation while maintaining the height of the unselected clip representation.

7. The non-transitory computer readable medium of claim 6, wherein the tool is further for reducing the size of the selected subset of clip representations and expanding any clip representation that is unselected in the composite display area.

8. The method of claim 1, wherein the composite display area comprises a timeline, wherein the graphical representations span the timeline to define a sequence of media clips for the composite presentation.

9. A non-transitory computer readable medium storing a computer program for creating media presentations, said computer program executable by at least one processor, said computer program comprising sets of instructions for:
  displaying a preview of a composite presentation in a preview display area, said composite presentation created by compositing a plurality of media clips;
  displaying a graphical representation of the composite presentation in a composite display area, the graphical representation of the composite presentation comprising a set of graphical representations representing a set of media clips that are part of the composite presentation; and
  emphasizing a first subset of clip representations in the composite display area by (i) enlarging a display size of each clip representation in the first subset of clip representations on a first track of the composite display area (ii) reducing a display size of each clip representation in a second subset of clip representations on a second track of the composite display area that is different from the first track, and (iii) concurrently displaying the enlarged and reduced clip representations in the composite display area,
    wherein enlarging the display size of the clip representation in the first subset of clip representations comprises increasing a height of the clip representation while maintaining a width of the clip representation, wherein reducing the display size of the clip representation in the second subset of clip representations comprises decreasing the height of the clip representation while maintaining the width of the clip representation.

10. The non-transitory computer readable medium of claim 9, wherein the first subset of clip representations comprises at least one selected clip representation, wherein the second subset of clip representations comprises at least one unselected clip representation.

11. The non-transitory computer readable medium of claim 9, wherein the set of instructions for emphasizing the first subset of clip representations comprises a set of instructions for reducing the width of the each clip representation in the second subset of clip representations.

12. The non-transitory computer readable medium of claim 9, wherein the set of instructions for emphasizing the first subset of clip representations comprises a set of instructions for increasing the width of each clip representation in the first subset of clip representations.

13. The non-transitory computer readable medium of claim 9, wherein the set of instructions for emphasizing the first subset of clip representations further comprises a set of instructions for reducing a display size of a third subset of clip representations on a third track of the composite display area, said third track different from the first and second tracks.

14. The non-transitory computer readable medium of claim 9, wherein the set of instructions for emphasizing the first subset of clip representations further comprises a set of instructions for collapsing a third subset of clip representations on the second track of the composite display area.

15. A non-transitory computer readable medium storing a computer program that when executed by at least one processing unit provides a graphical user interface (GUI) for editing media clips, the GUI comprising:
  a preview display for displaying a preview of a composite presentation that is created by compositing a plurality of media clips;
  a timeline that represents a duration of the composite presentation;
  a composite display area that spans the timeline in a horizontal direction to display a set of clip representations representing the plurality of media clips that are part of the composite presentation;
  a focus tool for enlarging a size of each clip representation in a first emphasized subset of clip representations in the composite display area, reducing the size of each clip representation in a second de-emphasized subset of clip representations, and concurrently displaying the enlarged and reduced clip representations in the composite display area in order to place focus on the first emphasized subset of clip representations,
    wherein enlarging the size of the clip representation in the first emphasized subset of clip representations comprises increasing a height of the clip representation while maintaining a width of the clip representation with respect to the timeline,
    wherein reducing the size of the clip representation in the second de-emphasized subset of clip representations comprises decreasing the height of the clip representation while maintaining the width of the clip representation with respect to the timeline, wherein each clip representation of the first emphasized subset and the second de-emphasized subset is one of the displayed clip representations in the set of clip representations; and
  at least one editing tool for performing an editing operation on at least one particular media clip that is represented by a particular clip representation that has been emphasized in the composite display area.

16. The non-transitory computer readable medium of claim 15, wherein performing the editing operation comprises performing a color correction operation.

17. The non-transitory computer readable medium of claim 15, wherein performing the editing operation comprises performing a special effects operation.

18. The non-transitory computer readable medium of claim 15, wherein the focus tool is further for moving a first clip representation of the first emphasized subset from a first location to a second location in the composite display area.

19. The non-transitory computer readable medium of claim 18, wherein moving the first clip representation comprises moving the first clip representation across a collapsed area of the composite display area.

20. A method for providing media presentations, the method comprising:
providing a display area for displaying a composite presentation that an application creates by compositing a plurality of media clips;
providing a composite display area for (i) displaying a set of graphical representations representing a set of media clips in a plurality of different tracks that are part of the composite presentation, and (ii) receiving a selection of a first subset of clip representations; and
providing a tool for (i) enlarging a display size of each clip representation in the first subset of clip representations of the composite display area, (ii) reducing the display size of each clip representation in a second subset of clip representations, and (iii) concurrently displaying the enlarged and reduced clip representations in the composite display area in order to focus on the selected first subset of clip representations,
wherein enlarging the display size of the clip representation in the first subset of clip representations comprises increasing a width of the clip representation while maintaining a height of the clip representation,
wherein reducing the display size of the clip representation in the second subset of clip representations comprises decreasing the width of the clip representation while maintaining the height of the clip representation.

21. The method of claim 20, wherein the first subset of clip representations comprises (i) a selected clip representation and (ii) a first portion of an unselected clip representation.

22. The method of claim 21, wherein the first portion of the unselected clip representation is located within a threshold temporal distance of the selected clip representation along a timeline of the composite display area.

23. The method of claim 21, wherein the second subset of clip representations comprises a second portion of the unselected clip representation, said second portion located outside a threshold temporal distance of the selected clip representation along a timeline of the composite display area.

24. The method of claim 20 further comprising collapsing the second subset of clip representations into a geometric shape, wherein the geometric shape is displayed in the composite display area as a vertical line that spans across the multiple tracks.

25. The method of claim 20 further comprising collapsing the second subset of clip representations into a geometric shape, wherein the geometric shape is a selectable object in the composite display area, wherein the second subset of clip representations is unpacked in the composite display area upon selection of the geometric shape.

26. The method of claim 25, wherein when a position indicator is moved or a touch operation is detected over the geometric shape, a preview of each collapsed clip representation is displayed at least partially over the composite display area without enlarging any of the second subset of clip representations.

27. A non-transitory computer readable medium storing a computer program for creating media presentation, the computer program executable by at least one processor, the computer program comprising sets of instructions for:
displaying a composite presentation in a display area, said composite presentation created by compositing a plurality of media clips;
displaying in a composite display area, a set of clip representations representing a set of media clips that are part of the composite presentation;
receiving a selection of first and second tracks in the composite display area;
identifying a first subset of clip representations that are displayed on the first and second tracks in the composite display area; and
enlarging a display size of each clip representation in the first subset of clip representations of the selected first and second tracks in the composite display area and reducing the display size of each clip representation in a second subset of clip representations that are concurrently displayed on an unselected third track in the composite display area in order to place focus on the first subset of clip representations in the composite display area,
wherein enlarging the display size of the clip representation in the first subset of clip representations comprises increasing a width of the clip representation while maintaining a height of the clip representation,
wherein reducing the display size of the clip representation in the second subset of clip representations comprises decreasing the width of the clip representation while maintaining the height of the clip representation.

28. The non-transitory computer readable medium of claim 27, wherein the third track is displayed between the first track and the second track in the composite display area, wherein the first track, the second track, and the third track are separate tracks that each comprise clip representations of different media clips.

* * * * *